(12) United States Patent
Zeng et al.

(10) Patent No.: US 10,506,644 B2
(45) Date of Patent: Dec. 10, 2019

(54) RADIO ACCESS NETWORK DEVICE, DATA PROCESSING METHOD, AND IP PACKET PROCESSING METHOD

(71) Applicant: HUAWEI TECHNOLOGIES CO., LTD., Shenzhen (CN)

(72) Inventors: Qinghai Zeng, Shanghai (CN); Hongping Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 36 days.

(21) Appl. No.: 15/855,579

(22) Filed: Dec. 27, 2017

(65) Prior Publication Data

US 2018/0124857 A1 May 3, 2018

Related U.S. Application Data

(63) Continuation of application No. PCT/CN2016/087765, filed on Jun. 29, 2016.

(30) Foreign Application Priority Data

Jun. 30, 2015 (CN) .......................... 2015 1 0376688

(51) Int. Cl.
*H04W 88/08* (2009.01)
*H04W 76/10* (2018.01)
(Continued)

(52) U.S. Cl.
CPC .......... *H04W 76/10* (2018.02); *H04W 24/02* (2013.01); *H04W 24/04* (2013.01); *H04L 69/323* (2013.01);
(Continued)

(58) Field of Classification Search
CPC ..... H04W 76/10; H04W 84/04; H04W 74/08; H04W 80/02; H04L 29/08; H04L 69/323
See application file for complete search history.

(56) References Cited

U.S. PATENT DOCUMENTS

2009/0323607 A1* 12/2009 Park ..................... H04B 7/2628
370/329
2010/0135212 A1* 6/2010 Ho ....................... H04W 28/065
370/328
(Continued)

FOREIGN PATENT DOCUMENTS

CN       101009858 A    8/2007
CN       101009907 A    8/2007
(Continued)

OTHER PUBLICATIONS

International Search Report and Written Opinion (including English translation) issued in corresponding International Application No. PCT/CN2016/087765, dated Oct. 8, 2016, 26 pages.
(Continued)

*Primary Examiner* — Chi Ho A Lee
(74) *Attorney, Agent, or Firm* — Leydig, Voit & Mayer, Ltd.

(57) ABSTRACT

The present disclosure relates to wireless communications technologies, and in particular, to a radio access network device, a data processing method, and an IP packet processing method. The method includes receiving, by a first device in a radio access network, first data sent by a terminal by using an air interface; processing, by the first device, the received first data at a first-part air interface protocol stack; and sending, by the first device, the processed first data to a second device in the radio access network for processing at a second-part air interface protocol stack.

8 Claims, 34 Drawing Sheets

(51) Int. Cl.
*H04W 24/04* (2009.01)
*H04W 24/02* (2009.01)
*H04L 29/08* (2006.01)
*H04W 74/08* (2009.01)
*H04W 80/02* (2009.01)
*H04W 84/04* (2009.01)

(52) U.S. Cl.
CPC ........ *H04W 74/0833* (2013.01); *H04W 80/02* (2013.01); *H04W 84/042* (2013.01); *H04W 88/085* (2013.01)

(56) References Cited

U.S. PATENT DOCUMENTS

| | | | |
|---|---|---|---|
| 2011/0305159 A1* | 12/2011 | Hofmann | H04W 72/085 370/252 |
| 2012/0140743 A1* | 6/2012 | Pelletier | H04W 72/0453 370/335 |
| 2012/0218942 A1 | 8/2012 | Lu et al. | |
| 2013/0260745 A1 | 10/2013 | Johansson et al. | |
| 2014/0198734 A1* | 7/2014 | Yamada | H04W 76/00 370/329 |
| 2014/0204771 A1* | 7/2014 | Gao | H04W 36/28 370/252 |
| 2014/0286243 A1* | 9/2014 | Yamada | H04W 72/042 370/329 |
| 2014/0328182 A1* | 11/2014 | Gao | H04W 28/08 370/236 |
| 2015/0223093 A1* | 8/2015 | Zhang | H04W 24/10 370/252 |
| 2015/0223127 A1* | 8/2015 | Godin | H04W 36/30 370/331 |
| 2015/0327324 A1* | 11/2015 | Wei | H04W 52/0235 370/280 |

FOREIGN PATENT DOCUMENTS

| | | |
|---|---|---|
| CN | 101047948 A | 10/2007 |
| CN | 101237394 A | 8/2008 |
| CN | 101365228 A | 2/2009 |
| CN | 101938415 A | 1/2011 |
| CN | 102056235 A | 5/2011 |
| CN | 103685236 A | 3/2014 |
| EP | 2169849 B1 | 3/2013 |
| EP | 2908570 A1 | 8/2015 |
| EP | 3203805 A1 | 8/2017 |
| WO | 2009006848 A1 | 1/2009 |
| WO | 2012134182 A2 | 10/2012 |
| WO | 2014075210 A1 | 5/2014 |
| WO | 2014163632 A1 | 10/2014 |
| WO | 2015015293 A2 | 2/2015 |
| WO | 2016061789 A1 | 4/2016 |

OTHER PUBLICATIONS

"3rd Generation Partnership Project; Technical Specification Group Radio Access Network; Evolved Universal Terrestrial Radio Access Network (E-UTRAN); Extension of Dual Connectivity in EUTRAN (Release 13)," pp. 1-38, 3GPP TR 36.875 V2.0.0, 3GPP—3rd Generation Partnership Project—Valbonne, France (Jun. 2015).

"Completeness of Control Plane Architectures for Small Cells," 3GPP TSG-RAN WG2 Meeting #82 R2-132039, 3rd Generation Partnership Project, Valbonne, France (May 20-24, 2013).

"Initial data transmission after SCG addition and intra-MeNB HO," 3GPP TSG-RAN WG2 Meeting #88 R2-145276,3rd Generation Partnership Project, Valbonne, France, (Nov. 17-21, 2014).

"Mobility anchor to reduce signalling load to CN without dual connectivity," 3GPP TSG RAN WG2 Meeting #83bis R2-133500, 3rd Generation Partnership Project, Valbonne, France, (Oct. 7-11, 2013).

"3rd Generation Partnership Project;Technical Specification Group Radio Access Network; Evolved Universal Terrestrial Radio Access (E-UTRA); Radio Resource Control (RRC); Protocol specification (Release 12)," 3GPP TS 36.331 V12.5.0 3rd Generation Partnership Project, Valbonne, France (Mar. 2015).

\* cited by examiner

A macro base station is both a user plane anchor and a control plane anchor

A macro base station provides coverage, a control plane anchor is located in the macro base station, and a user plane anchor is located in an LGW A control plane anchor is located in a macro base station, and a user plane anchor does not exist An SNC is both a user plane anchor and a control plane anchor A user plane anchor does not exist, and a control plane anchor is located in an SNC A user plane anchor does not exist, and a control plane anchor does not exist, either Light node + an SNC serves as both a user plane anchor and a control plane anchor + first server + second server Light node + an SNC serves as a control plane anchor + first server + second server

RADIO ACCESS NETWORK DEVICE, DATA PROCESSING METHOD, AND IP PACKET PROCESSING METHOD

CROSS-REFERENCE TO RELATED APPLICATIONS

This application is a continuation of International Application No. PCT/CN2016/087765, filed on Jun. 29, 2016, which claims priority to Chinese Patent Application No. 201510376688.8, filed on Jun. 30, 2015. The disclosures of the aforementioned applications are hereby incorporated by reference in their entireties.

TECHNICAL FIELD

The present disclosure relates to wireless communications technologies, and in particular, to a radio access network device, a data processing method, and an IP packet processing method.

BACKGROUND

In an evolved packet system (EPS for short), user equipment (UE for short) is connected to an evolved NodeB (eNB for short) by using a Uu interface, and accesses a network by using the eNB.

The eNB is connected to a mobility management entity (MME for short) by using an interface, and is connected to a serving gateway (Serving GW for short) by using another interface. The MME performs mobility control on the UE, and the serving gateway mainly routes and forwards a data packet for the UE.

SUMMARY

In view of this, embodiments of the present disclosure provide a radio access network device, a data processing method, and an IP packet processing method, so as to resolve a problem of relatively heavy processing load that is caused because an eNB needs to complete air interface protocol stack processing in a current EPC system.

According to a first aspect, an embodiment of the present disclosure provides a radio access network, the radio access network, a first server, and a second server are connected to each other, the first server is configured to provide an application service for a terminal covered by the radio access network, and the second server is configured to perform user information management on the terminal covered by the radio access network; and the radio access network includes:

at least one access node, where the at least one access node keeps a wireless connection to at least one terminal in the radio access network, and is configured to implement communication between the at least one terminal and the first server by using the wireless connection between the at least one access node and the at least one terminal; and a control plane anchor connected to the at least one access node, where the control plane anchor is configured to:

control the terminal covered by the radio access network and one or more access nodes in the at least one access node to establish a wireless connection; and enable, by exchanging information with the second server, the second server to perform user information management on the terminal keeping a wireless connection to the at least one access node.

With reference to the first aspect, in a first possible implementation, the control plane anchor is specifically configured to:

configure a transmission parameter of the wireless connection, and establish the wireless connection by using the configured transmission parameter of the wireless connection.

With reference to the first aspect or the first possible implementation of the first aspect, in a second possible implementation, the radio access network further includes a user plane anchor connected to the one or more access nodes in the at least one access node;

the user plane anchor is configured to:

send, to the first server, service data that is forwarded by the one or more access nodes in the at least one access node and that is from the terminal keeping a wireless connection to the one or more access nodes; and send, to the terminal by using the access node connected to the terminal, service data that is received from the first server and that is to be sent to the terminal keeping a wireless connection to the one or more access nodes; and the control plane anchor is further configured to configure a transmission parameter used when the user plane anchor forwards service data of the terminal.

With reference to the second possible implementation of the first aspect, in a third possible implementation, the control plane anchor and the user plane anchor are located in a same device; and the access node is a small node, and the same device is a macro base station or a small node controller.

With reference to the second possible implementation of the first aspect, in a fourth possible implementation, the control plane anchor and the user plane anchor are located in different devices, and the control plane anchor is connected to the user plane anchor; and the access node is a small node, the control plane anchor is located in a macro base station or a small node controller, and the user plane anchor is located in a universal gateway.

With reference to any one of the second to the fourth possible implementations of the first aspect, in a fifth possible implementation, the radio access network, the first server, and the second server are connected to each other over the Internet; and different user plane anchors occupy different Internet Protocol IP address network segments.

With reference to any one of the second to the fifth possible implementations of the first aspect, in a sixth possible implementation, the user plane anchor is further configured to perform at least one of the following operations:

allocating an IP address to the terminal connected to the user plane anchor;

aggregating service data of the terminal connected to the user plane anchor;

filtering service data of the terminal connected to the user plane anchor; or routing service data of the terminal connected to the user plane anchor.

With reference to the first aspect or the first possible implementation of the first aspect, in a seventh possible implementation, the access node is a small node, and the control plane anchor is located in a macro base station or a small node controller; and the access node is further configured to:

send, to the first server, service data of the terminal keeping a wireless connection to the access node; and send, to the terminal, service data that is received from the first server and that is to be sent to the terminal keeping a wireless connection to the access node.

With reference to the second possible implementation of the first aspect, in an eighth possible implementation, the access node is a small node, and the control plane anchor is located in a macro base station or a small node controller; and the access node is further configured to:

send, to the first server by using the user plane anchor connected to the access node, service data of the terminal keeping a wireless connection to the access node; and send, to the terminal, service data that is from the first server, that is forwarded by the user plane anchor connected to the access node, and that is to be sent to the terminal keeping a wireless connection to the access node.

With reference to any one of the second to the sixth possible implementations or the eighth possible implementation of the first aspect, in a ninth possible implementation, the access node is further configured to: process received uplink data at a first-part air interface protocol stack, and send the processed uplink data to the user plane anchor connected to the access node; and the user plane anchor connected to the access node is further configured to process the received uplink data at a second-part air interface protocol stack; and/or the user plane anchor is further configured to: process received downlink data at a second-part air interface protocol stack, and send the processed downlink data to an access node connected to a destination terminal of the downlink data; and the access node connected to the destination terminal of the downlink data is further configured to process the received downlink data at a first-part air interface protocol stack.

With reference to the ninth possible implementation of the first aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

With reference to any one of the first aspect, or the first to the tenth possible implementations of the first aspect, in an eleventh possible implementation, the control plane anchor is further configured to perform at least one of the following operations:

performing radio resource control on the terminal connected to the control plane anchor;

performing non-access stratum NAS control on the terminal connected to the control plane anchor; or performing radio resource management on a radio resource managed by the control plane anchor.

According to a second aspect, an embodiment of the present disclosure provides a wireless communications system, and the wireless communications system includes:

the radio access network in any possible implementation of the first aspect provided in the embodiments of the present disclosure;

the first server and the second server that are connected to the radio access network; and at least one terminal that is covered by the radio access network and that communicates with the first server by using the radio access network.

According to a third aspect, an embodiment of the present disclosure provides a radio access network device, a radio access network in which the device is located, a first server, and a second server are connected to each other over the Internet, the first server is configured to provide an application service for a terminal covered by the radio access network, and the second server is configured to perform user information management on the terminal; and the radio access network device includes:

a wireless connection control module, configured to control the terminal and one or more access nodes in the radio access network to establish a wireless connection; and a user information management module, configured to enable, by exchanging information with the second server, the second server to perform user information management on the terminal.

With reference to the third aspect, in a first possible implementation, the wireless connection control module is specifically configured to: configure a transmission parameter of the wireless connection, and establish the wireless connection by using the configured transmission parameter of the wireless connection.

With reference to the third aspect or the first possible implementation of the third aspect, in a second possible implementation, the wireless connection control module is further configured to configure a transmission parameter used when a user plane anchor connected to the terminal performs service data transmission with the terminal; and the user plane anchor is connected to the one or more access nodes, and is configured to: send, to the first server, service data that is forwarded by the one or more access nodes and that is from the terminal; and send, to the terminal by using the one or more access nodes, service data that is received from the first server and that is to be sent to the terminal.

With reference to the third aspect or the first or the second possible implementation of the third aspect, in a third possible implementation, the wireless connection control module is further configured to perform at least one of the following operations:

performing radio resource control on the terminal;

performing non-access stratum NAS control on the terminal; or performing radio resource management on a radio resource managed by the device.

According to a fourth aspect, an embodiment of the present disclosure provides a radio access network device, a radio access network in which the device is located, a first server, and a second server are connected to each other over the Internet, the first server is configured to provide an application service for a terminal covered by the radio access network, and the second server is configured to perform user information management on the terminal;

the device includes a processing module and a transceiver module;

the processing module is configured to control the transceiver module to receive and send data; and the transceiver module is configured to: send, to the first server, service data that is from the terminal and that is forwarded by one or more access nodes in the radio access network that keep a wireless connection to the terminal; and send, to the terminal by using the one or more access nodes, service data that is received from the first server and that is to be sent to the terminal.

With reference to the fourth aspect, in a first possible implementation, the transceiver module is further configured to receive a transmission parameter that is sent by a control plane anchor, of the terminal, in the radio access network and that is used when the radio access network device to forward service data of the terminal; and the processing module is specifically configured to control the transceiver module to forward the service data of the terminal according to the transmission parameter.

With reference to the fourth aspect or the first possible implementation of the fourth aspect, in a second possible implementation, the device is further configured to perform at least one of the following operations:

allocating an IP address to the terminal connected to the device;

aggregating service data of the terminal connected to the device;

filtering service data of the terminal connected to the device; or routing service data of the terminal connected to the device.

According to a fifth aspect, an embodiment of the present disclosure provides a first device in a radio access network, and the first device includes:

a transceiver module, configured to receive first data sent by a terminal by using an air interface; and a processing module, configured to: process, at a first-part air interface protocol stack, the first data received by the transceiver module, and send the processed first data to a second device in the radio access network for processing at a second-part air interface protocol stack.

With reference to the fifth aspect, in a first possible implementation, the transceiver module is further configured to receive second data sent by the second device, where the second data has been processed by the second device at the second-part air interface protocol stack;

the processing module is further configured to: process, at the first-part air interface protocol stack, the second data received by the transceiver module, and then send the processed second data to the terminal by using the transceiver module; and the first data is first service data or a first control message.

With reference to the first possible implementation of the fifth aspect, in a second possible implementation, the first control message includes any one of the following messages:

a wireless connection request message, used to request to establish the wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to the first or the second possible implementation of the fifth aspect, in a third possible implementation, the second data is second service data or a second control message.

With reference to the third possible implementation of the fifth aspect, in a fourth possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to any one of the fifth aspect, or the first to the fourth possible implementations of the fifth aspect, in a fifth possible implementation, the first device is an access node in the radio access network, and keeps a wireless connection to the terminal; and the second device is a user plane anchor of the first device, and is configured to: transmit service data between the terminal and a first server on the Internet, and perform processing at the second-part air interface protocol stack; and the first server is configured to provide an application service for the terminal covered by the radio access network.

With reference to the third possible implementation of the fifth aspect, in a sixth possible implementation, the first control message is the wireless connection complete message;

the transceiver module is further configured to: after sending the first control message to the second device, receive a configuration parameter that is of the first-part air interface protocol stack of the terminal and that is sent by a third device in the radio access network; and the processing module is further configured to: configure the first-part air interface protocol stack according to the configuration parameter received by the transceiver module, and process the first service data, the second service data, a subsequent first control message, and a subsequent second control message of the terminal by using the configured first-part air interface protocol stack.

With reference to the third possible implementation of the fifth aspect, in a seventh possible implementation, the first control message is the wireless connection complete message;

the transceiver module is further configured to: after sending the first control message to the second device, receive a configuration parameter that is of the first-part air interface protocol stack of an air interface bearer of the terminal and that is sent by a third device in the radio access network, where the air interface bearer is used to bear at least one of the first service data, the second service data, a subsequent first control message, or a subsequent second control message of the terminal; and the processing module is further configured to: configure the first-part air interface protocol stack according to the configuration parameter received by the transceiver module, and process the air interface bearer of the terminal by using the configured first-part air interface protocol stack.

With reference to the third possible implementation of the fifth aspect, in an eighth possible implementation, the first control message is the wireless connection complete message, and the transceiver module is further configured to:

before receiving the first control message sent by the terminal by using the air interface, receive a random access preamble sent by the terminal;

after receiving the random access preamble sent by the terminal, obtain, from a third device in the radio access network, a user identifier allocated to the terminal; and send the obtained user identifier to the terminal by using a random access response message, so that the terminal obtains the user identifier.

With reference to any one of the sixth to the eighth possible implementations of the fifth aspect, in a ninth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the fifth aspect, or the first to the ninth possible implementations of the fifth aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to a sixth aspect, an embodiment of the present disclosure provides a second device in a radio access network, and the second device includes:

a transceiver module, configured to receive first data sent by a first device in the radio access network, where the first data is sent by the first device after the first device receives, by using an air interface, the first data from a terminal covered by the radio access network and processes the first data at a first-part air interface protocol stack; and a processing module, configured to process, at a second-part air interface protocol stack, the first data received by the transceiver module.

With reference to the sixth aspect, in a first possible implementation, the transceiver module is further configured to receive second data from a third device in the radio access network; and the processing module is further configured to: process, at the second-part air interface protocol stack, the second data received by the transceiver module, and send the processed second data to the first device.

With reference to the first possible implementation of the sixth aspect, in a second possible implementation, the first data is first service data or a first control message.

With reference to the second possible implementation of the sixth aspect, in a third possible implementation, the first control message includes any one of the following messages:

a wireless connection request message, used to request to establish a wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to any one of the first to the third possible implementations of the sixth aspect, in a fourth possible implementation, the second data is second service data or a second control message.

With reference to the fourth possible implementation of the sixth aspect, in a fifth possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to the fourth possible implementation of the sixth aspect, in a sixth possible implementation, the first control message is the wireless connection complete message;

the transceiver module is further configured to: after sending the first control message to the third device, receive a configuration parameter that is of the second-part air interface protocol stack of the terminal and that is sent by the third device; and the processing module is further configured to: configure the second-part air interface protocol stack according to the configuration parameter received by the transceiver module, and process the first service data, the second service data, a subsequent first control message, and a subsequent second control message of the terminal by using the configured second-part air interface protocol stack.

With reference to the fourth possible implementation of the sixth aspect, in a seventh possible implementation, the first control message is the wireless connection complete message;

the transceiver module is further configured to: after sending the first control message to the third device, receive a configuration parameter that is of the second-part air interface protocol stack of an air interface bearer of the terminal and that is sent by the third device, where the air interface bearer is used to bear at least one of the first service data, the second service data, a subsequent first control message, or a subsequent second control message of the terminal; and the processing module is further configured to: configure the second-part air interface protocol stack according to the configuration parameter received by the transceiver module, and process the air interface bearer of the terminal by using the configured second-part air interface protocol stack.

With reference to any one of the sixth aspect, or the first to the seventh possible implementations of the sixth aspect, in an eighth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the sixth aspect, or the first to the eighth possible implementations of the sixth aspect, in a ninth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to a seventh aspect, an embodiment of the present disclosure provides a third device in a radio access network, and the third device includes:

a transceiver module, configured to receive a first control message from a second device in the radio access network, where the first control message is used to control a wireless connection between a terminal covered by the radio access network and a first device in the radio access network, is processed by the first device at a first-part air interface protocol stack, is processed by the second device at a second-part air interface protocol stack, and then, is sent to the third device; and the first device, the second device, and the third device are connected to each other; and a processing module, configured to process the first control message received by the transceiver module.

With reference to the seventh aspect, in a first possible implementation, the processing module is further configured to:

control the transceiver module to send a second control message to the second device; where the second control message is used to control the wireless connection between the terminal and the first device, so that the second device processes the second control message at the second-part air interface protocol stack, and then, the first device processes the second control message at the first-part air interface protocol stack and then sends the processed second control message to the terminal.

With reference to the first possible implementation of the seventh aspect, in a second possible implementation, the first control message includes any one of the following messages:

a wireless connection request message, used to request to establish the wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to the first or the second possible implementation of the seventh aspect, in a third possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to the second possible implementation of the seventh aspect, in a fourth possible implementation, the first control message is the wireless connection complete message; and the processing module is further configured to: after controlling the transceiver module to receive the first control message, send a configuration parameter of the first-part air interface protocol stack of the terminal to the first device, so that the first device performs the following steps:

configuring the first-part air interface protocol stack according to the received configuration parameter, and processing service data, a subsequent first control message, and a subsequent second control message of the terminal by using the configured first-part air interface protocol stack.

With reference to the second possible implementation of the seventh aspect, in a fifth possible implementation, the first control message is the wireless connection complete message; and the processing module is further configured to: after controlling the transceiver module to receive the first control message, send a configuration parameter of the first-part air interface protocol stack of an air interface bearer of the terminal to the first device, where the air interface bearer is used to bear at least one of service data, a subsequent first control message, or a subsequent second control message of the terminal, so that the first device performs the following steps:

configuring the first-part air interface protocol stack according to the received configuration parameter, and processing the air interface bearer of the terminal by using the configured first-part air interface protocol stack.

With reference to the second possible implementation of the seventh aspect, in a sixth possible implementation, the first control message is the wireless connection complete message, and after the third device receives the first control message, the method further includes:

sending, by the third device, a configuration parameter of the second-part air interface protocol stack of the terminal to the second device, so that the second device performs the following steps:

configuring the second-part air interface protocol stack according to the received configuration parameter, and processing service data, a subsequent first control message, and a subsequent second control message of the terminal by using the configured second-part air interface protocol stack.

With reference to the second possible implementation of the seventh aspect, in a seventh possible implementation, the first control message is the wireless connection complete message; and the processing module is further configured to: after controlling the transceiver module to receive the first control message, send a configuration parameter of the second-part air interface protocol stack of an air interface bearer of the terminal to the second device, where the air interface bearer is used to bear at least one of service data, a subsequent first control message, or a subsequent second control message of the terminal, so that the second device performs the following steps:

configuring the second-part air interface protocol stack according to the received configuration parameter, and processing the air interface bearer of the terminal by using the configured second-part air interface protocol stack.

With reference to the second possible implementation of the seventh aspect, in an eighth possible implementation, the first control message is the wireless connection complete message;

the transceiver module is further configured to: before receiving the first control message, receive a random access preamble sent by the first device, where the random access preamble is sent by the terminal to the first device;

the processing module is further configured to allocate a user identifier to the terminal; and the transceiver module is further configured to send, to the first device by using a random access response message, the user identifier allocated by the processing module, so that the first device forwards the user identifier to the terminal.

With reference to any one of the seventh aspect, or the first to the eighth possible implementations of the seventh aspect, in a ninth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the seventh aspect, or the first to the ninth possible implementations of the seventh aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to an eighth aspect, an embodiment of the present disclosure provides a data processing method, and the method includes:

receiving, by a first device in a radio access network, first data sent by a terminal by using an air interface;

processing, by the first device, the received first data at a first-part air interface protocol stack; and sending, by the first device, the processed first data to a second device in the radio access network for processing at a second-part air interface protocol stack.

With reference to the eighth aspect, in a first possible implementation, the method further includes:

receiving, by the first device, second data sent by the second device, where the second data has been processed by the second device at the second-part air interface protocol stack; and processing, by the first device, the received second data at the first-part air interface protocol stack, and then sending the processed second data to the terminal; where the first data is first service data or a first control message.

With reference to the first possible implementation of the eighth aspect, in a second possible implementation, the first control message includes any one of the following messages:

a wireless connection request message, used to request to establish the wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to the first or the second possible implementation of the eighth aspect, in a third possible implementation, the second data is second service data or a second control message.

With reference to the third possible implementation of the eighth aspect, in a fourth possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to any one of the eighth aspect, or the first to the fourth possible implementations of the eighth aspect, in a fifth possible implementation, the first device is an access node in the radio access network, and keeps a wireless connection to the terminal; and the second device is a user plane anchor of the first device, and is configured to: transmit service data between the terminal and a first server on the Internet, and perform processing at the second-part air interface protocol stack;

and the first server is configured to provide an application service for the terminal covered by the radio access network.

With reference to the third possible implementation of the eighth aspect, in a sixth possible implementation, the first control message is the wireless connection complete message, and after the first device sends the first control message to the second device, the method further includes:

receiving, by the first device, a configuration parameter that is of the first-part air interface protocol stack of the terminal and that is sent by a third device in the radio access network;

configuring, by the first device, the first-part air interface protocol stack according to the received configuration parameter; and processing, by the first device, the first service data, the second service data, a subsequent first control message, and a subsequent second control message of the terminal by using the configured first-part air interface protocol stack.

With reference to the third possible implementation of the eighth aspect, in a seventh possible implementation, the first control message is the wireless connection complete message, and after the first device sends the first control message to the second device, the method further includes:

receiving, by the first device, a configuration parameter that is of the first-part air interface protocol stack of an air interface bearer of the terminal and that is sent by a third device in the radio access network, where the air interface bearer is used to bear at least one of the first service data, the second service data, a subsequent first control message, or a subsequent second control message of the terminal;

configuring, by the first device, the first-part air interface protocol stack according to the received configuration parameter; and processing, by the first device, the air interface bearer of the terminal by using the configured first-part air interface protocol stack.

With reference to the third possible implementation of the eighth aspect, in an eighth possible implementation, the first control message is the wireless connection complete message, and after the first device receives the first control message sent by the terminal by using the air interface, the method further includes:

receiving, by the first device, a random access preamble sent by the terminal;

after receiving the random access preamble sent by the terminal, obtaining, by the first device from a third device in the radio access network, a user identifier allocated to the terminal; and sending, by the first device, the obtained user identifier to the terminal by using a random access response message, so that the terminal obtains the user identifier.

With reference to any one of the sixth to the eighth possible implementations of the eighth aspect, in a ninth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the eighth aspect, or the first to the ninth possible implementations of the eighth aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to a ninth aspect, an embodiment of the present disclosure provides a data processing method, and the method includes:

receiving, by a second device in a radio access network, first data sent by a first device in the radio access network, where the first data is sent by the first device after the first device receives, by using an air interface, the first data from a terminal covered by the radio access network and processes the first data at a first-part air interface protocol stack; and processing, by the second device, the received first data at a second-part air interface protocol stack.

With reference to the ninth aspect, in a first possible implementation, the method further includes:

receiving, by the second device, second data from a third device in the radio access network;

processing, by the second device, the received second data at the second-part air interface protocol stack; and sending, by the second device, the processed second data to the first device.

With reference to the first possible implementation of the ninth aspect, in a second possible implementation, the first data is first service data or a first control message.

With reference to the second possible implementation of the ninth aspect, in a third possible implementation, the first control message includes any one of the following messages:

a wireless connection request message, used to request to establish a wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to any one of the first to the third possible implementations of the ninth aspect, in a fourth possible implementation, the second data is second service data or a second control message.

With reference to the fourth possible implementation of the ninth aspect, in a fifth possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to the fourth possible implementation of the ninth aspect, in a sixth possible implementation, the first control message is the wireless connection complete message, and after the second device sends the first control message to the third device, the method further includes:

receiving, by the second device, a configuration parameter that is of the second-part air interface protocol stack of the terminal and that is sent by the third device;

configuring, by the second device, the second-part air interface protocol stack according to the received configuration parameter; and processing, by the second device, the first service data, the second service data, a subsequent first control message, and a subsequent second control message of the terminal by using the configured second-part air interface protocol stack.

With reference to the fourth possible implementation of the ninth aspect, in a seventh possible implementation, the first control message is the wireless connection complete message, and after the second device sends the first control message to the third device, the method further includes:

receiving, by the second device, a configuration parameter that is of the second-part air interface protocol stack of an air interface bearer of the terminal and that is sent by the third device, where the air interface bearer is used to bear at least one of the first service data, the second service data, a subsequent first control message, or a subsequent second control message of the terminal;

configuring, by the second device, the second-part air interface protocol stack according to the received configuration parameter; and processing, by the second device, the air interface bearer of the terminal by using the configured second-part air interface protocol stack.

With reference to any one of the ninth aspect, or the first to the seventh possible implementations of the ninth aspect, in an eighth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the ninth aspect, or the first to the eighth possible implementations of the ninth aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to a tenth aspect, an embodiment of the present disclosure provides a message processing method, and the method includes:

receiving, by a third device in a radio access network, a first control message from a second device in the radio access network; where the first control message is used to control a wireless connection between a terminal covered by the radio access network and a first device in the radio access network, is processed by the first device at a first-part air interface protocol stack, is processed by the second device at a second-part air interface protocol stack, and then, is sent to the third device; and the first device, the second device, and the third device are connected to each other; and processing, by the third device, the received first control message.

With reference to the tenth aspect, in a first possible implementation, the method further includes:

sending, by the third device, a second control message to the second device, where the second control message is used to control the wireless connection between the terminal and the first device, so that the second device processes the second control message at the second-part air interface protocol stack, and then, the first device processes the second control message at the first-part air interface protocol stack and then sends the processed second control message to the terminal.

With reference to the first possible implementation of the tenth aspect, in a second possible implementation, the first control message includes any one of the following messages:

a wireless connection request message, used to request to establish the wireless connection; or a wireless connection complete message, used to indicate that wireless connection setup is completed; or a security mode complete message, used to indicate that security mode configuration of the wireless connection is completed; or a wireless connection reconfiguration complete message, used to indicate that the wireless connection reconfiguration is completed or wireless measurement configuration of the wireless connection is completed.

With reference to the first or the second possible implementation of the tenth aspect, in a third possible implementation, the second control message includes any one of the following messages:

a wireless connection setup message, used to configure a parameter of the wireless connection; or a security mode command message, used to configure a security-related parameter of the wireless connection; or a wireless connection reconfiguration message, used to reconfigure the wireless connection or used to configure a wireless measurement of the wireless connection.

With reference to the second possible implementation of the tenth aspect, in a fourth possible implementation, the first control message is the wireless connection complete message, and after the third device receives the first control message, the method further includes:

sending, by the third device, a configuration parameter of the first-part air interface protocol stack of the terminal to the first device, so that the first device performs the following steps:

configuring the first-part air interface protocol stack according to the received configuration parameter, and processing service data, a subsequent first control message, and a subsequent second control message of the terminal by using the configured first-part air interface protocol stack.

With reference to the second possible implementation of the tenth aspect, in a fifth possible implementation, the first control message is the wireless connection complete message, and after the third device receives the first control message, the method further includes:

sending, by the third device, a configuration parameter of the first-part air interface protocol stack of an air interface bearer of the terminal to the first device, where the air interface bearer is used to bear at least one of service data, a subsequent first control message, or a subsequent second control message of the terminal, so that the first device performs the following steps:

configuring the first-part air interface protocol stack according to the received configuration parameter, and processing the air interface bearer of the terminal by using the configured first-part air interface protocol stack.

With reference to the second possible implementation of the tenth aspect, in a sixth possible implementation, the first control message is the wireless connection complete message, and after the third device receives the first control message, the method further includes:

sending, by the third device, a configuration parameter of the second-part air interface protocol stack of the terminal to the second device, so that the second device performs the following steps:

configuring the second-part air interface protocol stack according to the received configuration parameter, and processing service data, a subsequent first control message, and a subsequent second control message of the terminal by using the configured second-part air interface protocol stack.

With reference to the second possible implementation of the tenth aspect, in a seventh possible implementation, the first control message is the wireless connection complete message, and after the third device receives the first control message, the method further includes:

sending, by the third device, a configuration parameter of the second-part air interface protocol stack of an air interface bearer of the terminal to the second device, where the air interface bearer is used to bear at least one of service data, a subsequent first control message, or a subsequent second control message of the terminal, so that the second device performs the following steps:

configuring the second-part air interface protocol stack according to the received configuration parameter, and processing the air interface bearer of the terminal by using the configured second-part air interface protocol stack.

With reference to the second possible implementation of the tenth aspect, in an eighth possible implementation, the first control message is the wireless connection complete message, and before the third device receives the first control message, the method further includes:

receiving, by the third device, a random access preamble sent by the first device, where the random access preamble is sent by the terminal to the first device;

allocating, by the third device, a user identifier to the terminal; and sending, by the third device, the obtained user identifier to the first device by using a random access response message, so that the first device forwards the user identifier to the terminal.

With reference to any one of the tenth aspect, or the first to the eighth possible implementations of the tenth aspect, in a ninth possible implementation, the first device is an access node in the radio access network, and keeps a wireless connection to the terminal;

the second device is a user plane anchor of the first device, and is configured to: transmit service data between the terminal and a first server on the Internet, and perform processing at the second-part air interface protocol stack; and the first server is configured to provide an application service for the terminal covered by the radio access network; and the second device is a control plane anchor of the first device, and is configured to: control the terminal and the access node to establish a wireless connection, and enable, by exchanging information with the second server, the second server to perform user information management on the terminal; and the second server is configured to perform user information management on the terminal covered by the radio access network.

With reference to any one of the tenth aspect, or the first to the ninth possible implementations of the tenth aspect, in a tenth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

According to an eleventh aspect, an embodiment of the present disclosure provides a second device in a radio access network, and the second device includes:

a transceiver module, configured to: when a received IP packet has no corresponding air interface bearer, send a new service report to a third device in the radio access network to indicate that the IP packet has no corresponding air interface bearer; and receive a response message sent by the third device in response to the new service report; and a processing module, configured to process the IP packet according to the response message received by the transceiver module.

With reference to the eleventh aspect, in a first possible implementation, the transceiver module is further configured to receive the IP packet before sending the new service report to the third device; and the processing module is further configured to: when a prestored correspondence between a quintuple of an IP packet and an air interface bearer does not include a quintuple of the IP packet, determine that the IP packet has no corresponding air interface bearer.

With reference to the eleventh aspect or the first possible implementation of the eleventh aspect, in a second possible implementation, the new service report includes the IP packet and/or the quintuple of the IP packet, so that the third device determines the IP packet according to the new service report.

With reference to the eleventh aspect or the first or the second possible implementation of the eleventh aspect, in a third possible implementation, the response message is used to indicate that the IP packet is rejected; and the processing module is specifically configured to discard the IP packet.

With reference to the third possible implementation of the eleventh aspect, in a fourth possible implementation, the processing module is specifically configured to: record the quintuple of the IP packet, and discard a subsequently received IP packet that has the recorded quintuple of the IP packet.

With reference to any one of the eleventh aspect, or the first to the fourth possible implementations of the eleventh aspect, in a fifth possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

With reference to the eleventh aspect or the first or the second possible implementation of the eleventh aspect, in a sixth possible implementation, the response message is used to indicate that the IP packet is admitted and instruct to newly establish an air interface bearer used to transmit the IP packet; and the processing module is specifically configured to:

complete configuration of a second-part air interface protocol stack of the newly established air interface bearer according to a parameter that is of the newly established air interface bearer and that is included in the response message;

control the transceiver module to send the received response message to a first device that is in the radio access network and that keeps a wireless connection to a terminal corresponding to the IP packet, to instruct the first device to complete configuration of a first-part air interface protocol stack of the newly established air interface bearer according to the parameter that is of the newly established air interface bearer and that is included in the response message; and process the IP packet by using the configured second-part air interface protocol stack.

With reference to the eleventh aspect or the first or the second possible implementation of the eleventh aspect, in a seventh possible implementation, the response message is used to indicate that the IP packet is admitted and instruct to reconfigure an existing air interface bearer and use the reconfigured air interface bearer to transmit the IP packet; and the processing module is specifically configured to:

complete configuration of a second-part air interface protocol stack of the existing air interface bearer according to a parameter that is of the reconfigured existing air interface bearer and that is included in the response message;

control the transceiver module to send the received response message to a first device that is in the radio access network and that keeps a wireless connection to a terminal corresponding to the IP packet, to instruct the first device to complete configuration of a first-part air interface protocol stack of the existing air interface bearer according to the parameter that is of the reconfigured existing air interface bearer and that is included in the response message; and process the IP packet by using the second-part air interface protocol stack of the reconfigured existing air interface bearer.

With reference to the eleventh aspect or the first or the second possible implementation of the eleventh aspect, in an eighth possible implementation, the response message is used to indicate that the IP packet is admitted and instruct to use a default air interface bearer to transmit the IP packet; and the processing module is specifically configured to:

complete configuration of a second air interface protocol stack of the default air interface bearer;

control the transceiver module to send the received response message to a first device that is in the radio access network and that keeps a wireless connection to a terminal corresponding to the IP packet, to instruct the first device to complete configuration of a first-part air interface protocol stack of the default air interface bearer; and process the IP packet by using the second-part air interface protocol stack of the default bearer.

With reference to any one of the sixth to the eighth possible implementations of the eleventh aspect, in a ninth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

With reference to any one of the sixth to the ninth possible implementations of the eleventh aspect, in a tenth possible implementation, the first device is an access node in the radio access network, and keeps a wireless connection to a terminal covered by the radio access network;

the second device is a user plane anchor in the radio access network, and is configured to transmit an IP packet between the access node in the radio access network and a first server; and the first server is configured to provide an application service for the terminal covered by the radio access network; and the third device is a control plane anchor in the radio access network, and is configured to control the terminal covered by the radio access network and the access node in the radio access network to establish a wireless connection.

According to a twelfth aspect, an embodiment of the present disclosure provides a third device in a radio access network, and the third device includes:

a transceiver module, configured to receive a new service report sent by a second device in the radio access network, where the new service report is used to indicate that a downlink IP packet received by the second device has no corresponding air interface bearer; and a processing module, configured to: perform service admission control on the IP packet, and generate a response message according to a result of the service admission control; where the transceiver module is further configured to send the response message generated by the processing module to the second device, to instruct the second device to process the IP packet according to the response message.

With reference to the twelfth aspect, in a first possible implementation, the new service report includes:

the IP packet; and/or a quintuple of the IP packet.

With reference to the first possible implementation of the twelfth aspect, in a second possible implementation, the processing module is specifically configured to:

determine the IP packet according to the new service report;

obtain subscription information of a terminal corresponding to the IP packet; and when a service corresponding to the IP packet is a service allowed by the subscription information, determine to admit the IP packet; or when a service corresponding to the IP packet is not a service allowed by the subscription information, determine to reject the IP packet.

With reference to the second possible implementation of the twelfth aspect, in a third possible implementation, the processing module is further configured to: if the processing module determines to admit the IP packet, after performing service admission control on the IP packet and before generating the response message, determine a quality of service QoS requirement of the service corresponding to the IP packet; and determine, according to the determined QoS requirement, an air interface bearer used to transmit the IP packet.

With reference to the third possible implementation of the twelfth aspect, in a fourth possible implementation, the processing module is specifically configured to:

determine, according to the determined QoS requirement, that a newly established air interface bearer is to be used to transmit the IP packet; and the response message is specifically used to indicate that the IP packet is admitted and instruct to use the newly established air interface bearer to transmit the IP packet, and the response message includes a parameter of the newly established air interface bearer.

With reference to the third possible implementation of the twelfth aspect, in a fifth possible implementation, the processing module is specifically configured to:

determine, according to the determined QoS requirement, that an existing air interface bearer is to be used to transmit the IP packet; and the response message is specifically used to indicate that the IP packet is admitted and instruct to reconfigure the existing air interface bearer and then transmit the IP packet, and the response message includes a parameter of the reconfigured existing air interface bearer.

With reference to the third possible implementation of the twelfth aspect, in a sixth possible implementation, the processing module is specifically configured to:

determine, according to the determined QoS requirement, that a default air interface bearer is to be used to transmit the IP packet; and the response message is specifically used to indicate that the IP packet is admitted and instruct to use a default air interface bearer to transmit the IP packet.

With reference to any one of the twelfth aspect, or the first to the sixth possible implementations of the twelfth aspect, in a seventh possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

According to a thirteenth aspect, an embodiment of the present disclosure provides an Internet Protocol IP packet processing method, and the method includes:

when a received IP packet has no corresponding air interface bearer, sending, by a second device in a radio access network, a new service report to a third device in the radio access network to indicate that the IP packet has no corresponding air interface bearer;

receiving, by the second device, a response message sent by the third device in response to the new service report; and processing, by the second device, the IP packet according to the received response message.

With reference to the thirteenth aspect, in a first possible implementation, before the second device sends the new service report to the third device, the method further includes: receiving, by the second device, the IP packet; and when a prestored correspondence between a quintuple of an IP packet and an air interface bearer does not include a quintuple of the IP packet, determining, by the second device, that the IP packet has no corresponding air interface bearer.

With reference to the thirteenth aspect or the first possible implementation of the thirteenth aspect, in a second possible implementation, the new service report includes the IP packet and/or the quintuple of the IP packet, so that the third device determines the IP packet according to the new service report.

With reference to the thirteenth aspect or the first or the second possible implementation of the thirteenth aspect, in a third possible implementation, the response message is used to indicate that the IP packet is rejected; and the processing, by the second device, the IP packet according to the received response message includes:

discarding, by the second device, the IP packet.

With reference to the third possible implementation of the thirteenth aspect, in a fourth possible implementation, the processing, by the second device, the IP packet according to the received response message further includes:

recording, by the second device, the quintuple of the IP packet, and discarding a subsequently received IP packet that has the recorded quintuple of the IP packet.

With reference to any one of the thirteenth aspect, or the first to the fourth possible implementations of the thirteenth aspect, in a fifth possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

With reference to the thirteenth aspect or the first or the second possible implementation of the thirteenth aspect, in a sixth possible implementation, the response message is used to indicate that the IP packet is admitted and instruct to newly establish an air interface bearer used to transmit the IP packet; and the processing, by the second device, the IP packet according to the received response message includes:

completing, by the second device, configuration of a second-part air interface protocol stack of the newly established air interface bearer according to a parameter that is of the newly established air interface bearer and that is included in the response message;

controlling, by the second device, the received response message to a first device that is in the radio access network and that keeps a wireless connection to a terminal corresponding to the IP packet, to instruct the first device to complete configuration of a first-part air interface protocol stack of the newly established air interface bearer according to the parameter that is of the newly established air interface bearer and that is included in the response message; and processing, by the second device, the IP packet by using the configured second-part air interface protocol stack.

With reference to the thirteenth aspect or the first or the second possible implementation of the thirteenth aspect, in a seventh possible implementation, the response message is used to indicate that the IP packet is admitted and instruct to reconfigure an existing air interface bearer and use the reconfigured air interface bearer to transmit the IP packet; and the processing, by the second device, the IP packet according to the received response message includes:

completing, by the second device, configuration of a second-part air interface protocol stack of the existing air interface bearer according to a parameter that is of the reconfigured existing air interface bearer and that is included in the response message;

sending, by the second device, the received response message to a first device that is in the radio access network and that keeps a wireless connection to a terminal corresponding to the IP packet, to instruct the first device to complete configuration of a first-part air interface protocol stack of the existing air interface bearer according to the parameter that is of the reconfigured existing air interface bearer and that is included in the response message; and processing, by the second device, the IP packet by using the second-part air interface protocol stack of the reconfigured existing air interface bearer.

With reference to the thirteenth aspect or the first or the second possible implementation of the thirteenth aspect, in an eighth possible implementation, the response message is used to indicate that the IP packet is admitted and instruct to use a default air interface bearer to transmit the IP packet; and the processing, by the second device, the IP packet according to the received response message includes:

completing, by the second device, configuration of a second air interface protocol stack of the default air interface bearer;

sending, by the second device, the received response message to a first device that is in the radio access network and that keeps a wireless connection to a terminal corresponding to the IP packet, to instruct the first device to complete configuration of a first-part air interface protocol stack of the default air interface bearer; and processing, by the second device, the IP packet by using the second-part air interface protocol stack of the default bearer.

With reference to any one of the sixth to the eighth possible implementations of the thirteenth aspect, in a ninth possible implementation, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

With reference to any one of the sixth to the ninth possible implementations of the thirteenth aspect, in a tenth possible implementation, the first device is an access node in the radio access network, and keeps a wireless connection to a terminal covered by the radio access network;

the second device is a user plane anchor in the radio access network, and is configured to transmit an IP packet between the access node in the radio access network and a first server; and the first server is configured to provide an application service for the terminal covered by the radio access network; and the third device is a control plane anchor in the radio access network, and is configured to control the terminal covered by the radio access network and the access node in the radio access network to establish a wireless connection.

According to a fourteenth aspect, an embodiment of the present disclosure provides an Internet Protocol IP packet processing method, and the method includes:

receiving, by a third device in the radio access network, a new service report sent by a second device in the radio access network, where the new service report is used to indicate that a downlink IP packet received by the second device has no corresponding air interface bearer;

performing, by the third device, service admission control on the IP packet, and generating a response message according to a result of the service admission control; and sending, by the third device, the generated response message to the second device, to instruct the second device to process the IP packet according to the response message.

With reference to the fourteenth aspect, in a first possible implementation, the new service report includes:

the IP packet; and/or a quintuple of the IP packet.

With reference to the first possible implementation of the fourteenth aspect, in a second possible implementation, the performing, by the third device, service admission control on the IP packet includes:

determining, by the third device, the IP packet according to the received new service report;

obtaining, by the third device, subscription information of a terminal corresponding to the IP packet; and when a service corresponding to the IP packet is a service allowed by the subscription information, determining, by the third device, to admit the IP packet; or when a service corresponding to the IP packet is not a service allowed by the subscription information, determining to reject the IP packet.

With reference to the second possible implementation of the fourteenth aspect, in a third possible implementation, if the third device determines to admit the IP packet, after service admission control is performed on the IP packet and before the response message is generated, the method further includes:

determining, by the third device, a quality of service QoS requirement of the service corresponding to the IP packet; and determining, by the third device according to the determined QoS requirement, an air interface bearer used to transmit the IP packet.

With reference to the third possible implementation of the fourteenth aspect, in a fourth possible implementation, the determining, by the third device according to the determined QoS requirement, an air interface bearer used to transmit the IP packet includes:

determining, by the third device according to the determined QoS requirement, that a newly established air interface bearer is to be used to transmit the IP packet; where the response message is specifically used to indicate that the IP packet is admitted and instruct to use the newly established air interface bearer to transmit the IP packet, and the response message includes a parameter of the newly established air interface bearer.

With reference to the third possible implementation of the fourteenth aspect, in a fifth possible implementation, the determining, by the third device according to the determined QoS requirement, an air interface bearer used to transmit the IP packet includes:

determining, by the third device according to the determined QoS requirement, that an existing air interface bearer is to be used to transmit the IP packet; where the response message is specifically used to indicate that the IP packet is admitted and instruct to reconfigure the existing air interface bearer and then transmit the IP packet, and the response message includes a parameter of the reconfigured existing air interface bearer.

With reference to the third possible implementation of the fourteenth aspect, in a sixth possible implementation, the determining, by the third device according to the determined QoS requirement, an air interface bearer used to transmit the IP packet includes:

determining, by the third device according to the determined QoS requirement, that a default air interface bearer is to be used to transmit the IP packet; where the response message is specifically used to indicate that the IP packet is admitted and instruct to use a default air interface bearer to transmit the IP packet.

With reference to any one of the fourteenth aspect, or the first to the sixth possible implementations of the fourteenth aspect, in a seventh possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

According to a fifteenth aspect, an embodiment of the present disclosure provides a second device in a radio access network, and the second device includes:

a transceiver module, configured to receive an IP packet; and a processing module, configured to: determine whether a quintuple of the IP packet is a quintuple that does not occur; and if the quintuple of the IP packet is a quintuple that does not occur, determine whether to admit the IP packet, and process the IP packet according to a result of determining whether to admit the IP packet.

With reference to the fifteenth aspect, in a first possible implementation, the processing module is specifically configured to:

when a prestored quintuple of an IP packet includes the quintuple of the IP packet, determine, by the second device, that the quintuple of the IP packet is a quintuple that occurs; or when a prestored quintuple of an IP packet does not include the quintuple of the IP packet, determine that the quintuple of the IP packet is a quintuple that does not occur.

With reference to the fifteenth aspect or the first possible implementation of the fifteenth aspect, in a second possible implementation, the processing module is specifically configured to:

obtain subscription information of a terminal corresponding to the IP packet; and when a service corresponding to the IP packet is a service allowed by the subscription information, determine to admit the IP packet; or when a service corresponding to the IP packet is not a service allowed by the subscription information, determine to reject the IP packet.

With reference to the fifteenth aspect or the first or the second possible implementation of the fifteenth aspect, in a third possible implementation, the processing module is specifically configured to:

discard the IP packet when determining to reject the IP packet.

With reference to the third possible implementation of the fifteenth aspect, in a fourth possible implementation, the processing module is further configured to: after discarding the IP packet, discard a subsequently received IP packet that has a same quintuple as the IP packet.

With reference to the fifteenth aspect or the first or the second possible implementation of the fifteenth aspect, in a fifth possible implementation, the processing module is specifically configured to:

when determining to admit the IP packet, determine a quality of service QoS requirement of the service corresponding to the IP packet;

determine, according to the determined QoS requirement, an air interface bearer used to transmit the IP packet; and control the transceiver module to transmit the IP packet by using the air interface bearer determined by the processing module.

With reference to the fifth possible implementation of the fifteenth aspect, in a sixth possible implementation, the processing module is further configured to:

after controlling the transceiver module to transmit the IP packet by using the air interface bearer determined by the processing module, control the transceiver module to transmit, by using the air interface bearer determined by the processing module, a subsequently received IP packet that has a same quintuple as the IP packet.

With reference to the fifth or the sixth possible implementation of the fifteenth aspect, in a seventh possible implementation, the processing module is specifically configured to:

determine, according to the subscription information of the terminal corresponding to the IP packet and/or differentiated services code point DSCP information in a header of the IP packet, the quality of service QoS requirement of the service corresponding to the IP packet.

With reference to the seventh possible implementation of the fifteenth aspect, in an eighth possible implementation, if the processing module is specifically configured to: determine, according to the subscription information, the quality of service QoS requirement of the service corresponding to the IP packet; or determine, according to the subscription information and the DSCP information, the quality of service QoS requirement of the service corresponding to the IP packet, the processing module is further configured to obtain the subscription information before determining the quality of service QoS requirement of the service corresponding to the IP packet.

With reference to the second or the eighth possible implementation of the fifteenth aspect, in a ninth possible implementation, the processing module is specifically configured to:

control the transceiver module to obtain the subscription information from a third device in the radio access network; or obtain the subscription information from information stored in the second device.

With reference to the ninth possible implementation of the fifteenth aspect, in a tenth possible implementation, the processing module is specifically configured to:

control the transceiver module to send a subscription information request message to the third device, where the message carries terminal identification information, and the terminal identification information includes at least one of the following information:

the IP packet;
the quintuple of the IP packet;
a source IP address of the IP packet; or
a destination IP address of the IP packet; and
receive, by using the transceiver module, the subscription information determined by the third device according to the terminal identification information.

With reference to any one of the fifteenth aspect, or the first to the eighth possible implementations of the fifteenth aspect, in an eleventh possible implementation, the second device is a user plane anchor in the radio access network, and is configured to transmit an IP packet between an access node in the radio access network and a first server;

the access node keeps a wireless connection to a terminal covered by the radio access network; and the first server is configured to provide an application service for the terminal covered by the radio access network.

With reference to the ninth or the tenth possible implementation of the fifteenth aspect, in a twelfth possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

According to a sixteenth aspect, an embodiment of the present disclosure provides an Internet Protocol IP packet processing method, and the method includes:

receiving, by a second device in a radio access network, an IP packet;

determining, by the second device, whether a quintuple of the IP packet is a quintuple that does not occur; and if the quintuple of the IP packet is a quintuple that does not occur, determining, by the second device, whether to admit the IP packet, and processing the IP packet according to a result of determining whether to admit the IP packet.

With reference to the sixteenth aspect, in a first possible implementation, the determining, by the second device, whether the IP packet is a quintuple that does not occur includes:

when a prestored quintuple of an IP packet includes the quintuple of the IP packet, determining, by the second device, that the quintuple of the IP packet is a quintuple that occurs; or when a prestored quintuple of an IP packet does not include the quintuple of the IP packet, determining that the quintuple of the IP packet is a quintuple that does not occur.

With reference to the sixteenth aspect or the first possible implementation of the sixteenth aspect, in a second possible implementation, the determining, by the second device, whether to admit the IP packet includes:

obtaining, by the second device, subscription information of a terminal corresponding to the IP packet; and when a service corresponding to the IP packet is a service allowed by the subscription information, determining, by the second device, to admit the IP packet; or when a service corresponding to the IP packet is not a service allowed by the subscription information, determining to reject the IP packet.

With reference to the sixteenth aspect or the first or the second possible implementation of the sixteenth aspect, in a third possible implementation, the processing, by the second device, the IP packet according to a determining result includes:

discarding, by the second device, the IP packet when determining to reject the IP packet.

With reference to the third possible implementation of the sixteenth aspect, in a fourth possible implementation, after the discarding, by the second device, the IP packet, the method further includes:

discarding, by the second device, a subsequently received IP packet that has a same quintuple as the IP packet.

With reference to the sixteenth aspect or the first or the second possible implementation of the sixteenth aspect, in a fifth possible implementation, the processing, by the second device, the IP packet according to a determining result includes:

when determining to admit the IP packet, determining, by the second device, a quality of service QoS requirement of the service corresponding to the IP packet;

determining, by the second device according to the determined QoS requirement, an air interface bearer used to transmit the IP packet; and transmitting, by the second device, the IP packet by using the determined air interface bearer.

With reference to the fifth possible implementation of the sixteenth aspect, in a sixth possible implementation, after the transmitting, by the second device, the IP packet by using the determined air interface bearer, the method further includes:

transmitting, by the second device by using the determined air interface bearer, a subsequently received IP packet that has a same quintuple as the IP packet.

With reference to the fifth or the sixth possible implementation of the sixteenth aspect, in a seventh possible implementation, the determining, by the second device, a quality of service QoS requirement of the service corresponding to the IP packet includes:

determining, by the second device according to the subscription information of the terminal corresponding to the IP packet and/or differentiated services code point DSCP information in a header of the IP packet, the quality of service QoS requirement of the service corresponding to the IP packet.

With reference to the seventh possible implementation of the sixteenth aspect, in an eighth possible implementation, if the second device determines, according to the subscription information, the quality of service QoS requirement of the service corresponding to the IP packet; or if the second device determines, according to the subscription information and the DSCP information, the quality of service QoS requirement of the service corresponding to the IP packet, before the determining, by the second device, a quality of service QoS requirement of the service corresponding to the IP packet, the method further includes:

obtaining, by the second device, the subscription information.

With reference to the second or the eighth possible implementation of the sixteenth aspect, in a ninth possible implementation, the obtaining, by the second device, the subscription information includes:

obtaining, by the second device, the subscription information from a third device in the radio access network; or obtaining, by the second device, the subscription information from information stored in the second device.

With reference to the ninth possible implementation of the sixteenth aspect, in a tenth possible implementation, the obtaining, by the second device, the subscription information from the third device includes:

sending, by the second device, a subscription information request message to the third device, where the message carries terminal identification information, and the terminal identification information includes at least one of the following information:

the IP packet;
the quintuple of the IP packet;
a source IP address of the IP packet; or
a destination IP address of the IP packet; and
receiving, by the second device, the subscription information determined by the third device according to the terminal identification information.

With reference to any one of the sixteenth aspect, or the first to the eighth possible implementations of the sixteenth aspect, in an eleventh possible implementation, the second device is a user plane anchor in the radio access network, and is configured to transmit an IP packet between an access node in the radio access network and a first server;

the access node keeps a wireless connection to a terminal covered by the radio access network; and the first server is configured to provide an application service for the terminal covered by the radio access network.

With reference to the ninth or the tenth possible implementation of the sixteenth aspect, in a twelfth possible implementation, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network; and the third device is a control plane anchor in the radio access network, and is configured to control the terminal covered by the radio access network and the access node in the radio access network to establish a wireless connection.

In any one of the solutions provided in the first aspect to the fourth aspect, the foregoing flattened network architecture is used, so that communications links between an eNB and an MME, the MME and an HSS, and the MME and a serving gateway are prevented from being processing capability bottlenecks of a wireless communications system, a signaling transmission delay is effectively reduced, and a network paralysis risk is also reduced.

In any one of the solutions provided in the fifth aspect to the tenth aspect, a first device and a second device in a radio access network jointly implement air interface protocol stack processing, so that processing load of either device is reduced.

When any one of the solutions provided in the fifth aspect to the tenth aspect is applied to a scenario in which a control plane anchor and a user plane anchor are separated from each other, centralized control and service data offloading can be implemented.

In an optional implementation solution, a first device, a second device, and a third device in a radio access network may separately perform partial air interface protocol stack processing, and the third device may separately configure parameters of air interface protocol stacks of the first device and the second device. When the first device is an access node, the second device is a user plane anchor, and the third device is a control plane anchor, centralized control can be implemented by the control plane anchor, and proximity-based offloading can be implemented on service data by the user plane anchor.

Any one of the solutions provided in the eleventh aspect to the sixteenth aspect is applied, so that complex quality of service (Quality of Service, QoS) management in a current LTE system can be avoided. Radio access network devices are used to replace core network devices such as a PCRF, a PDN GW, and an MME in the current LTE system, so that simple QoS management is implemented.

DETAILED DESCRIPTION

Embodiments of the present disclosure provide a radio access network device, a data processing method, and an IP packet processing method, so as to resolve a problem of relatively heavy processing load that is caused because an eNB needs to complete air interface protocol stack processing in a current EPC system.

Figure 1:
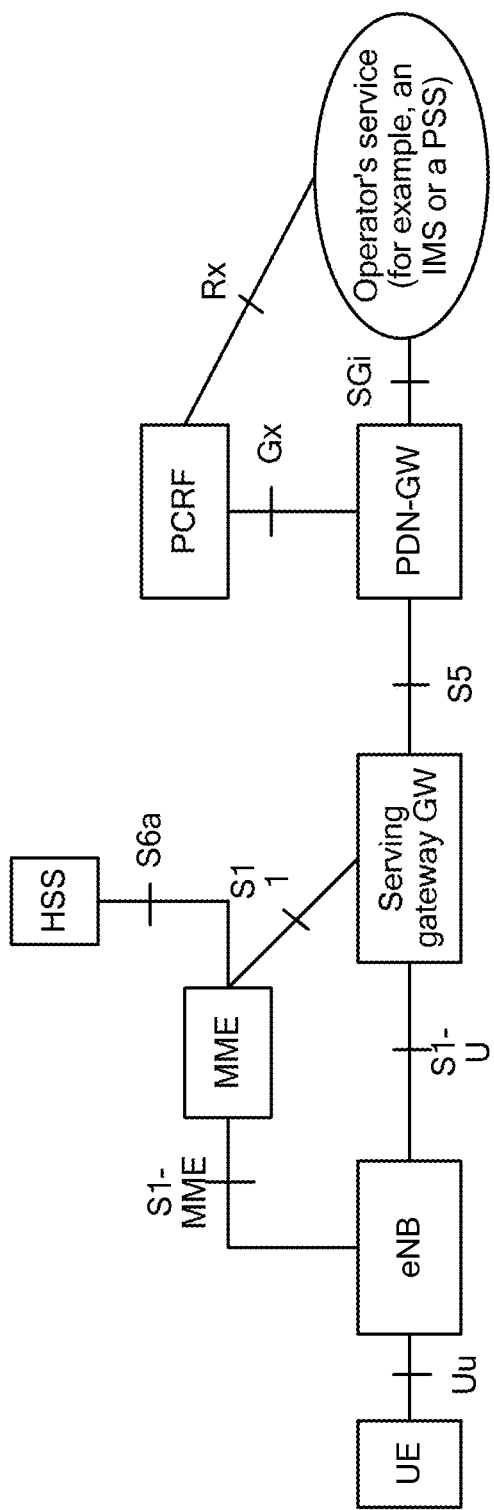
FIG. 1 is a network architecture diagram of an EPS.

As shown in FIG. 1, in an evolved packet system (EPS for short), user equipment (UE for short) is connected to an evolved NodeB (eNB for short) by using a Uu interface, and accesses a network by using the eNB.

The eNB is connected to a mobility management entity (MME for short) by using an S1-MME interface, and is connected to a serving gateway (Serving GW for short) by using an S1-U interface. The MME performs mobility control on the UE, and the serving gateway mainly routes and forwards a data packet for the UE.

A packet data network gateway (PDN-GW for short) is connected to the serving gateway by using an S5 interface, and implements functions such as user-based packet filtering and Internet Protocol (IP for short) address allocation.

The PDN-GW is connected to an operator's service (operator's services) device by using an SGi interface. The operator's service device may include an IP multimedia subsystem (IMS for short), a packet switching service (PSS for short) device, and the like. The PDN-GW is connected to a policy and charging rules function (PCRF for short) by using a Gx interface. The PCRF provides policy and charging control decisions and the like. A home subscriber server (HSS for short) provides a user database that may include a configuration file of a user, executes user identity authentication and authorization, and may provide information about a physical location of the user.

An S6a interface is an interface between the MME and the HSS, and is used to implement Authentication, Authorization and Accounting (Authentication, Authorization and Accounting, AAA) functions. Diameter protocol signaling is mainly transmitted on the interface.

In the current EPS system, the eNB needs to complete air interface protocol stack processing, and processing load is relatively heavy.

A radio access network provided in the embodiments of the present disclosure, a first server, and a second server are connected to each other. The first server is configured to provide an application service for a terminal covered by the radio access network, and the second server is configured to perform user information management on the terminal covered by the radio access network.

The radio access network provided in the embodiments of the present disclosure includes:

at least one access node, where the at least one access node keeps a wireless connection to at least one terminal in the radio access network, and is configured to implement communication between the at least one terminal and the first server by using the wireless connection between the at least one access node and the at least one terminal; and a control plane anchor connected to the at least one access node, where the control plane anchor is configured to:

control the terminal covered by the radio access network and one or more access nodes in the at least one access node to establish a wireless connection; and enable, by exchanging information with the second server, the second server to perform user information management on the terminal keeping a wireless connection to the at least one access node.

Compared with a current EPS, a wireless communications system including the radio access network provided in the embodiments of the present disclosure implements a flattened network architecture, and core network functional entities such as a PDN-GW, an S-GW, a PCRF, and an MME in the current EPS are deleted. Network-side entities may include only a radio access network and a second server, and the access network may include an access node and a control plane anchor. Functions of network functional entities such as an eNB and an MME in the EPS shown in FIG. 1 may be integrated into the control plane anchor. Therefore, a flattened network in the entire wireless communications system is implemented.

The flattened network architecture is used, so that communications links between an eNB and an MME, the MME and an HSS, and the MME and a serving gateway are prevented from being processing capability bottlenecks of a wireless communications system, a signaling transmission delay is effectively reduced, and a network paralysis risk is also reduced.

Further, the embodiments of the present disclosure provide a wireless connection control method and a radio access network device. A first device and a second device in a radio access network jointly implement air interface protocol stack processing, so that processing load of either device is reduced.

When the wireless connection control method is applied to a scenario in which a control plane anchor and a user plane anchor are separated from each other, centralized control and service data offloading can be implemented.

In an optional implementation solution, a first device, a second device, and a third device in a radio access network may separately perform partial air interface protocol stack processing, and the third device may separately configure parameters of air interface protocol stacks of the first device and the second device. When the first device is an access node, the second device is a user plane anchor, and the third device is a control plane anchor, centralized control can be implemented by the control plane anchor, and proximity-based offloading can be implemented on service data by the user plane anchor.

Still further, the embodiments of the present disclosure provide an IP packet processing method, a server, and a radio access network device, so as to avoid a complex QoS management process in a current LTE system. A user plane anchor or a control plane anchor is used to replace core network devices such as a PCRF, a PDN GW, and an MME in the current LTE system, so that simple QoS management is implemented.

Basic concepts used in the embodiments of the present disclosure are first described in the following.

These basic concepts include a wireless communications system, a wireless communications standard, a base station, a terminal, a first server, a second server, an access node, a control plane anchor, a user plane anchor, radio resource control (Radio Resource Control, RRC) signaling, and quality of service (Quality of Service, QoS) management. These concepts are described one by one in the following.

1. Wireless Communications System

Figure 2:
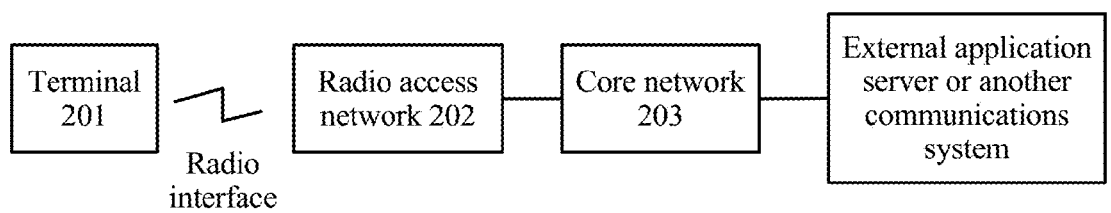
FIG. 2 is a network architecture diagram of a wireless communications system.

Generally, the wireless communications system is a system in which transmission is performed in some or all communications links wirelessly. As shown in FIG. 2, a common wireless communications system generally includes:

at least one terminal 201, a radio access network 202, and a core network 203.

The core network 203 is connected to an external application server or another communications system, implements communication between the terminal 201 and the application server and/or the another communications system, and manages user information, quality of service, and the like of the terminal 201.

The radio access network 202 keeps a wireless connection to the terminal 201 by using an air interface (air interface) such as a Uu interface, so that the terminal 201 can access the network.

A wireless connection may also be referred to as an air interface connection. The terminal keeps a wireless connection to a base station or an access node in the radio access network, and may communicate with the base station by using the wireless connection.

2. Wireless Communications Standard

Different wireless communications standards may be used in different wireless communications systems. A wireless communications standard applicable to the embodiments of the present disclosure includes but is not limited to the following standards:

a Global System for Mobile Communication (GSM for short), Code Division Multiple Access (CDMA for short) IS-95, Code Division Multiple Access (CDMA for short) 2000, Time Division-Synchronous Code Division Multiple Access (TD-SCDMA for short), Wideband Code Division Multiple Access (WCDMA for short), Time Division Duplex-Long Term Evolution (TDD LTE for short), Frequency Division Duplex-Long Term Evolution (FDD LTE for short), Long Term Evolution Advanced (LTE-advanced for short), a personal handy-phone system (PHS for short), Wireless Fidelity (WiFi for short) specified by the 802.11 family of protocols, Worldwide Interoperability for Microwave Access (WiMAX for short), and a short-range wireless communications system such as Bluetooth.

The embodiments of the present disclosure intend to provide a flattened network architecture. Persons skilled in the art may learn that the network architecture is applicable to not only various current possible wireless communications standards, but also various communications standards in a future wireless communications system.

3. Base Station

The base station is located in a radio access network in a wireless communications system. The base station communicates with a terminal by using an air interface, so that the terminal can access the network.

4. Terminal

The terminal may be user equipment, and includes but is not limited to a mobile phone, a tablet computer, a personal digital assistant (PDA for short), a point of sale terminal (POS for short), and an in-vehicle computer.

For example, for an LTE system such as a TDD LTE system, an FDD LTE system, or an LTE-A system, the base station may be an evolved NodeB (evolved NodeB, eNodeB), and the terminal may be UE. For a TD-SCDMA system or a WCDMA system, the base station may include a NodeB (NodeB) or include a NodeB and a radio network controller (Radio Network Controller, RNC), and the terminal may be UE. For a GSM system, the base station may include a base transceiver station (Base Transceiver Station, BTS) or include a BTS and a base station controller (Base Station Controller, BSC), and the terminal is a mobile station (Mobile Station, MS). For a WiFi system, the base station may include an access point (Access Point, AP) and/or an access controller (Access Controller, AC), and the terminal may be a station (STAtion, STA).

5. First Server

The first server is configured to provide an application service for a terminal covered by the radio access network. For example, an application server provides a service for a user corresponding to the terminal, and the terminal receives service data from the application server or sends service data to the application server.

6. Second Server

The second server is configured to perform user information management on the terminal covered by the radio access network, for example, maintain subscription information and implement a function of an HSS in a current EPC.

Optionally, the second server may further perform user authentication, location update, and the like according to user information, to meet a requirement of a control plane anchor.

User information managed by the second server may include the subscription information, user location information, and the like, and the second server stores the user information. Optionally, the second server may further perform user authentication, location update, and the like according to the user information, to meet the requirement of the control plane anchor.

The first server and the second server may be collectively referred to as business support systems (Business Support System).

7. Access Node

The access node keeps a wireless connection to the at least one terminal in the radio access network, and implements communication between the terminal and the first server by using the wireless connection between the access node and the terminal.

The access node may be a base station in a cellular wireless communications system (different from a WiFi system), and may include a macro base station, a small node, or even a light node that implements only some air interface functions; or may be another node such as a WiFi AP in the WiFi system.

The small node may be a base station that has a relatively small coverage area and a relatively low maximum transmit power, for example, a small cell (Small Cell), a pico cell (Pico Cell), a home eNodeB (Home eNodeB), a home NodeB (Home NodeB), or femto. Compared with the macro base station, the small node has low-power, small-volume, and easy-to-deploy advantages, and may be flexibly deployed at a lamp pole, on a billboard, or indoors. The small node may be configured to fill coverage holes of wireless coverage, and may also be configured to expand a capacity of the radio access network. A communication coverage radius of the small node is usually less than a preset threshold such as 100 m, and a maximum transmit power of the small node is usually less than a preset power threshold such as 10 w.

The light node may be a base station that does not implement a complete air interface protocol stack. For example, in an LTE system, a base station that implements only a PHY layer, a MAC layer, and an RLC layer in an LTE air interface protocol stack but does not implement a PDCP layer and an RRC layer may be referred to as the light node.

A difference between the small node and the light node lies in that the small node implements a complete air interface protocol stack, but the light node implements only a partial air interface protocol stack.

8. Control Plane Anchor

The control plane anchor may control the terminal covered by the radio access network and one or more access nodes to establish a wireless connection, and enable, by exchanging information with the second server, the second server to perform user information management on the terminal.

The control plane anchor may be a base station in the cellular wireless communications system, for example, a macro base station; or may be another control-plane centralized control point, for example, software-defined access network controller (SDRAN Controller for short). A small node controller (Small Node Controller, SNC) may be an SDRAN controller.

9. User Plane Anchor

The user plane anchor may send, to the first server, service data that is forwarded by one or more access nodes and that is from a terminal keeping a wireless connection to the one or more access nodes, and may send, to the terminal by using the access node connected to the terminal, service data that is received from the first server and that is to be sent to the terminal keeping a wireless connection to the one or more access nodes.

The user plane anchor may be a user-plane convergence node such as a universal gateway (Universal GateWay, UGW). For example, the UGW may be a local gateway (Local GateWay, LGW). The LGW may be located in the base station, or the LGW and the base station may be deployed together.

The user plane anchor and the control plane anchor may be collectively referred to as access anchors. An access anchor may be both a user plane anchor and a control plane anchor, or may be only a user plane anchor, or may be only a control plane anchor.

10. RRC Signaling

In a current LTE system, an RRC layer is the topmost control-plane layer in a radio access network protocol stack, and is a control plane protocol. The RRC layer may provide services such as connection management and message transfer for a non-access stratum, provide a parameter configuration function for each lower-layer protocol entity in the radio access network, and take responsibility for measurement, control, and the like related to mobility management of UE.

In addition, unless otherwise specified, in the embodiments of the present disclosure, a case in which a device is connected to another device or multiple devices may include but be not limited to the following cases:

Devices are directly connected to each other;

devices are connected to each other by using another device; and the connection may be a physical connection or a virtual connection.

The foregoing cases are feasible provided that the connected devices can communicate with each other.

The following describes the embodiments of the present disclosure in detail with reference to the accompanying drawings.

First, a radio access network and a radio access network device provided in the embodiments of the present disclosure are described. Then, a wireless connection control method provided in the embodiments of the present disclosure and a radio access network device are described. Finally, an IP packet processing method provided in the embodiments of the present disclosure, a server, and a radio access network device are described.

Radio Access Network

Figure 3:
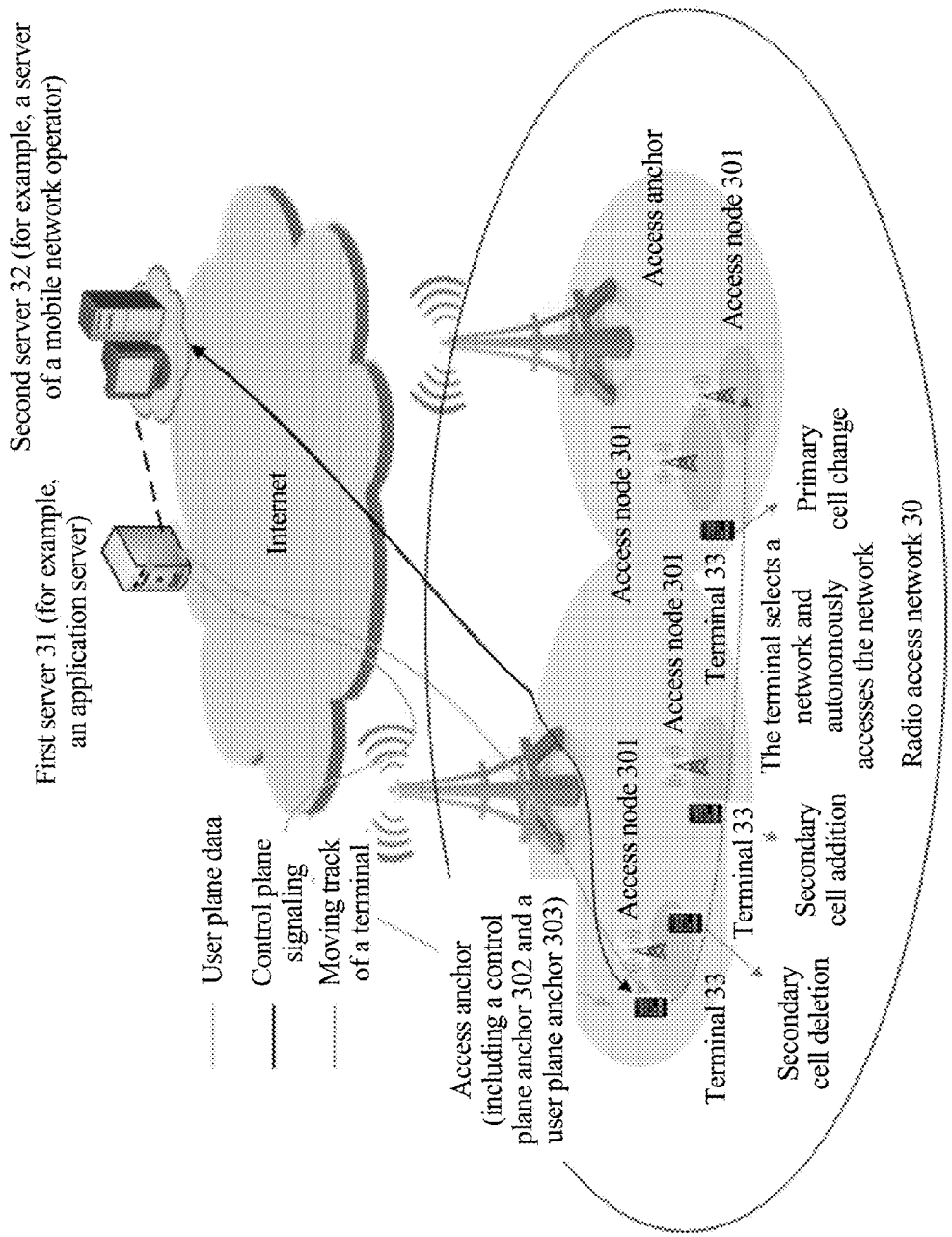
FIG. 3 is a network architecture diagram of a radio access network according to an embodiment of the present disclosure.

Referring to FIG. 3, a radio access network 30 provided in an embodiment of the present disclosure, a first server 31, and a second server 32 are connected to each other. The radio access network 30 may include:

at least one access node 301, where the at least one access node 301 keeps a wireless connection to at least one terminal 33 covered by the radio access network 30, and is configured to implement communication between the at least one terminal 33 and the first server 31 by using the wireless connection between the at least one access node 301 and the at least one terminal 33; and a control plane anchor 302 connected to the at least one access node 301, where the control plane anchor 302 is configured to:

control the terminal covered by the radio access network 30 and one or more access nodes 301 in the at least one access node 301 to establish a wireless connection; and enable, by exchanging information with the second server 32, the second server 32 to perform user information management on the terminal 33 keeping a wireless connection to the at least one access node 301.

Optionally, if a wireless communications standard is LTE, necessary functions of an eNB, an MME, and the like in a current LTE system may be integrated into the control plane anchor 302. If a wireless communications standard is WCDMA or TD-SCDMA, necessary functions of an RNC, a mobile switching center server (Mobile Switching Center Server, MSC Server), and the like in a current WCDMA system or a current TD-SCDMA system may be integrated into the control plane anchor 302. Therefore, a flattened network in an entire wireless communications system is implemented.

Problems such as the following are avoided: A communications link between a network entity such as an eNB or an RNC in a radio access network and an MME becomes a processing capability bottleneck of the wireless communications system. Therefore, a signaling transmission delay is effectively reduced. The control plane anchor 302 controls multiple access nodes 301. Therefore, during network management, the control plane anchor 302 may manage the access node 301, so that hierarchical network management is implemented, and network management is simplified. In addition, when the terminal 33 moves between different access nodes 301 controlled by one control plane anchor 302, an RRC connection anchor of the terminal 33 is located on the control plane anchor. For one control plane anchor, the terminal uses one RRC connection configuration parameter such as a C-RNTI, and there is no need to change the parameter when an access node is changed.

A cell handover process is not involved. Therefore, frequent handover of the terminal 33 is avoided, and a service drop rate is reduced.

Optionally, when controlling the terminal 33 and the access node 301 to establish the wireless connection, the control plane anchor 302 may configure a transmission parameter of the established wireless connection.

For example, the control plane anchor 302 may configure which access node 301 is specifically used by the terminal 33 to access the radio access network 30, and parameters of transmission between the terminal 33 and both a layer 1 (for example, a physical layer) and a layer 2 (for example, a Medium Access Control (MAC for short) layer or a Radio Link Control (RLC for short) layer) of each connected access node 301. The configurable parameter includes but is not limited to at least one of the following parameters:

the maximum number of transmissions of hybrid automatic repeat request (HARQ for short);

a discontinuous reception (Discontinuous Reception, DRX) cycle;

a maximum transmission bit rate;

a maximum uplink transmit power;

a radio bearer (Radio Bearer) parameter; or an RB scheduling priority.

Optionally, the control plane anchor 302 may be further configured to perform at least one of the following operations:

performing radio resource control on the terminal 33 connected to the control plane anchor 302;

performing NAS control on the terminal 33 connected to the control plane anchor 302; or performing radio resource management on a radio resource managed by the control plane anchor 302.

Optionally, the radio access network 30 may further include a user plane anchor 303 connected to the one or more access nodes 301.

The user plane anchor 303 is configured to:

send, to the first server 31, service data that is forwarded by the one or more access nodes 301 and that is from the terminal 33 keeping a wireless connection to the one or more access nodes 301; and send, to the terminal 33 by using the access node 301 connected to the terminal 33, service data that is received from the first server 31 and that is to be sent to the terminal 33 keeping a wireless connection to the one or more access nodes 301.

When the radio access network 30 includes the user plane anchor 303, the control plane anchor 302 may be further configured to configure a transmission parameter used when the user plane anchor 303 and the terminal 33 transmit service data.

Optionally, when the user plane anchor 303 exists, the access node 301 may be further configured to:

send, to the first server 31 by using the user plane anchor 303 connected to the access node 301, service data of the terminal 33 keeping a wireless connection to the access node 301; and send, to the terminal 33, service data that is from the first server 31, that is forwarded by the user plane anchor 303 connected to the access node 301, and that is to be sent to the terminal 33 keeping a wireless connection to the access node 301.

Optionally, the radio access network, the first server, and the second server are connected to each other over the Internet. Different user plane anchors occupy different IP address network segments. Optionally, when communicating with the terminal 33, the first server 31 and the second server 32 send, according to a network segment to which a public IP address of the terminal 33 belongs, data of the terminal 33 to a corresponding user plane anchor by using a routing protocol, and then, the user plane anchor sends the data of the terminal 33 to the terminal 33.

The user plane anchor 303 may be further configured to perform at least one of the following operations:

allocating an IP address to the terminal 33 connected to the user plane anchor 303;

aggregating service data of the terminal 33 connected to the user plane anchor 303;

performing filtering such as packet filtering (packet filtering) on service data of the terminal 33 connected to the user plane anchor 303; or routing service data of the terminal 33 connected to the user plane anchor 303.

According to whether the user plane anchor 303 exists and whether the control plane anchor 302 and the user plane anchor 303 are located in a same device when the user plane anchor 303 exists, a network architecture of the radio access network 30 may include but be not limited to the following three forms.

Form 1

The control plane anchor 302 and the user plane anchor 303 are located in a same device.

Figure 4A:
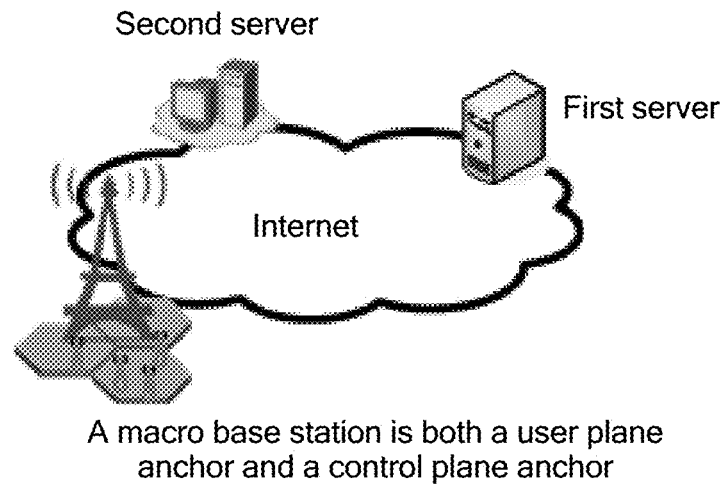
FIG. 4A to FIG. 4G are schematic diagrams of seven network deployment scenarios of a radio access network according to an embodiment of the present disclosure.
Figure 4B:
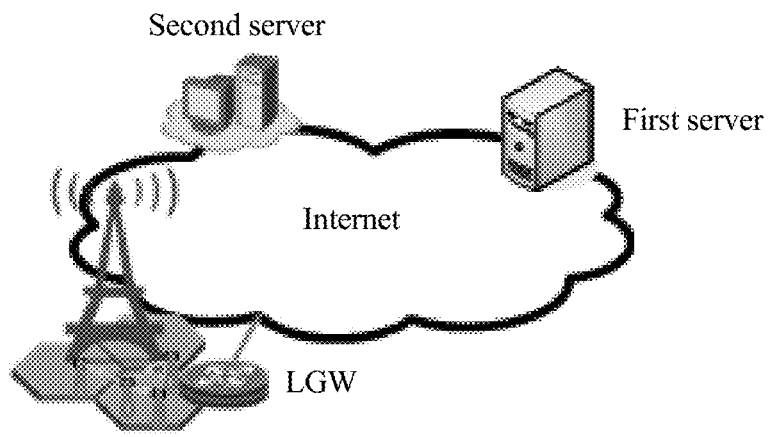
Figure 4C:
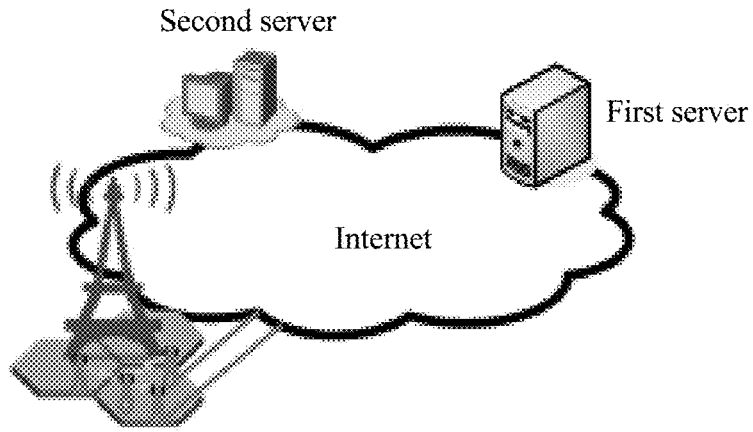
Figure 4D:
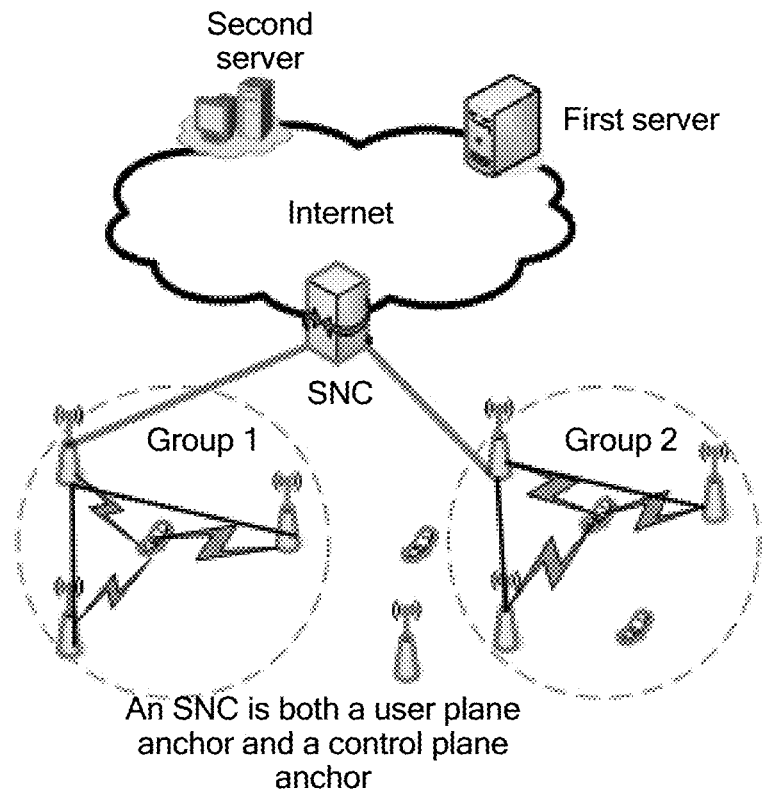

For example, when the access node 301 is a small node, the same device may be a macro base station (as shown in FIG. 4A) or a small node controller (Small Node Controller, SNC) (as shown in FIG. 4D). The small node controller may be an SDRAN controller.

Form 2

The control plane anchor 302 and the user plane anchor 303 are located in different devices. In this case, the control plane anchor 302 is connected to the user plane anchor 303.

Figure 4E:
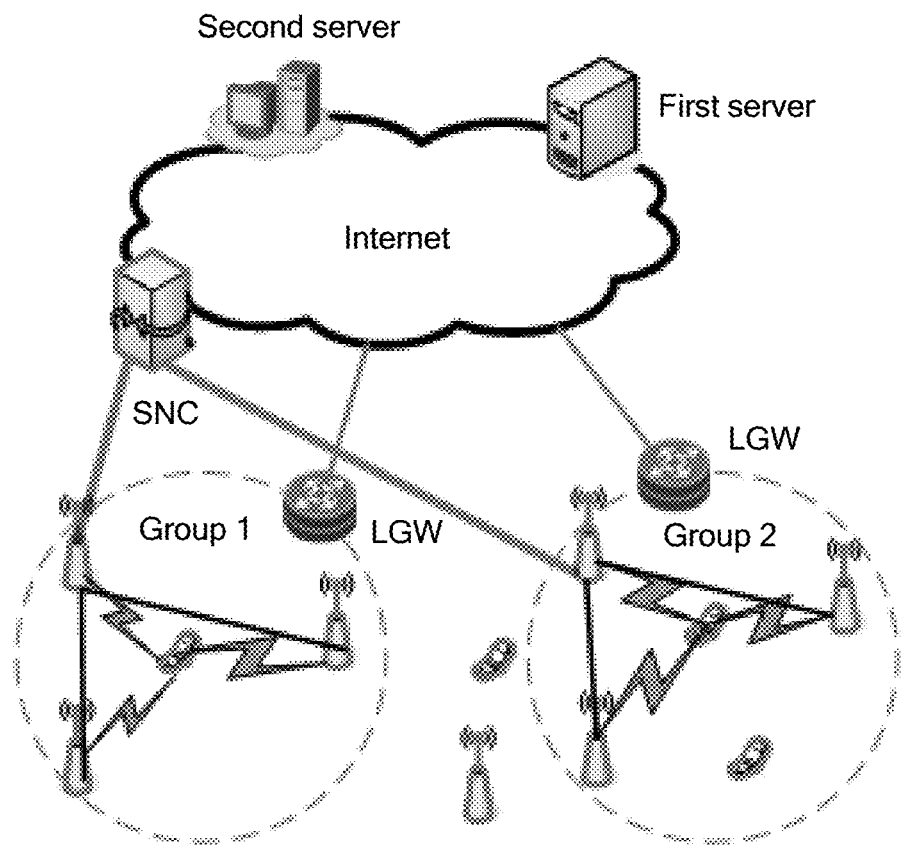

When the control plane anchor 302 and the user plane anchor 303 are located in different devices, the access node 301 may be a small node, the control plane anchor 302 may be located in a macro base station (as shown in FIG. 4B) or an SNC (as shown in FIG. 4E), and the user plane anchor 303 may be located in an LGW or a UGW.

Form 3

The user plane anchor 303 does not exist.

Figure 4F:
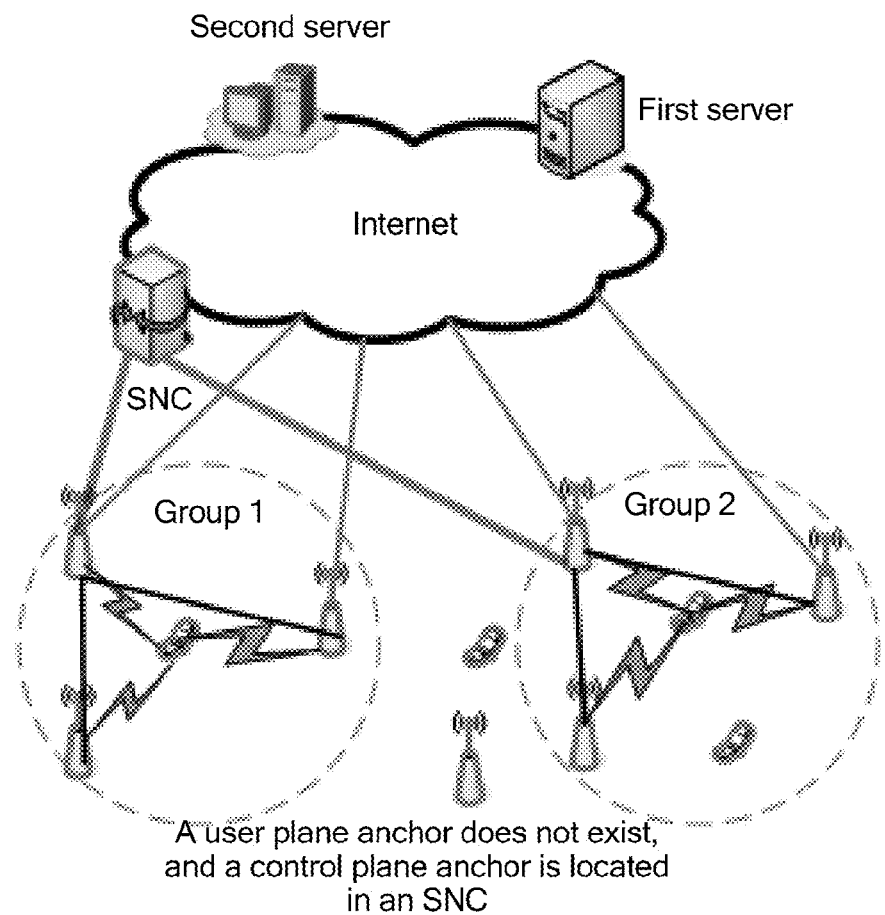

In this case, the access node 301 may be a small node, and the control plane anchor 302 may be located in a macro base station (as shown in FIG. 4C) or a small node controller (as shown in FIG. 4F).

In this case, the access node 301 may be further configured to: send, to the first server 31, service data of the terminal 33 keeping a wireless connection to the access node 301; and send, to the terminal 33, service data that is received from the first server 31 and that is to be sent to the terminal 33 keeping a wireless connection to the access node 301.

FIG. 4A to FIG. 4F are six network deployment scenarios of a radio access network according to an embodiment of the present disclosure.

In a network deployment scenario shown in FIG. 4A, a macro base station is both a user plane anchor and a control plane anchor.

In a network deployment scenario shown in FIG. 4B, a macro base station provides coverage, a control plane anchor is located in the macro base station, and a user plane anchor is located in an LGW.

In a network deployment scenario shown in FIG. 4C, a control plane anchor is located in a macro base station, and a user plane anchor does not exist.

In a network deployment scenario shown in FIG. 4D, an SNC is both a user plane anchor and a control plane anchor.

In a network deployment scenario shown in FIG. 4E, no macro base station provides coverage, a user plane anchor and a control plane anchor are located in different devices, the control plane anchor is located in an SNC, and the user plane anchor is located in an LGW.

In a network deployment scenario shown in FIG. 4F, a user plane anchor does not exist, and a control plane anchor is located in an SNC.

In the foregoing scenarios, whether the user plane anchor 303 or the control plane anchor 302 exists is considered from a perspective of the access node 301 instead of the terminal 33. If the user plane anchor 303 exists, it indicates that data of multiple access nodes 301 can enter the Internet only by using the user plane anchor 303.

Figure 4G:
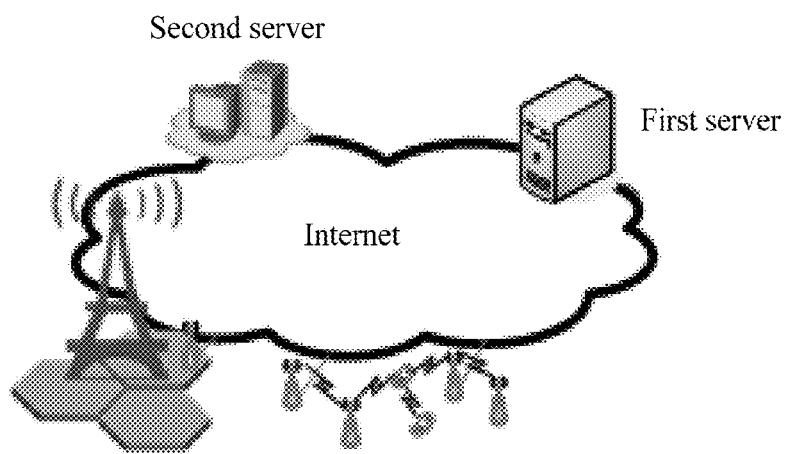

In addition, there is a network deployment scenario shown in FIG. 4G. The network deployment scenario is applicable to a deployment scenario in which an access node 301 is a plug-and-play small node that requires weak control. Base stations do not need to exchange information with each other. This is similar to fat AP deployment in WiFi.

The following seven network function architectures correspond to the foregoing seven network deployment scenarios. In each network function architecture, specific functions between the access node 301 and the user plane anchor 303 and/or the control plane anchor 302 are used only for reference. During actual implementation, deployment of functions between the access node 301 and an access anchor that includes the user plane anchor 303 and the control plane anchor 302 may be deleted and/or adjusted according to a principle such as function simplification or optimization.

Network Function Architecture 1

Figure 5A:
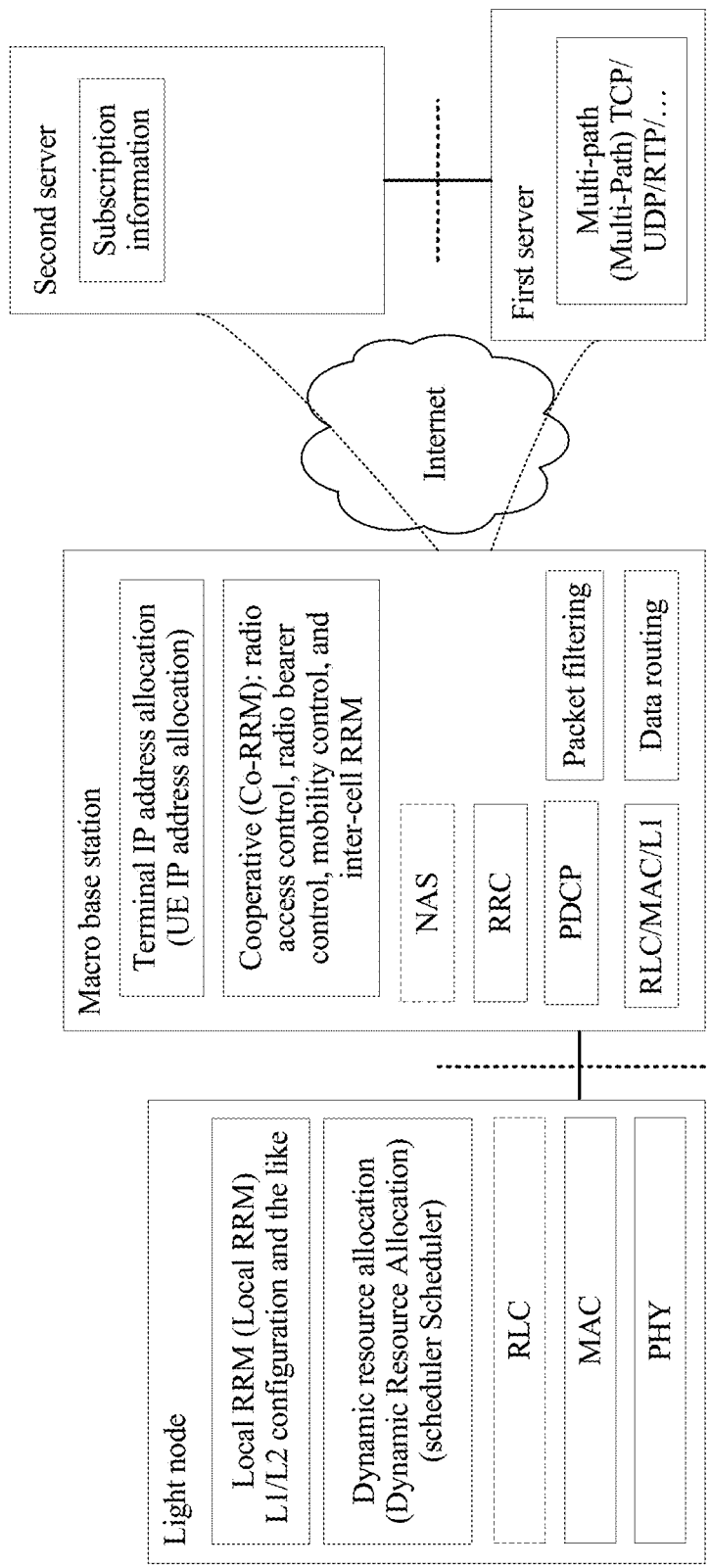
FIG. 5A to FIG. 5G are respectively schematic diagrams of seven network function architectures according to an embodiment of the present disclosure.

The network function architecture 1 is shown in FIG. 5A and corresponds to the network deployment scenario shown in FIG. 4A.

Local RRM (Local RRM) is used to perform local resource management, for example, configure sounding reference signal (Sounding Reference Signal, SRS) resources and the like for different users.

Cooperative RRM (Co-RRM) is used to coordinate radio resource management between access nodes 301 managed by a control plane anchor 302, for example, coordinate frequency resources used by the access nodes 301, so that a resource conflict or signal interference between the access nodes 301 is avoided.

Dynamic resource allocation (Dynamic Resource Allocation) is used to schedule a radio resource in each subframe and allocate the radio resource in the subframe to one or more terminals 33 for use. Radio resource allocation results may be different in different subframes.

Optionally, to further simplify a control plane protocol, an independent NAS protocol function may be deleted, and a necessary NAS function may be combined into an RRC protocol.

Terminal IP address allocation (UE IP address allocation) is configured in a macro base station, so that a data transmission delay is reduced, and a PDN-GW is prevented from being a user plane transmission bottleneck. The macro base station may serve as an ingress/egress for connecting to the Internet by a radio access network, and the macro base station allocates a terminal IP address.

Packet filtering (Packet filtering) is used to classify IP packets from the Internet, so that the IP packets are mapped to different air interface bearers for transmission. Therefore, QoS differentiated services are implemented.

Data routing (Data routing) is used to route an IP packet heading for the Internet to a corresponding next-hop router according to a destination IP address.

Multi-path TCP/UDP/RTP/ . . . (Multi-path TCP/UDP/RTP/ . . . ) is used to transmit data of a same service in multiple paths simultaneously.

According to the network function architecture 1, an existing macro base station may be fully used to serve as a user plane anchor and a control plane anchor, and this is easy for an operator to control. In addition, a data transmission delay is reduced, and a PDN-GW is prevented from being a user plane transmission bottleneck.

Network Function Architecture 2

Figure 5B:
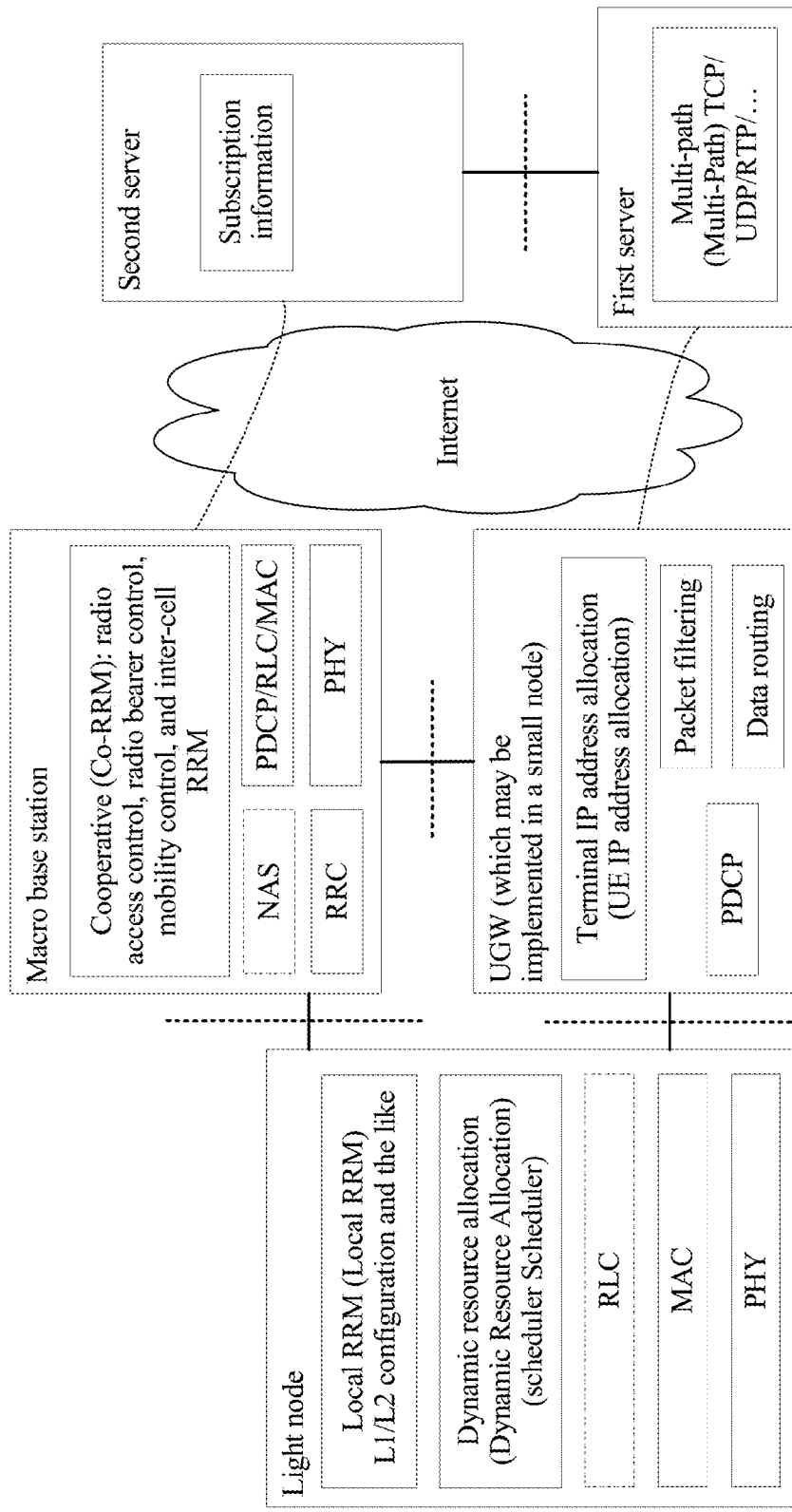

The network function architecture 2 is shown in FIG. 5B and corresponds to the network deployment scenario shown in FIG. 4B. For functions of local RRM, cooperative RRM, dynamic resource allocation, a NAS, terminal IP address allocation, packet filtering, data routing, and multi-path TCP/UDP/RTP/ . . . , refer to the network function architecture 1. Details are not described herein again.

Optionally, in the network function architecture 2, when a macro base station communicates with a terminal connected to a light node, an RRC message may be forwarded and processed by a universal gateway (Universal Gateway, UGW), and in this case, the macro base station may not use PDCP/RLC/MAC and PHY of the macro base station for processing. When a macro base station communicates with a terminal that directly communicates with the macro base station, an RRC message needs to be processed by using PDCP/RLC/MAC and PHY of the macro base station.

Optionally, the UGW may be implemented in a small node, and in this case, the small node serves as a user plane anchor of the light node in FIG. 5B.

Network Function Architecture 3

Figure 5C:
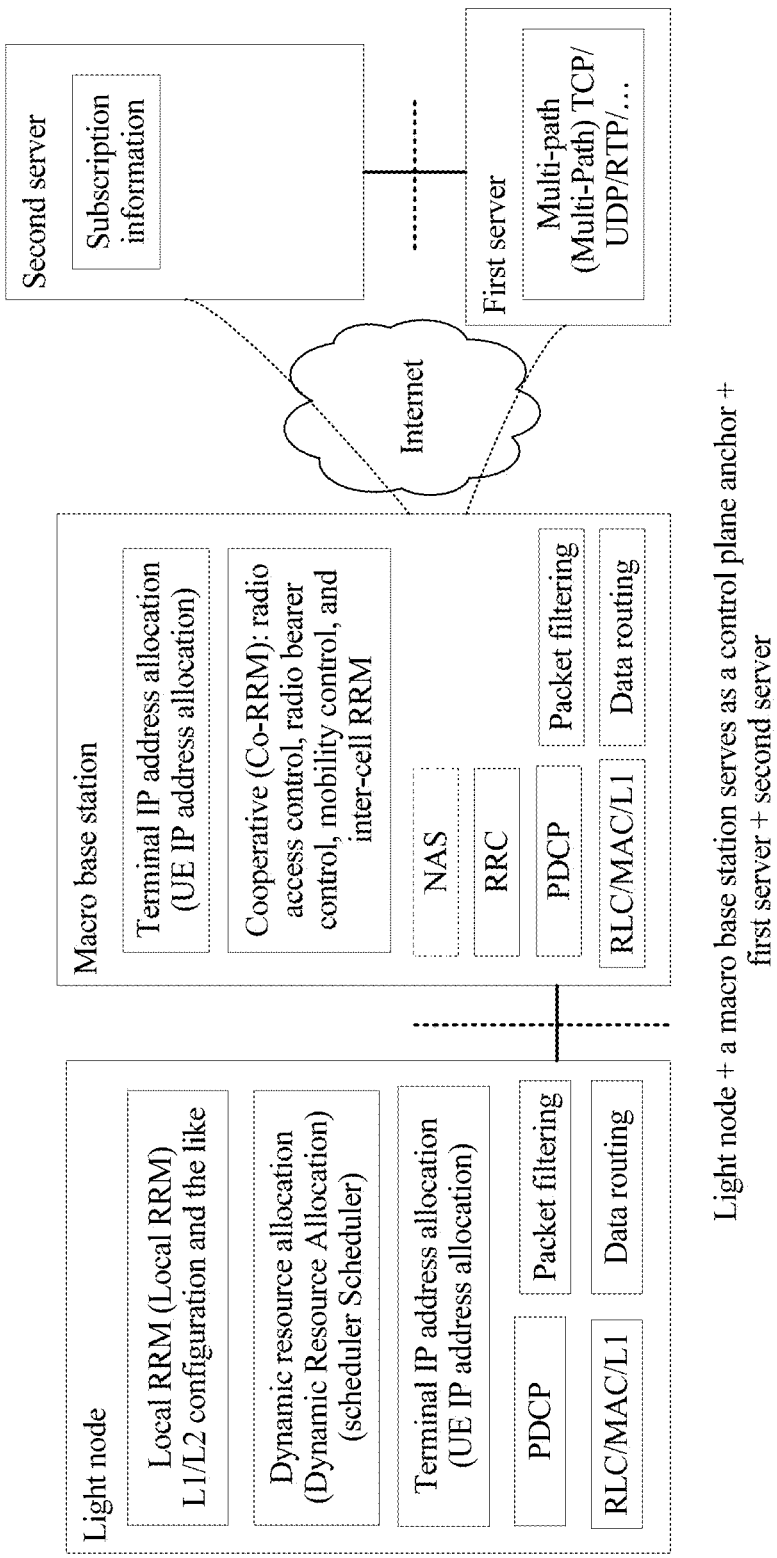

The network function architecture 3 is shown in FIG. 5C and corresponds to the network deployment scenario shown in FIG. 4C. For functions of local RRM, cooperative RRM, dynamic resource allocation, a NAS, terminal IP address allocation, packet filtering, data routing, and multi-path TCP/UDP/RTP/ . . . , refer to the network function architecture 1. Details are not described herein again.

In FIG. 5C, terminal IP address allocation, packet filtering, and data routing in a macro base station are provided by the macro base station for a terminal served by the macro base station. In FIG. 5C, terminal IP address allocation, packet filtering, and data routing provided by a light node that uses the macro base station as a control plane anchor are used for a terminal connected to the light node.

According to the network function architecture 3, an existing macro base station may be fully used to serve as a control plane anchor, and this is easy for an operator to control. In addition, a user plane anchor is as close as possible to an access node by using a distributed UGW, so that a data transmission delay is reduced, and a PDN-GW is prevented from being a user plane transmission bottleneck.

Network Function Architecture 4

Figure 5D:
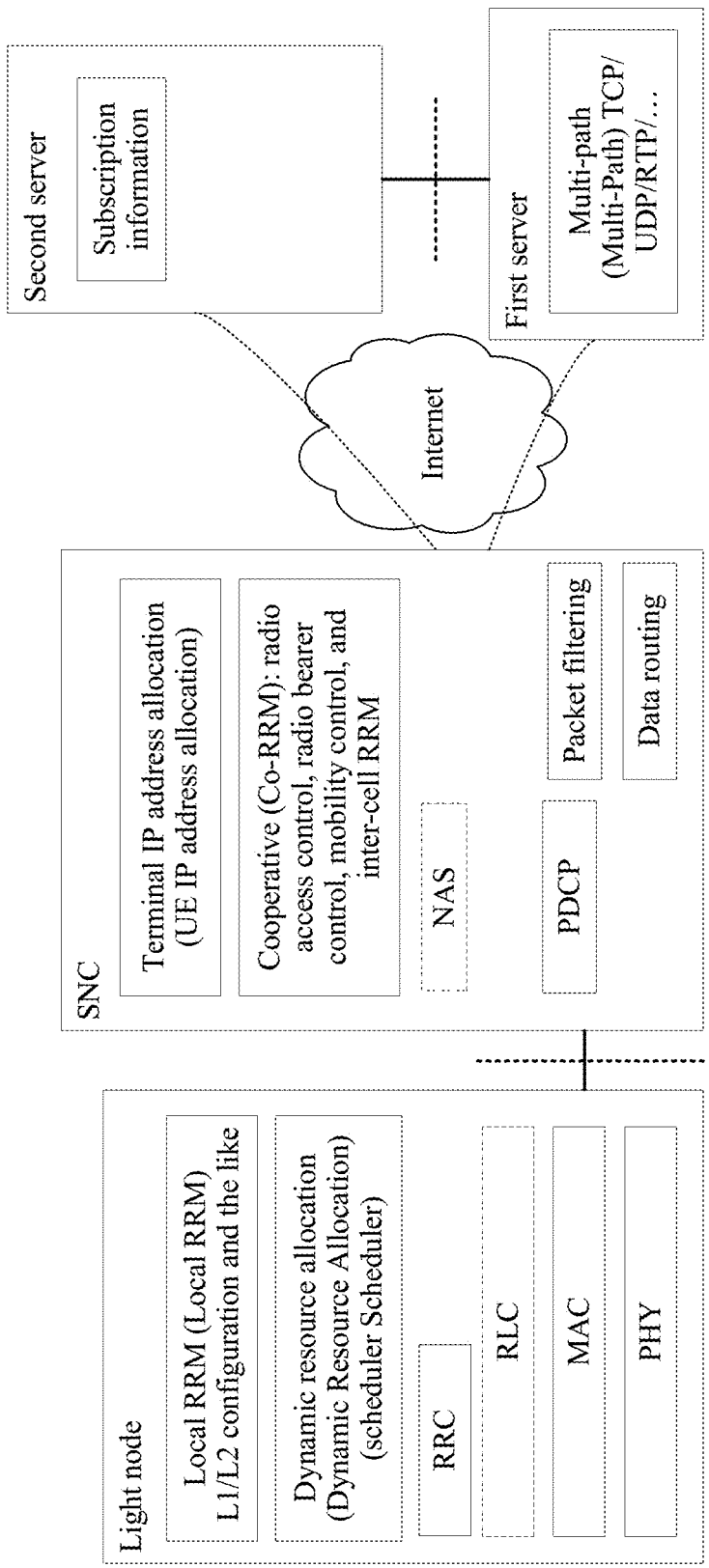

The network function architecture 4 is shown in FIG. 5D and corresponds to the network deployment scenario shown in FIG. 4D. For functions of local RRM, cooperative RRM, dynamic resource allocation, a NAS, terminal IP address allocation, packet filtering, data routing, and multi-path TCP/UDP/RTP/ . . . , refer to the network function architecture 1. Details are not described herein again.

Optionally, data may be retransmitted and sorted by using a PDCP layer. In this case, an RLC layer is no longer required.

According to the network function architecture 4, in a region that is not covered by a macro base station, an SNC may control multiple access nodes and serve as an ingress/egress for entering the Internet, and this is easy for an operator to control and improves radio resource utilization. In addition, a data transmission delay is reduced, and a PDN-GW is prevented from being a user plane transmission bottleneck.

Network Function Architecture 5

Figure 5E:
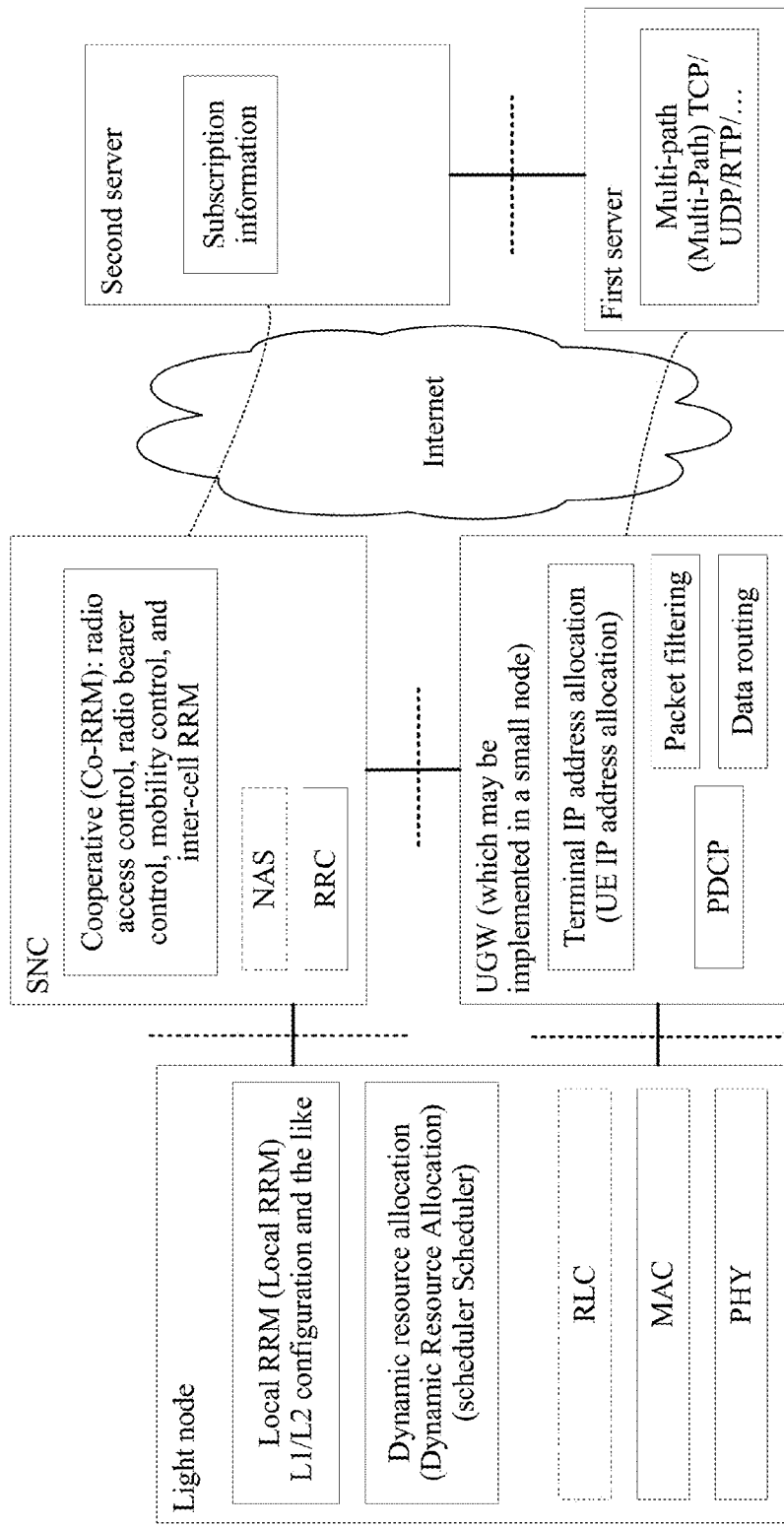

The network function architecture 5 is shown in FIG. 5E and corresponds to the network deployment scenario shown in FIG. 4E. For functions of local RRM, cooperative RRM, dynamic resource allocation, a NAS, RLC, terminal IP address allocation, packet filtering, data routing, and multi-path TCP/UDP/RTP/ . . . , refer to the network function architecture 4. Details are not described herein again.

Optionally, a UGW may be implemented in a small node, and in this case, the small node serves as a user plane anchor of the light node in FIG. 5B.

According to the network function architecture 5, in a region that is not covered by a macro base station, an SNC may control multiple access nodes, and this is easy for an operator to control and improves radio resource utilization. In addition, a user plane anchor is as close as possible to the access node by using a distributed UGW, so that a data transmission delay is reduced, and a PDN-GW is prevented from being a user plane transmission bottleneck.

Network Function Architecture 6

Figure 5F:
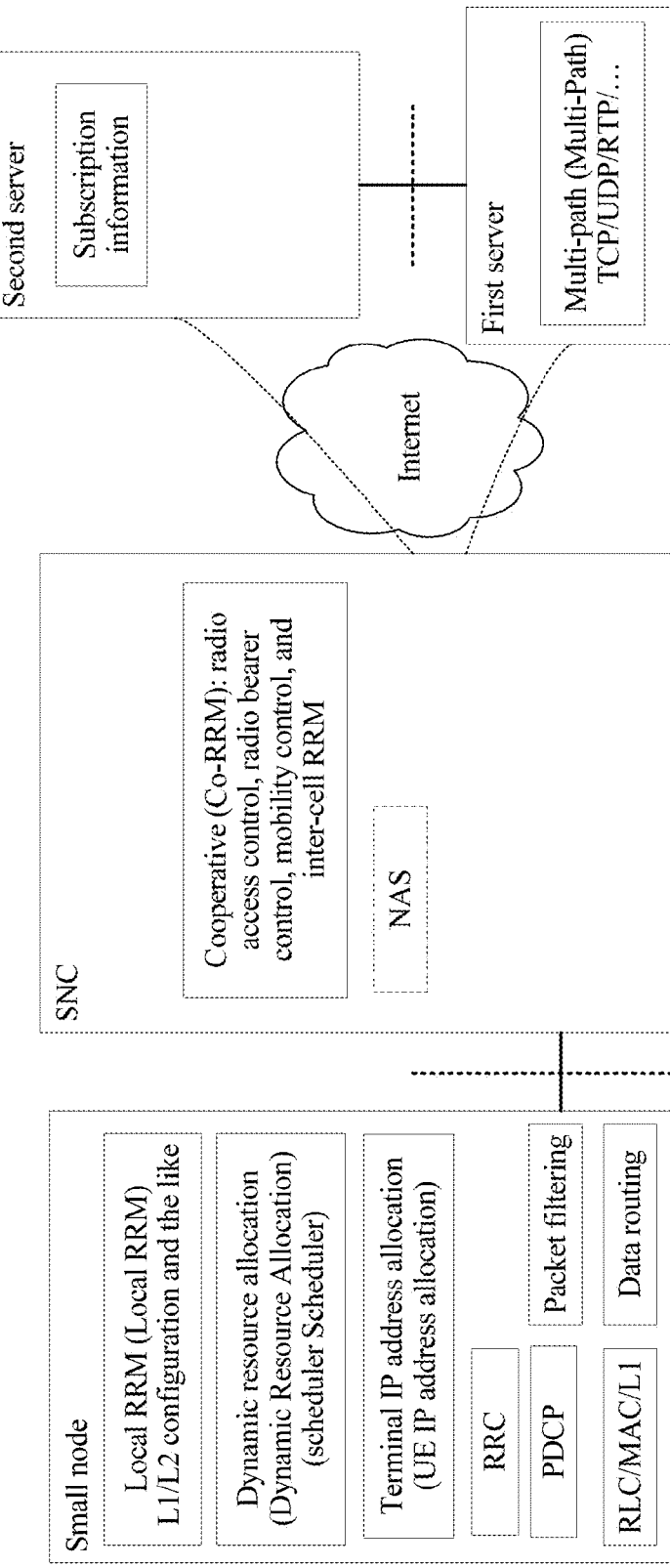

The network function architecture 6 is shown in FIG. 5F and corresponds to the network deployment scenario shown in FIG. 4F. For functions of local RRM, cooperative RRM, dynamic resource allocation, a NAS, RLC, terminal IP address allocation, packet filtering, data routing, and multi-path TCP/UDP/RTP/ . . . , refer to the network function architecture 4. Details are not described herein again.

According to the network function architecture 6, in a region that is not covered by a macro base station, an SNC controls multiple access nodes, and this is easy for an operator to control and improves radio resource utilization. In addition, a small node directly accesses the Internet, so that a data transmission delay is reduced, and a PDN-GW is prevented from being a user plane transmission bottleneck.

In the network function architecture 1 to the network function architecture 6, RRC may be implemented on an access node such as a small node, or may be implemented on a control plane anchor such as a macro base station or an SNC.

Network Function Architecture 7

Figure 5G:
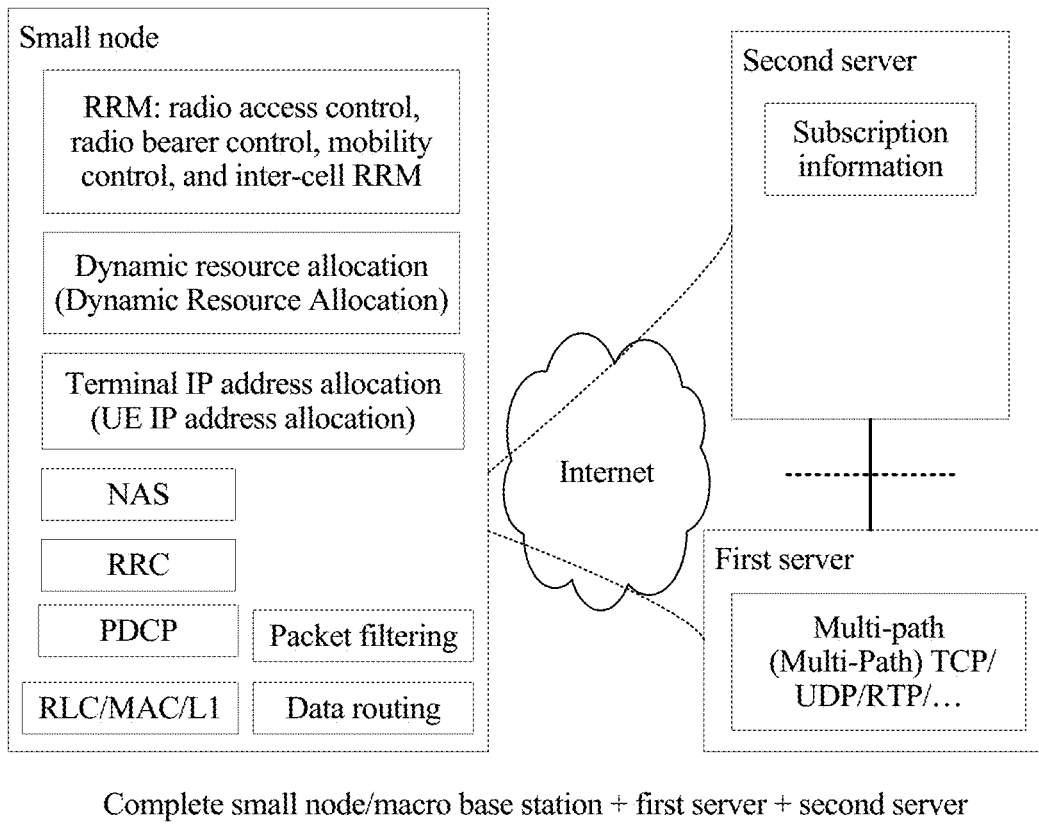

The network function architecture 7 is shown in FIG. 5G and corresponds to the network deployment scenario shown in FIG. 4G For functions of local RRM, cooperative RRM, dynamic resource allocation, a NAS, terminal IP address allocation, packet filtering, data routing, and multi-path TCP/UDP/RTP/ . . . , refer to the network function architecture 1. Details are not described herein again.

According to the network function architecture 7, a small node may be used as a data transmission and control node, and this is easy for an operator to control. In addition, a data transmission delay is reduced, and a PDN-GW is prevented from being a user plane transmission bottleneck.

From a perspective of a terminal, all the function architectures can coexist with the used different wireless communications standards and existing wireless communications systems in which different wireless communications standards are used. All the function architectures are applicable to a small node that can work independently, that is, a standalone small node, and a scenario in which a wireless backhaul (relay) is used between small nodes.

Figure 6:
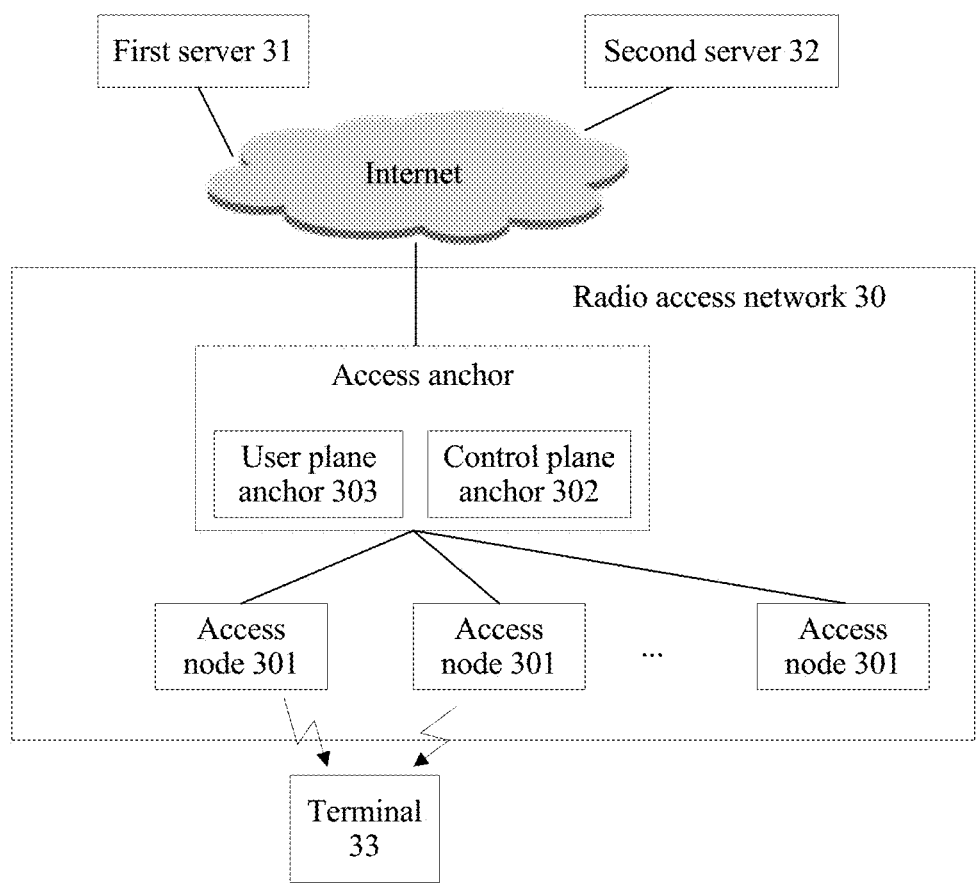
FIG. 6 is a network function architecture diagram of a radio access network according to an embodiment of the present disclosure.

In conclusion, when the radio access network 30 provided in this embodiment of the present disclosure includes an access node 301 and an access anchor, and the access anchor includes a user plane anchor 303 and a control plane anchor 302, a network function architecture of an entire wireless communications system may be shown in FIG. 6. A terminal 33 may access the radio access network by using multiple access nodes 301.

The access node 301 and the user plane anchor 303 connected to the access node 301 may separately perform air interface protocol stack processing on data in the radio access network that is received by the access node 301 and the user plane anchor 303.

For example, for uplink data, the uplink data may be data sent by the terminal 33, and the access node 301 and the user plane anchor 303 connected to the access node 301 may separately perform the following processing:

processing, by the access node 301, the received uplink data at a first-part air interface protocol stack, and sending the processed uplink data to the user plane anchor 303 connected to the access node 301; and processing, by the user plane anchor 303 connected to the access node 301, the received uplink data at a second-part air interface protocol stack.

For another example, for downlink data, the downlink data may be from the Internet or the control plane anchor 302, and the access node 301 and the user plane anchor 303 connected to the access node 301 may separately perform the following processing:

processing, by the user plane anchor 303, the received downlink data at a second-part air interface protocol stack, and sending the processed downlink data to an access node 301 connected to a destination terminal of the downlink data; and processing, by the access node 301 connected to the destination terminal of the downlink data, the received downlink data at a first-part air interface protocol stack.

The first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

For other optional solutions of processing uplink data and downlink data by the access node 301 and the user plane anchor 303, separately refer to a first device and a second device in a data processing solution described below. Details are not repeated.

The radio access network 30 provided in the embodiment of the present disclosure is described above. The following describes a data processing solution provided in an embodiment of the present disclosure and a radio access network device.

Data Processing Solution

In the data processing solution, a first device, a second device, and a third device in a radio access network may separately perform partial air interface protocol stack processing. Optionally, the third device in the radio access network may separately configure parameters of air interface protocol stacks of the first device and the second device, so that the air interface protocol stacks of the two devices can be configured.

The data processing solution may be applied to the network function architecture shown in FIG. 6. In this case, the first device in the solution may be the access node 301 in FIG. 6, the second device may be the user plane anchor 303 in FIG. 6, and the third device may be a control plane anchor 302 in FIG. 6.

As described above, there may be multiple implementations when the user plane anchor 303 and the control plane anchor 302 are located in different devices. For example, as shown in FIG. 4B, the control plane anchor 302 is located in a macro base station, and the user plane anchor 303 is located in an LGW. Alternatively, as shown in FIG. 4E, the user plane anchor 303 is located in an LGW, and the control plane anchor 302 is located in an SNC. When being applied to the network function architecture shown in FIG. 6, the data processing solution may be applied to both the network deployment scenario shown in FIG. 4B and the network deployment scenario shown in FIG. 4E.

As described above, RRC processing may be implemented on the access node 301, or may be implemented on the control plane anchor 302. An example (as shown in FIG. 7) in which RRC processing is implemented on the control plane anchor 302 is used for description herein.

Figure 7:
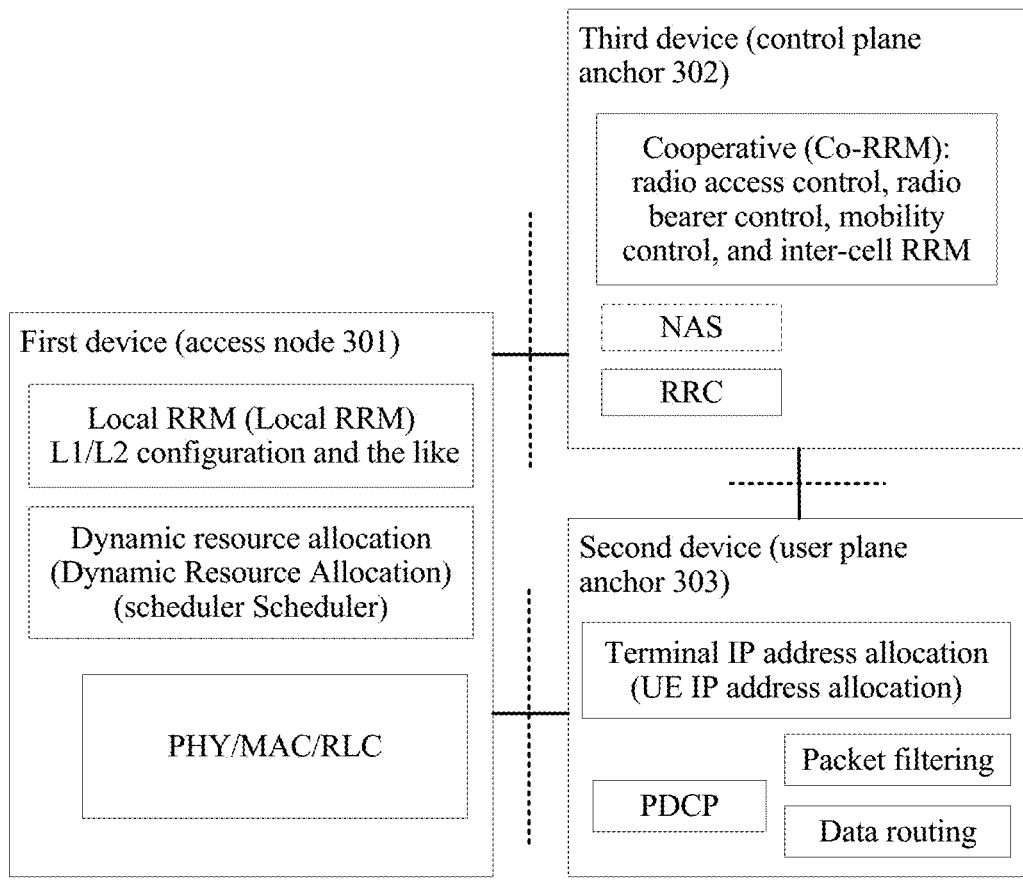
FIG. 7 is a network function architecture diagram in the case of separation between a control plane anchor and a user plane anchor.

FIG. 7 shows a typical network function architecture in the case of separation between a control plane anchor and a user plane anchor. A control plane anchor 302 implements functions of RRC, a NAS, and RRM that requires inter-base station coordination. An access node 301 implements RRM, some air interface user plane protocols (for example, a PHY layer, a MAC layer, and an RLC layer), and a dynamic resource allocation function that are closely related to local configurations of a layer 1 and a layer 2 of a terminal, and some air interface user plane protocols (for example, a PHY layer, a MAC layer, and an RLC layer). A user plane anchor 303 implements another air interface user plane protocol (for example, PDCP player) and functions of terminal IP address allocation, packet filtering, and data routing that are originally implemented by a PDN-GW.

A point of segmentation, of an air interface protocol stack, between the user plane anchor 303 and the access node 301 may be the RLC layer or the MAC layer. In this solution, the PDCP layer is used as a segmentation point. In addition, this solution is also applicable to a case in which an air interface user plane protocol stack does not necessarily include the PDCP layer, the RLC layer, the MAC layer, or the PHY layer. For example, this solution is also applicable to a case in which the air interface protocol stack does not include the RLC layer.

It should be noted that data that the data processing solution provided in this embodiment of the present disclosure is used to process may include service data and a control message.

Figure 8A:
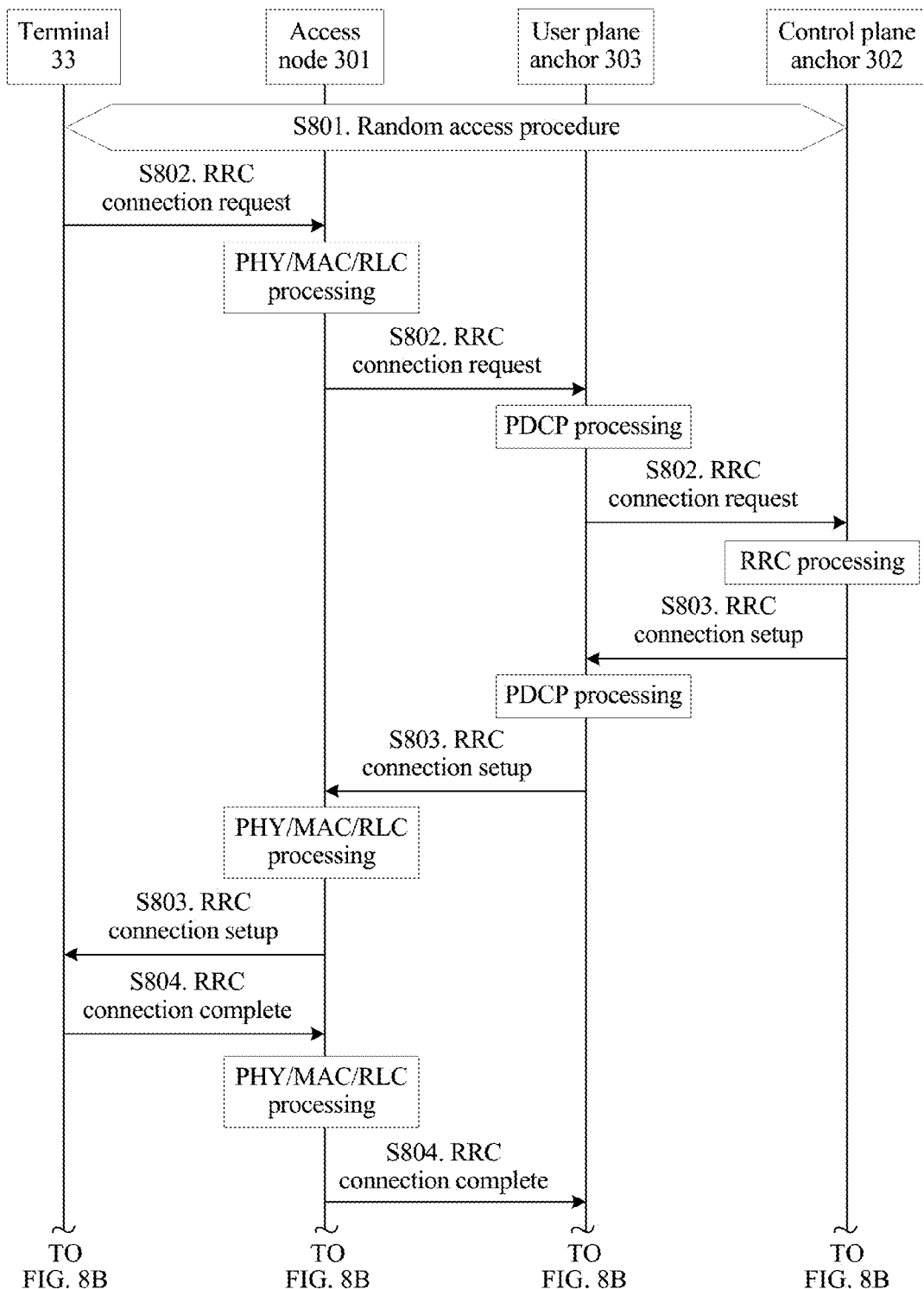
FIG. 8A, FIG. 8B, and FIG. 8C are a flowchart of an RRC connection setup process.
Figure 8B:
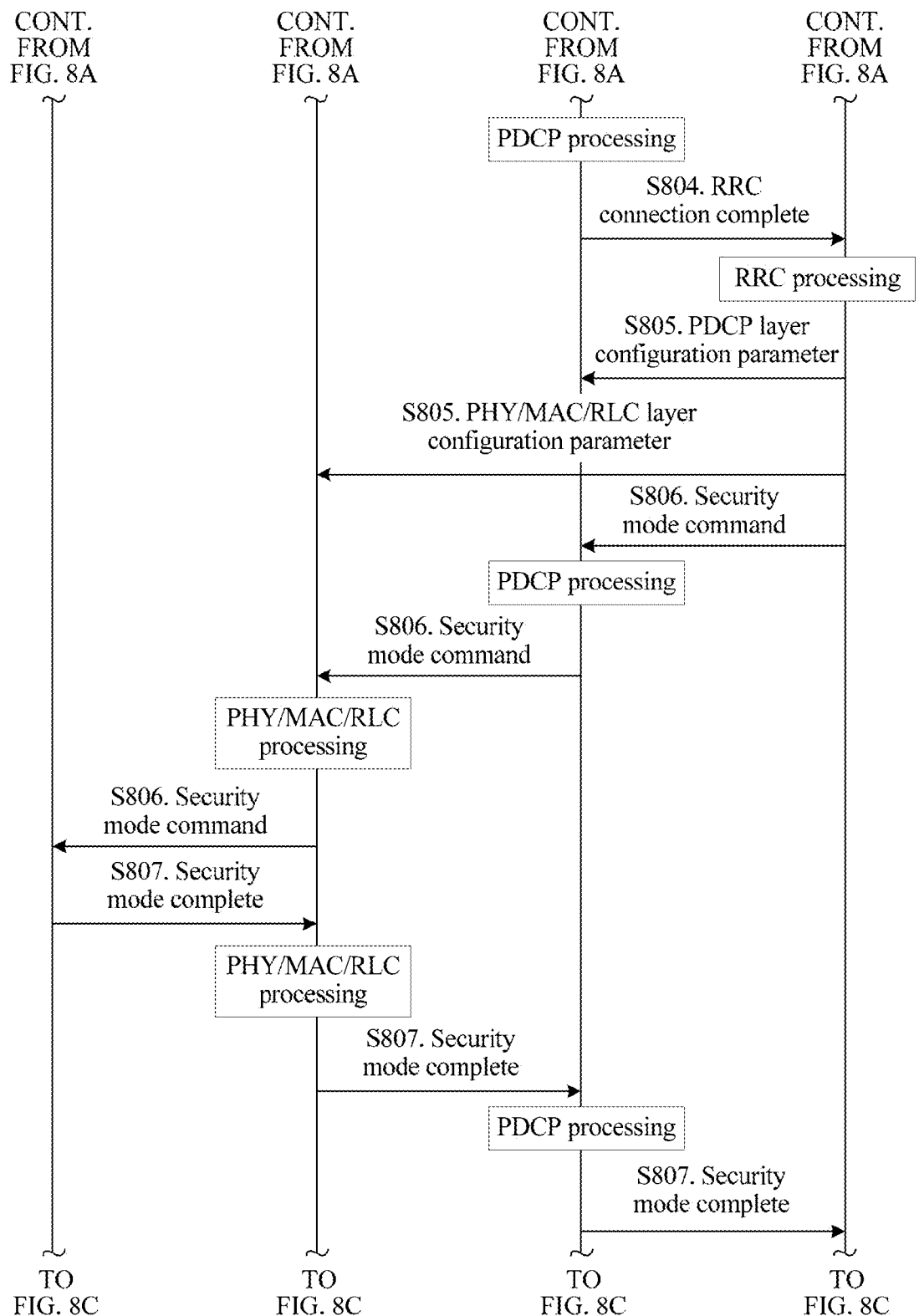
Figure 8C:
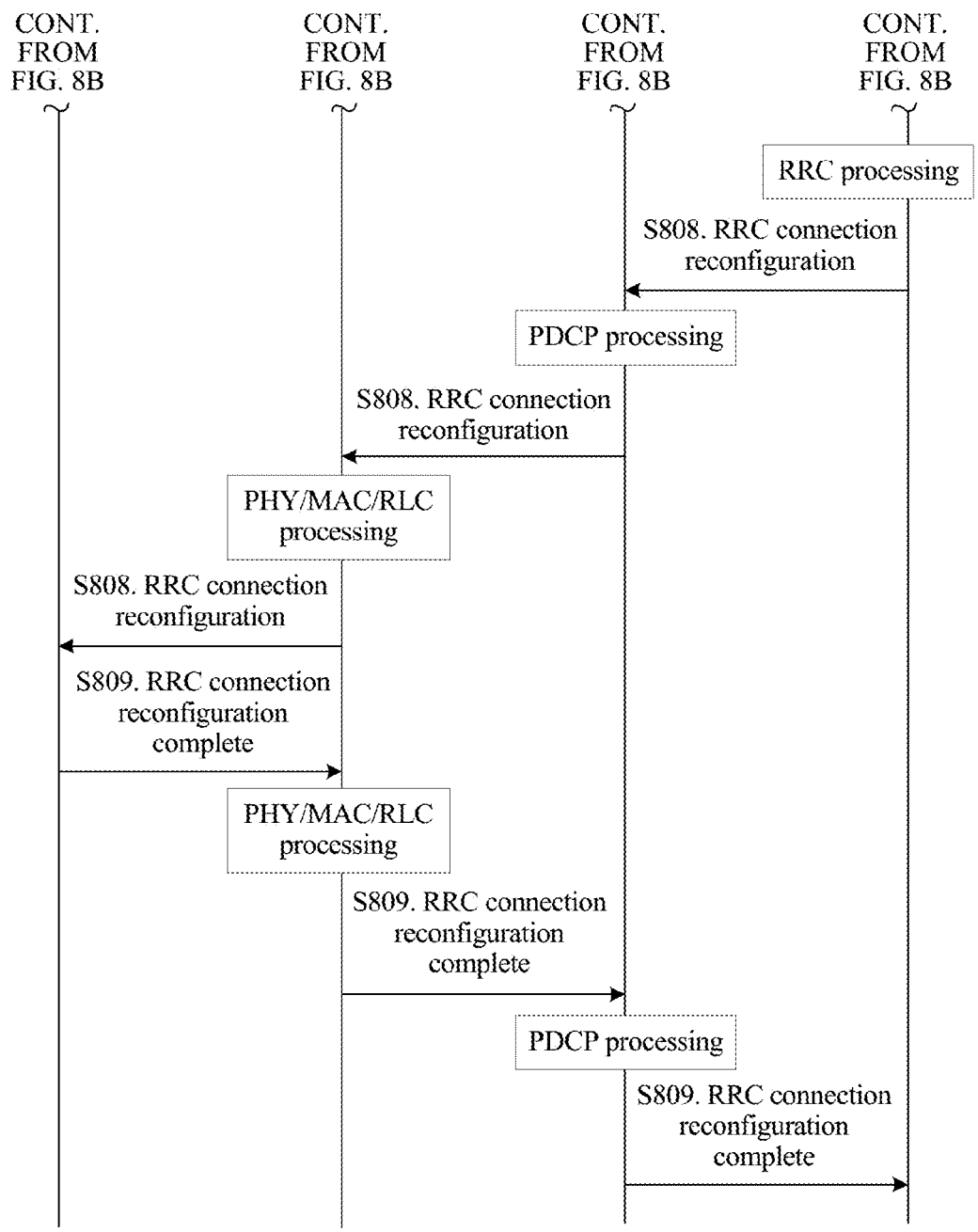

The following uses an RRC connection setup process shown in FIG. 8A, FIG. 8B, and FIG. 8C as an example to describe the data processing solution provided in the embodiment of the present disclosure. The solution is also applicable to another RRC process, for example, an RRC connection release process or an RRC connection reconfiguration process. Principles are the same, and details are not repeated herein.

Referring to FIG. 8A, FIG. 8B, and FIG. 8C, the RRC connection setup process includes the following steps.

S801. A terminal 33 initiates a random access procedure to an access node 301.

The terminal 33 initiates a random access procedure to a cell connected to the access node 301 actively or under an instruction of a radio access network 30, so as to implement uplink-downlink synchronization with the cell and obtain a C-RNTI.

The terminal 33 may send a random access preamble (preamble) to the access node 301, the access node 301 sends the received random access preamble to a control plane anchor 302, and the control plane anchor 302 processes the random access preamble. A processing manner may be the same as a manner in a current LTE system. The control plane anchor 302 allocates a user identifier such as a cell radio network temporary identifier (C-RNTI for short) to the terminal 33, and the access node 301 forwards the user identifier to the terminal 33, for example, sends the user identifier to the terminal 33 by using a random access response.

S802. The terminal 33 sends an RRC connection request (RRC Connection Request) to the access node 301, to request to establish an RRC connection.

After receiving the RRC connection request, the access node 301 performs PHY/MAC/RLC processing, and then sends the processed RRC connection request to a user plane anchor 303. The user plane anchor 303 performs PDCP processing, and then sends the processed RRC connection request to the control plane anchor 302. The control plane anchor 302 performs RRC processing, parses the RRC connection request, and determines whether an RRC connection can be established for the terminal 33. For a determining method, refer to an implementation in the current LTE system, and details are not described herein.

Processing at a complete air interface protocol stack of the radio access network may include processing of the RRC message by the access node 301, the user plane anchor 303, and the control plane anchor 302.

An example in which the access node 301 performs PHY/MAC/RLC processing, and the user plane anchor 303 performs PDCP processing is used in the procedure shown in FIG. 8A, but actual segmentation of the air interface protocol stack is not limited thereto. For example, the access node 301 performs PHY/MAC processing, and the user plane anchor 303 performs RLC/PDCP processing; or the access node 301 performs PHY processing, and the user plane anchor 303 performs MAC/RLC/PDCP processing.

S803. After determining that an RRC connection can be established for the terminal 33, a control plane anchor 302 generates an RRC connection setup (RRC Connection Setup) message, where the message generally includes radio resource configuration information, and sends the message to a user plane anchor 303; the user plane anchor 303 performs PDCP processing on the message, and then sends the processed message to the access node 301 for PHY/MAC/RLC processing; and then, the access node 301 sends the processed message to the terminal 33.

S804. The terminal 33 sends an RRC connection complete (RRC Connection Complete) message to the access node 301.

Similar to step S802, in an order: the terminal 33, the access node 301, the user plane anchor 303, and the control plane anchor 302, the message is separately processed as follows: The access node 301 performs PHY/MAC/RLC processing, the user plane anchor 303 performs PDCP processing, and the control plane anchor 302 performs RRC processing. The message generally includes identification information of a mobile network operator selected for the terminal.

S805. After receiving the RRC connection complete message, the control plane anchor 302 may send a PDCP configuration parameter such as a security key to the user plane anchor 303, and send a PHY/MAC/RLC configuration parameter to the access node 301 separately.

As described above, segmentation of the air interface protocol stack may include but be not limited to the following segmentation manner:

The access node 301 performs PHY/MAC/RLC processing, and the user plane anchor 303 performs PDCP processing; or the access node 301 performs PHY/MAC processing, and the user plane anchor 303 performs RLC/PDCP processing; or the access node 301 performs PHY processing, and the user plane anchor 303 performs MAC/RLC/PDCP processing.

Regardless of a segmentation manner, the control plane anchor 302 separately configures an air interface protocol stack of the user plane anchor 303 and an air interface protocol stack of the access node 301.

The configuration parameter is used to perform configuration for the terminal 33, for example, used to configure a radio bearer (Radio Bearer, RB) of the terminal 33. For example, the radio bearer is a signaling radio bearer (SRB for short). The SRB may be used to bear an RRC message and/or a NAS message. For another example, the radio bearer is a dedicated radio bearer (DRB for short). The DRB may be used to bearer service data and the like of the terminal 33.

The user plane anchor 303 and the access node 301 separately configure the air interface protocol stacks according to the received configuration parameters, and separately process a subsequently received RRC message and/or subsequently received service data by using the configured air interface protocol stacks.

Optionally, before the control plane anchor 302 sends the configuration parameters, the access node 301 and the user plane anchor 303 may process an RRC message by using default parameters.

S806. The control plane anchor 302 sends a security mode command (Security Mode Command) message to the terminal 33.

The message mainly includes a security-related parameter such as an integrity protection algorithm parameter. The message is sent to the terminal 33 in an order: the control plane anchor 302, the user plane anchor 303, the access node 301, and the terminal 33. The user plane anchor 303 and the access node 301 separately perform processing at the respective air interface protocol stacks. Processing manners are similar to those in step S803, and details are not described herein again.

There is no strict sequence between step S805 and step S806. Alternatively, messages in step S805 and step S806 may be packed into a large message and sent once by the control plane anchor 302.

S807. The terminal 33 sends a security mode complete (Security Mode Complete) message to the access node 301.

S808. The control plane anchor 302 sends an RRC connection reconfiguration (RRC Connection Reconfiguration) message to the terminal 33.

The message is mainly used to configure a dedicated bearer and/or a measurement and the like, and is finally delivered to the terminal 33.

S809. The terminal 33 sends an RRC connection reconfiguration complete (RRC Connection Reconfiguration Complete) message to the access node 301.

After configuring the dedicated bearer and/or the measurement and the like, the terminal sends the message to the access node 301.

In step S807 and step S809, the messages are finally delivered to the control plane anchor 302 in the order: the terminal 33, the access node 301, the user plane anchor 303, and the control plane anchor 302. The access node 301, the user plane anchor 303, and the control plane anchor 302 separately perform processing at respective air interface protocol stacks. Processing manners of the access node 301, the user plane anchor 303, and the control plane anchor 302 are similar to those in step S802, and details are not described herein again.

In step S809, the message is finally sent to the terminal 33 in the order: the control plane anchor 302, the user plane anchor 303, the access node 301, and the terminal 33. The access node 301, the user plane anchor 303, and the control plane anchor 302 separately perform processing at the respective air interface protocol stacks. Processing manners of the access node 301, the user plane anchor 303, and the control plane anchor 302 are similar to those in step S803, and details are not described herein again.

In the foregoing RRC connection setup process, messages, for example, an RRC connection request, RRC connection complete, security mode complete, and RRC connection reconfiguration complete, that are sent by the terminal 33 to the control plane anchor 302 may be collectively referred to as "first control messages" in this embodiment of the present disclosure.

Messages, for example, RRC connection setup, security mode command, and RRC connection reconfiguration, that are sent by the control plane anchor 302 to the terminal 33 may be collectively referred to as "second control messages" in this embodiment of the present disclosure.

As described above, the data processing solution provided in this embodiment of the present disclosure is applicable to not only a wireless connection setup process, but also other processes such as wireless connection release and wireless connection reconfiguration. Therefore, messages that are sent by the terminal 33 to the control plane anchor 302 in these processes and that are used to control a wireless connection of the terminal 33 in the radio access network 30 may also be referred to as "first control messages". Likewise, messages that are sent by the control plane anchor 302 to the terminal 33 in these processes and that are used to control the wireless connection of the terminal 33 in the radio access network 30 may also be referred to as "second control messages".

An RRC message is used as an example. The first control message may further include but be not limited to the following messages:

an RRC connection reestablishment request (RRC Connection Reestablishment Request) message; and an RRC connection reestablishment complete (RRC Connection Reestablishment Complete) message.

An RRC message is used as an example. The second control message may further include but be not limited to the following messages:

an RRC connection reestablishment (RRC Connection Reestablishment) message;

an RRC connection reject (RRC Connection Reject) message; an RRC connection reestablishment reject (RRC Connection Reestablishment Reject) message; and an RRC connection release (RRC Connection Release) message.

In the data processing solution provided in this embodiment of the present disclosure, a control plane anchor and a user plane anchor are separated from each other. An architecture of a centralized control plane anchor and a distributed user plane anchor is used, so that unified control and coordination can be implemented. In addition, because the user plane anchor processes service data, service data traffic load can be shared, and proximity-based offloading can be implemented, so that a data transmission bottleneck can be avoided, and a data transmission delay can be effectively reduced.

The radio access network and the data processing solution provided in the embodiments of the present disclosure are described above. The following describes an IP packet processing solution provided in an embodiment of the present disclosure.

IP Packet Processing Solution

In a current LTE system, service admission control is implemented by devices such as a PCRF, a PDN GW, and an MME in a core network. Many network entities are used, and the process is relatively complex. In the IP packet processing solution provided in this embodiment of the present disclosure, a radio access network device performs service admission control, so that a service admission control process is simplified.

Further, the radio access network device may perform quality of service (Quality of Service, QoS) management on an IP packet, for example, determine, according to a QoS requirement of the IP packet, an air interface bearer for transmitting the IP packet. The IP packet processing solution provided in this embodiment of the present disclosure is applicable to not only processing of a downlink IP packet, that is, an IP packet sent to a terminal, but also processing of an uplink IP packet, that is, an IP packet that is from the terminal.

The IP packet processing solution provided in this embodiment of the present disclosure may be implemented based on the network structure shown in FIG. 3, and may be applied to the network deployment scenarios shown in FIG. 4B and FIG. 4E. A network function architecture may be shown in FIG. 7, FIG. 5B, or FIG. 5E. An implementation includes but is not limited to the following two optional implementation solutions.

Optional Solution 1

A third device in a radio access network implements service admission control and/or QoS management, and the third device may be the foregoing control plane anchor 302.

Optional Solution 2

A second device in a radio access network implements service admission control and/or QoS management, and the second device may be the foregoing user plane anchor 303.

The following describes the foregoing two optional solutions in detail.

Optional Solution 1

Figure 9:
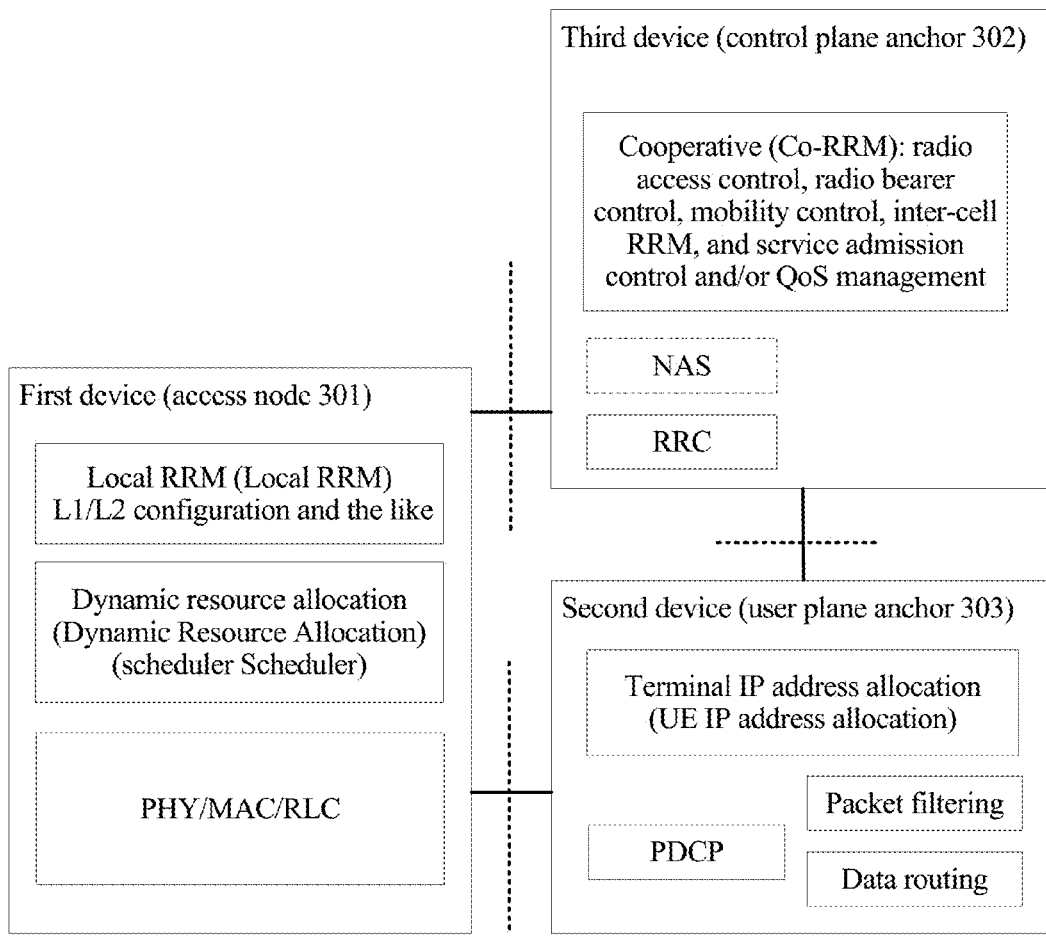
FIG. 9 is a network function architecture diagram of an optional solution 1 according to an embodiment of the present disclosure.

When the optional solution 1 is being used, a network function architecture may be shown in FIG. 9. Compared with the network function architecture shown in FIG. 7, "cooperative RRM" of the third device further includes a service admission control function and/or a QoS management function.

Figure 10:
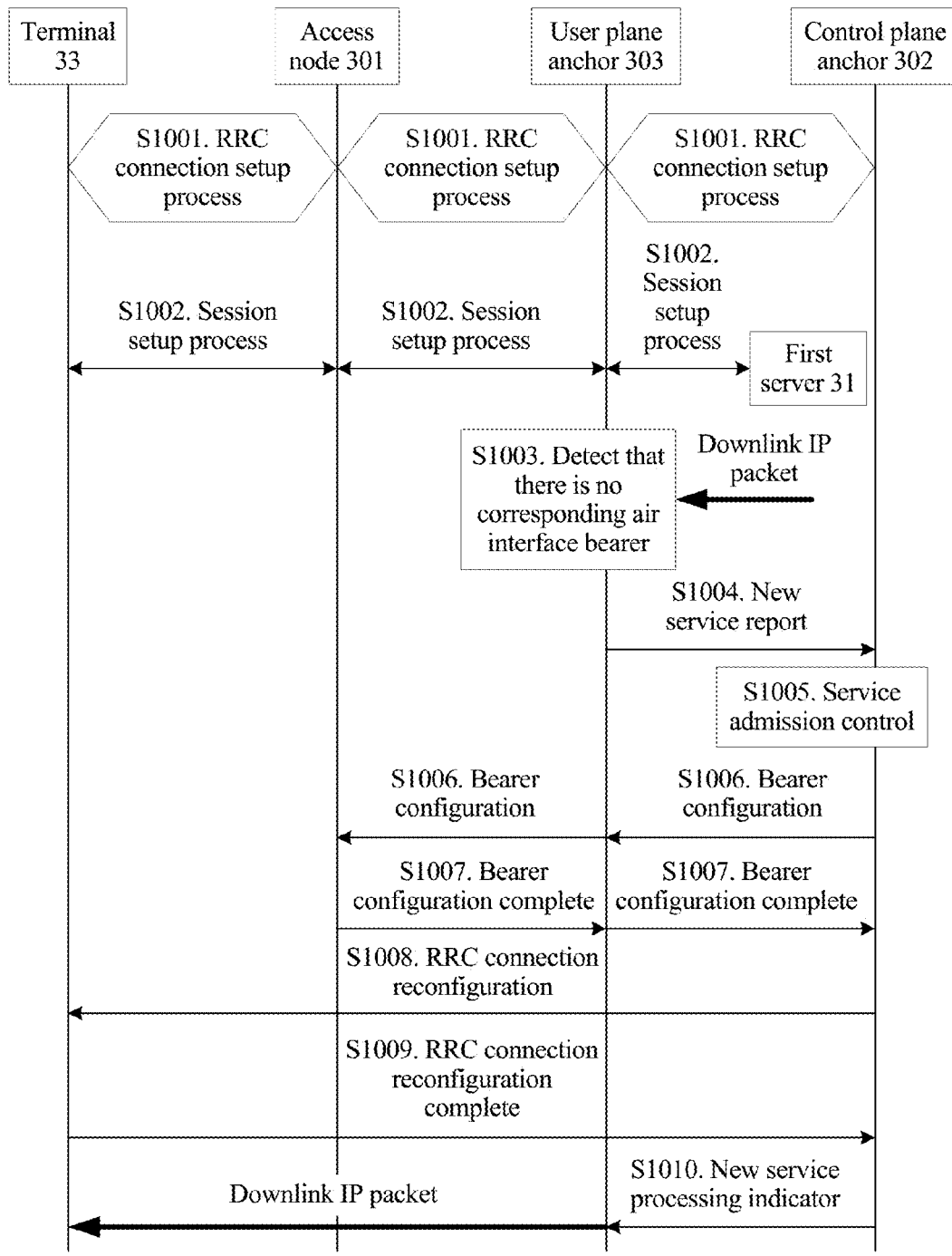
FIG. 10 is a flowchart of the optional solution 1 according to an embodiment of the present disclosure.

The following describes the optional solution 1 with reference to a specific processing procedure shown in FIG. 10. It should be noted that message names in the procedure in this embodiment of the present disclosure are only examples, and during specific implementation, other names can be used provided that implemented functions do not change.

The procedure shown in FIG. 10 includes the following steps.

S1001. A terminal 33 initiates an RRC connection setup process to an access node 301.

The terminal 33 initiates an RRC connection setup process to a cell of the access node 301 actively or under an instruction of a radio access network 30, so as to implement uplink-downlink synchronization with the cell of the access node 301, obtain a C-RNTI, and complete security-related signaling interaction, bearer setup, and an air interface-related configuration process.

S1002. Initiate a session setup process between the terminal 33 and a first server 31.

The process may be initiated by the terminal 33, or the first server 31, or even a third party. The Session Initiation Protocol (Session Initiation Protocol, SIP) may be applied to establish a session. The SIP is a text-based application layer control protocol, is used to create, modify, and release a session of one or more participants, and can support and be applied to multimedia services such as a voice, a video, and data. Application layer signaling related to the session setup process is transmitted, in a manner of being transparent to a wireless communications system, in the wireless communications system by using a default bearer of the terminal 33.

S1003. A user plane anchor 303 determines that a received IP packet has no corresponding air interface bearer.

For example, in or after the session setup process in step S1002, in a packet detection process in which the user plane anchor 303 maps a downlink IP packet to a corresponding air interface bearer, the user plane anchor 303 discovers an IP packet that cannot be mapped to an existing air interface bearer under an existing rule.

For example, the user plane anchor 303 prestores a correspondence between a quintuple (that is, a source IP address, a source port number, a destination IP address, a destination port number, and a transport layer protocol) of an IP packet and an air interface bearer. When receiving a downlink IP packet, the user plane anchor 303 detects a value of a quintuple of the IP packet, to determine an air interface bearer to which the IP packet should be mapped for transmission, and transmits the IP packet to the terminal 33 by using the corresponding air interface bearer.

Therefore, when the prestored correspondence between a quintuple of an IP packet and an air interface bearer does not include a quintuple of the received IP packet, the user plane anchor 303 determines that the IP packet has no corresponding air interface bearer.

S1004. The user plane anchor 303 sends a new service report to a control plane anchor 302.

After determining that the received IP packet has no corresponding air interface bearer, the user plane anchor 303 may send the new service report to the control plane anchor 302. Optionally, the new service report may include the IP packet or the quintuple of the IP packet, so that the control plane anchor 302 determines the to-be-processed IP packet according to the IP packet or the quintuple of the IP packet in the new service report. In addition, the new service report may include a transaction identifier of the new service report, so that the new service report can be distinguished from another report.

S1005. The control plane anchor 302 performs service admission control and/or QoS management.

Optionally, the control plane anchor 302 determines, according to the received new service report, the IP packet that needs to be processed. The control plane anchor 302 obtains subscription information of a user corresponding to a destination terminal of the IP packet; and when a service corresponding to the IP packet is a service allowed by the subscription information, determines to admit the IP packet; or when a service corresponding to the IP packet is not a service allowed by the subscription information, determines to reject the IP packet.

For example, the control plane anchor 302 determines the destination terminal of the IP packet according to a destination IP address in the quintuple, of the IP packet, in the new service report, and then, the control plane anchor 302 obtains the subscription information of the user corresponding to the determined destination terminal. In an optional implementation, when the terminal 33 accesses the wireless communications system, a second server 32 may send subscription information of a user corresponding to the terminal 33 to the control plane anchor 302 in a process of performing authentication on the user of the terminal 33. The control plane anchor 302 stores the received subscription information in the control plane anchor 302. The control plane anchor 302 determines, according to a destination port number in the quintuple, the service corresponding to the IP packet, and then determines whether the service corresponding to the IP packet is a service allowed by the subscription information of the user corresponding to the destination terminal. If the service corresponding to the IP packet is a service allowed by the subscription information of the user corresponding to the destination terminal, the control plane anchor 302 determines to admit the IP packet; or if the service corresponding to the IP packet is not a service allowed by the subscription information of the user corresponding to the destination terminal, the control plane anchor 302 determines to reject the IP packet.

If the control plane anchor 302 determines to reject the IP packet, the control plane anchor 302 sends, to the user plane anchor 303 by performing step S1010, a response message used to indicate that the IP packet is rejected, for example, a new service processing indicator. After receiving the new service processing indicator, the user plane anchor 303 discards the IP packet. Optionally, the user plane anchor 303 records the quintuple of the IP packet and discards a subsequently received IP packet that has the recorded quintuple.

If the control plane anchor 302 determines to admit the IP packet, the control plane anchor 302 may further determine a QoS requirement of the service corresponding to the IP packet, and determines, according to the determined QoS requirement, an air interface bearer used to transmit the IP packet.

Step S1006 is performed if it is determined that the air interface bearer that needs to be used does not exist; or if it is determined that an existing air interface bearer needs to be reconfigured and the reconfigured existing air interface bearer is to be used to transmit the IP packet. For example, a related parameter, such as a bit rate, of the existing air interface bearer needs to be changed to support the service.

S1006. The control plane anchor 302 initiates a bearer configuration process.

The control plane anchor 302 sends a bearer configuration message to the user plane anchor 303. The message may also be considered as a new service processing indicator, and the bearer configuration message may include a parameter of a newly established or reconfigured air interface bearer. The user plane anchor 303 configures a second-part air interface protocol stack (for example, a PDCP layer) of the air interface bearer according to the received parameter. The user plane anchor 303 sends the bearer configuration message to the access node 301, to instruct the access node 301 to configure a first-part air interface protocol stack according to the parameter in the bearer configuration message.

Optionally, the control plane anchor 302 may specify one or more access nodes 301 in the bearer configuration message, and the user plane anchor 303 sends the bearer configuration message to the specified access node 301.

Optionally, the control plane anchor 302 may send the bearer configuration message to both the user plane anchor 303 and the access node 301, to separately instruct the two devices to configure the air interface protocol stacks. The bearer configuration may include three cases: air interface bearer adding, air interface bearer modification, and air interface bearer deletion.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

S1007. The access node 301 and the user plane anchor 303 sends bearer configuration complete messages after completing air interface bearer configuration.

Optionally, the access node 301 sends a bearer configuration complete message to the user plane anchor 303 after completing bearer configuration, and the user plane anchor 303 further sends a bearer configuration complete message to the control plane anchor 302. Alternatively, the access node 301 and the user plane anchor 303 separately sends the bearer configuration complete messages to the control plane anchor 302 after completing bearer configuration.

S1008. The control plane anchor 302 sends an RRC connection reconfiguration message to the terminal 33.

After receiving the bearer configuration complete message sent by the user plane anchor 303, the control plane anchor 302 determines that the radio access network 30 has completed air interface bearer configuration, and sends the RRC connection reconfiguration message to the terminal 33, so as to initiate a process of configuring an air interface bearer on the terminal 33. The RRC connection reconfiguration message includes an air interface bearer configuration parameter.

S1009. The terminal 33 sends an RRC connection reconfiguration complete message to the access node 301.

After completing air interface bearer configuration, the terminal 33 sends the RRC connection reconfiguration complete message to the control plane anchor 302.

S1010. The control plane anchor 302 sends a "new service processing indication" message to the user plane anchor 303.

Step S1006 to step S1009 are optional steps. If the control plane anchor 302 rejects the IP packet in the service admission control process in step S1005, the control plane anchor 302 directly sends, to the user plane anchor 303 by performing step S1010, a new service processing indication message used to indicate that the IP packet is rejected. For example, the message includes a "reject indication".

If the control plane anchor 302 admits the IP packet and no air interface bearer needs to be configured, for example, the IP packet can be mapped to an existing air interface bearer for transmission, and a parameter of the existing air interface bearer does not need to be changed, the control plane anchor 302 also directly sends, to the user plane anchor 303 by performing step S1010, a new service processing indication message that includes identification information of a destination air interface bearer, so as to instruct the user plane anchor 303 to map the IP packet to the destination air interface bearer.

If the control plane anchor 302 admits the IP packet and an air interface bearer needs to be configured, after step S1006 to S1009, the control plane anchor 302 may send a new service processing indication message that includes identification information of a destination air interface bearer and QoS information of the destination air interface bearer to the user plane anchor 303. In a possible implementation, for the terminal 33, there is only a default air interface bearer, and all service data is transmitted on the default air interface bearer. In this case, step S1006 to step S1009 do not need to be performed, the control plane anchor 302 may only indicate "admit" or "reject" in the new service processing indication message, and the new service processing indication message needs to include neither the identification information of the destination air interface bearer nor the QoS information of the destination air interface bearer.

The new service processing indication message may include a transaction identifier, so that the user plane anchor 303 identifies a new service report to which the new service processing indication message is directed.

Optional Solution 2

A main difference between the optional solution 2 and the optional solution 1 lies in that, in the optional solution 2, service admission control or QoS management or both are performed by a user plane anchor 303 instead of a control plane anchor 302. Optionally, the user plane anchor 303 may obtain required subscription information from the control plane anchor 302.

Figure 11:
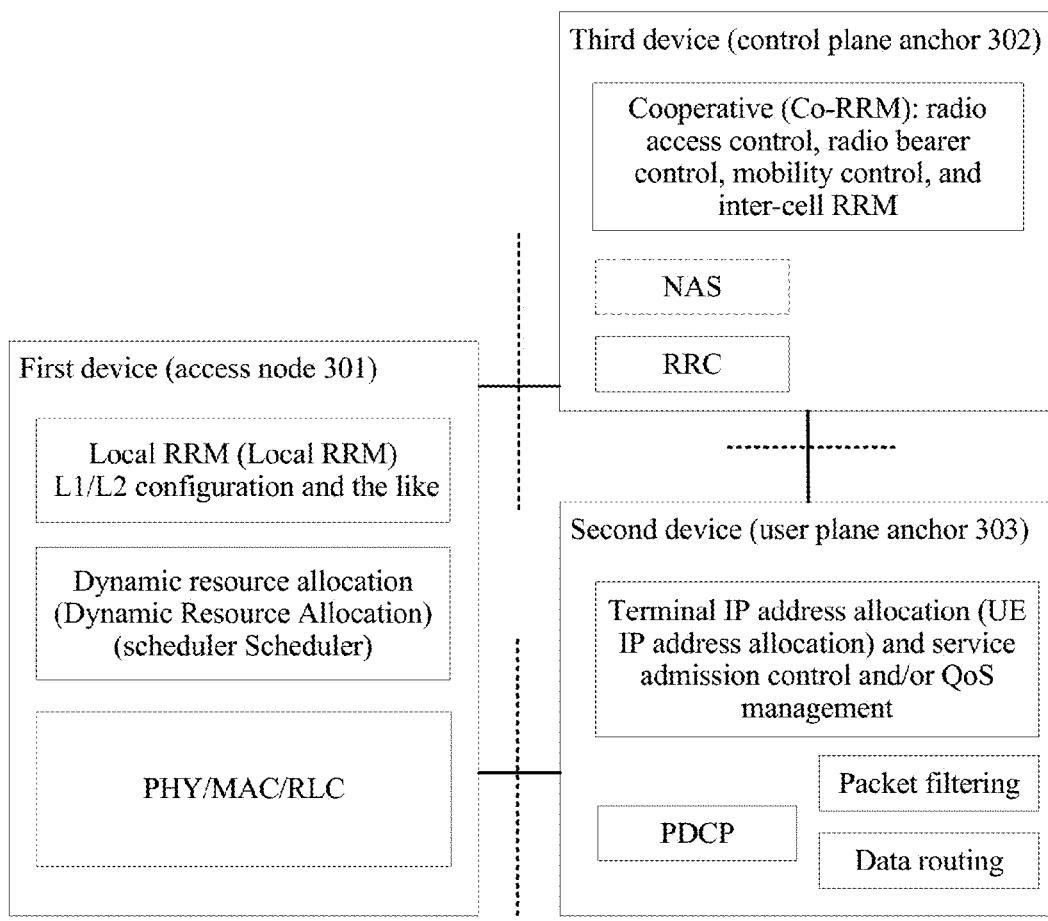
FIG. 11 is a network function architecture diagram of an optional solution 2 according to an embodiment of the present disclosure.

When the optional solution 2 is being used, a network function architecture may be shown in FIG. 11. Compared with the network function architecture shown in FIG. 7, the second device further includes a service admission control function and/or a QoS management function.

Figure 12:
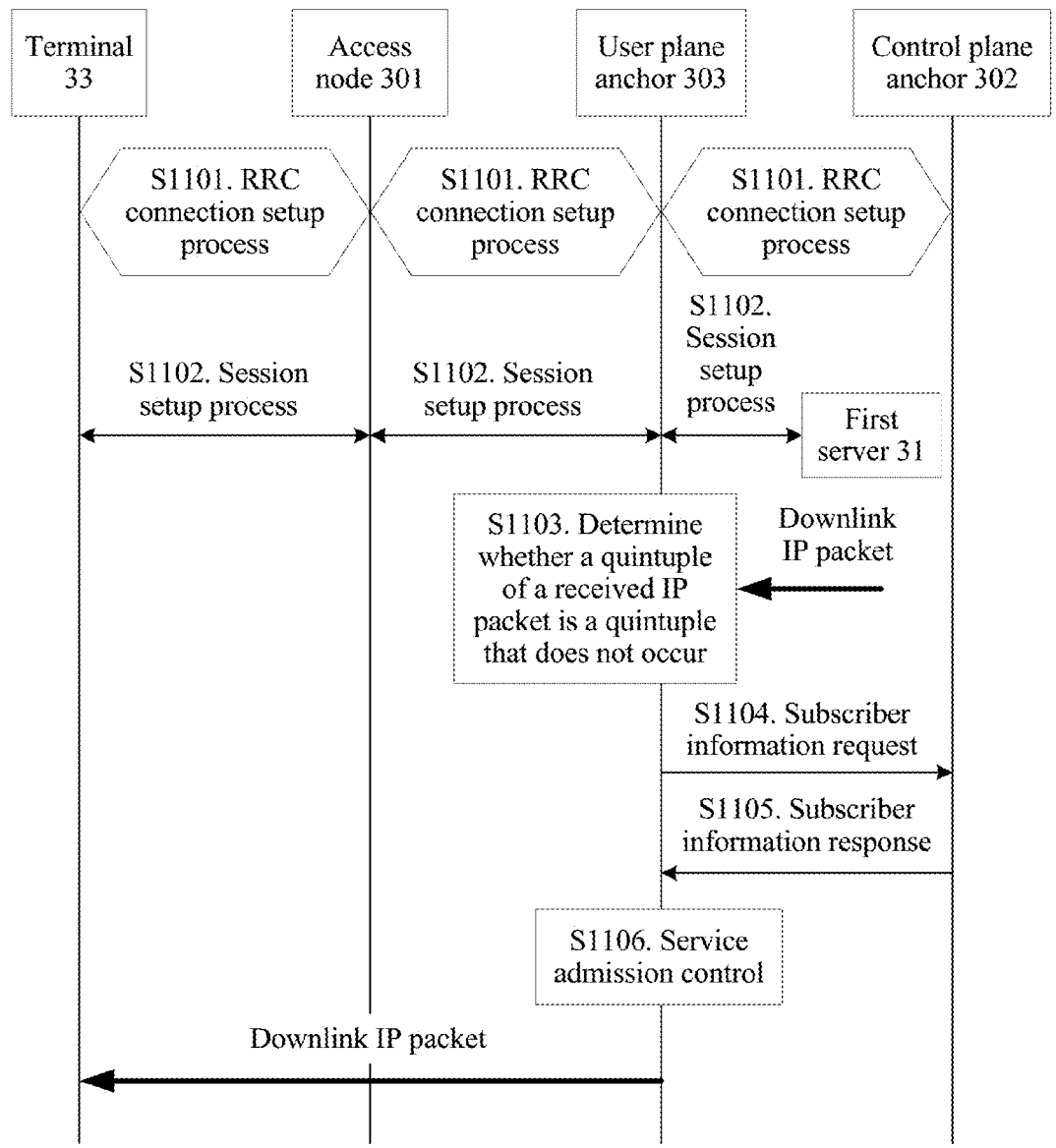
FIG. 12 is a flowchart of the optional solution 2 according to an embodiment of the present disclosure.

The following describes the optional solution 2 with reference to a specific processing procedure shown in FIG. 12. It should be noted that message names in the procedure in this embodiment of the present disclosure are only examples, and during specific implementation, other names can be used provided that implemented functions do not change.

The procedure shown in FIG. 12 includes the following steps.

S1101 and S1102 are respectively the same as step S1001 and step S1002 in the optional solution 1.

S1103. A user plane anchor 303 determines whether a quintuple of a received IP packet is a quintuple that does not occur.

For example, in or after the session setup process in step S1102, in a process in which the user plane anchor 303 performs scheduling priority control on a downlink IP packet, the user plane anchor 303 may discover a new IP packet whose quintuple does not occur.

For example, the user plane anchor 303 prestores a quintuple (that is, a source IP address, a source port number, a destination IP address, a destination port number, and a transport layer protocol) of an IP packet. When receiving a downlink IP packet, the user plane anchor 303 detects a value of a quintuple of the IP packet, to determine whether the quintuple of the IP packet is included in the prestored quintuple. If the quintuple of the IP packet is not included in the prestored quintuple, the user plane anchor 303 determines that the quintuple of the received IP packet does not occur.

If the user plane anchor 303 has subscription information of a user corresponding to a destination terminal of the IP packet, the user plane anchor 303 directly performs step S1106. If the user plane anchor 303 does not have subscription information of a user corresponding to a destination terminal of the IP packet, the user plane anchor 303 performs step S1104 to request the subscription information from a control plane anchor 302.

S1104. The user plane anchor 303 sends a subscription information request message to a control plane anchor 302.

This step is required only when the user plane anchor 303 does not have the subscription information of the user corresponding to the destination terminal of the IP packet. The request message may include at least one of the following information, so as to identify the destination terminal of the IP packet:

the IP packet;
the quintuple of the IP packet;
a source IP address of the IP packet; or
a destination IP address of the IP packet.

In addition, the request message may include a transaction identifier, so that the request message is distinguished from another message.

S1105. The control plane anchor 302 sends a subscription information response message to the user plane anchor 303.

When the terminal 33 accesses a wireless communications system, a second server 32 sends the subscription information to the control plane anchor 302 in a process of performing authentication on a user of the terminal 33. The control plane anchor 302 stores the received subscription information.

The control plane anchor 302 determines the corresponding subscription information according to information that is included in the request message and that is used to identify the destination terminal of the IP packet, and sends the determined subscription information to the user plane anchor 303 by using the subscription information response message.

Optionally, the subscription information response message may include a transaction identifier, so that the user plane anchor 303 determines a subscription information request message to which a response is made.

Alternatively, the control plane anchor 302 may actively send the subscription information to the user plane anchor 303. For example, this occurs after the subscription information changes.

S1106. The user plane anchor 303 performs service admission control.

The user plane anchor 303 may determine, according to the received subscription information, whether to admit the IP packet. If the user plane anchor 303 determines to reject the IP packet, the user plane anchor 303 discards the IP packet and a subsequent IP packet that has a same quintuple as the IP packet. If the user plane anchor 303 determines to admit the IP packet, the user plane anchor 303 further performs QoS management on the IP packet according to the subscription information and/or differentiated services code point (Differentiated Services Code Point, DSCP) information in a header of the IP packet. For a method for performing QoS management by the user plane anchor 303, refer to processing by the control plane anchor 302 in the optional solution 1, and details are not described herein again.

Optionally, the user plane anchor 303 may determine, according to a destination port number in the quintuple of the IP packet, a service corresponding to the IP packet, and then determine whether the service corresponding to the IP packet is a service allowed by the subscription information of the user corresponding to the destination terminal. If the service corresponding to the IP packet is a service allowed by the subscription information of the user corresponding to the destination terminal, the user plane anchor 303 determines to admit the IP packet; or if the service corresponding to the IP packet is not a service allowed by the subscription information of the user corresponding to the destination terminal, the user plane anchor 303 determines to reject the IP packet.

The two optional solutions of the IP packet processing solution that are provided in the embodiments of the present disclosure are described above. A user plane anchor 303 or a control plane anchor 302 implements service admission control and/or QoS management, so that a complex processing procedure in a current LTE system is avoided, and implementation is simple.

When QoS management is being performed by using the foregoing solutions, core network entities such as a PCRF, a PDN GW, and an MME are no longer required, and a complex process in which an IMS system performs service identification and a process in which a bearer is established for a service in a core network are also omitted.

The radio access network, the data processing solution, and the optional solution 1 and the optional solution 2 of the IP packet processing solution that are provided in the embodiments of the present disclosure are described above.

Based on a same inventive concept as the radio access network provided in the embodiments of the present disclosure, the embodiments of the present disclosure further provide one wireless communications system and four radio access network devices.

Based on a same inventive concept as the data processing solution provided in the embodiments of the present disclosure, the embodiments of the present disclosure further provide six radio access network devices and three data processing methods.

Based on a same inventive concept as the optional solution 1, of the IP packet processing solution, provided in the embodiments of the present disclosure, the embodiments of the present disclosure further provide four radio access network devices and two IP packet processing methods.

Based on a same inventive concept as the optional solution 2, of the IP packet processing solution, provided in the embodiments of the present disclosure, the embodiments of the present disclosure further provide two radio access network devices and one IP packet processing method.

Because the inventive concepts are the same, principles of resolving technical problems are the same as those of the foregoing solutions provided in the embodiments of the present disclosure. For implementation, refer to implementation of the foregoing solutions, and details are not repeated.

Figure 13:
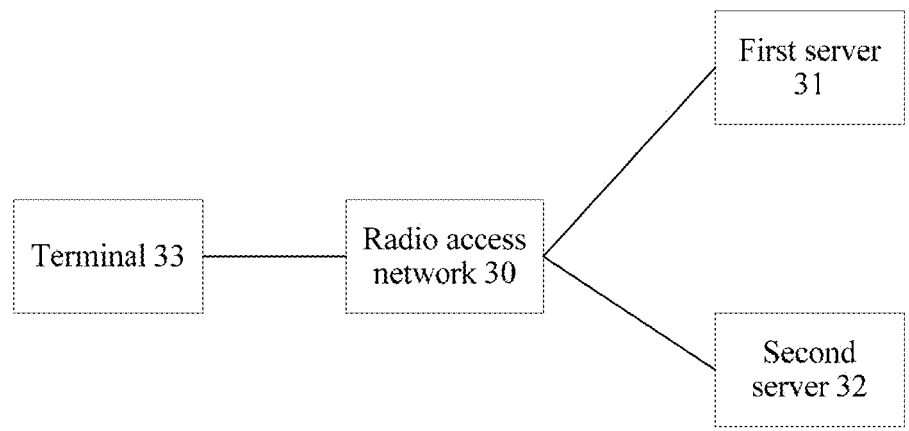
FIG. 13 is a schematic structural diagram of a wireless communications system according to an embodiment of the present disclosure.

FIG. 13 is a schematic structural diagram of a wireless communications system according to an embodiment of the present disclosure. As shown in FIG. 13, the wireless communications system may include:

a radio access network 30;

the foregoing first server 31 and second server 32 that are connected to the radio access network 30; and at least one terminal 33 that is covered by the radio access network 30 and that communicates with the first server 31 by using the radio access network 30.

Optionally, connection in the wireless communications system may be performed in the connection manner shown in FIG. 3.

Figure 14:
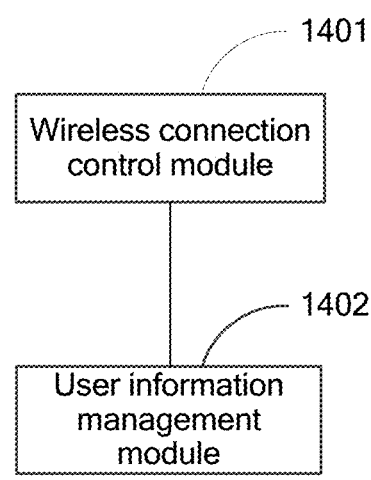
FIG. 14 to FIG. 23 are respectively schematic structural diagrams of ten radio access network devices according to embodiments of the present disclosure.

FIG. 14 is a schematic structural diagram of a radio access network device according to an embodiment of the present disclosure. As shown in FIG. 14, a radio access network in which the device is located, a first server, and a second server are connected to each other over the Internet. The first server is configured to provide an application service for a terminal covered by the radio access network, for example, the foregoing first server 31. The second server is configured to perform user information management on the terminal, for example, the foregoing second server 32.

The device includes:

a wireless connection control module 1401, configured to control the terminal and one or more access nodes in the radio access network to establish a wireless connection; and a user information management module 1402, configured to enable, by exchanging information with the second server, the second server to perform user information management on the terminal.

Optionally, the wireless connection control module 1401 is specifically configured to: configure a transmission parameter of the wireless connection, and establish the wireless connection by using the configured transmission parameter of the wireless connection.

Optionally, the wireless connection control module 1401 is further configured to configure a transmission parameter used when a user plane anchor connected to the terminal performs service data transmission with the terminal.

The user plane anchor is connected to the one or more access nodes, and is configured to: send, to the first server, service data that is forwarded by the one or more access nodes and that is from the terminal; and send, to the terminal by using the one or more access nodes, service data that is received from the first server and that is to be sent to the terminal.

For example, the user plane anchor may be the foregoing user plane anchor 301.

The wireless connection control module 1401 is further configured to perform at least one of the following operations:

performing radio resource control on the terminal;

performing non-access stratum NAS control on the terminal; or performing radio resource management on a radio resource managed by the device.

For another optional implementation of the device, refer to the foregoing control plane anchor 302, and details are not repeated.

Figure 15:
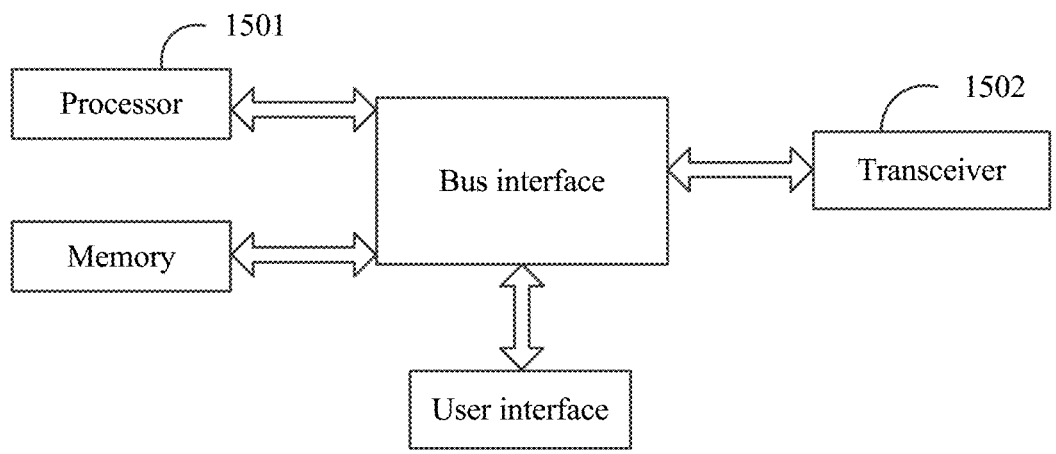

FIG. 15 is a schematic structural diagram of a radio access network device according to an embodiment of the present disclosure. As shown in FIG. 15, the device includes a processor 1501 and a transceiver 1502. The transceiver 1502 is configured to communicate, under the control of the processor 1501, with another device connected to the device.

A radio access network in which the device is located, a first server, and a second server are connected to each other over the Internet. The first server is configured to provide an application service for a terminal covered by the radio access network, for example, the foregoing first server 31. The second server is configured to perform user information management on the terminal, for example, the foregoing second server 32.

The processor 1501 is configured to: control the terminal and one or more access nodes in the radio access network to establish a wireless connection; and control the transceiver 1502 to enable, by exchanging information with the second server, the second server to perform user information management on the terminal.

Optionally, the device may be implemented by using a bus architecture shown in FIG. 15. In FIG. 15, the bus architecture may include any quantity of interconnected buses and bridges, and specifically link various circuits of one or more processors represented by the processor 1501 and a memory. The bus architecture may further link various other circuits such as a peripheral device, a voltage regulator, and a power management circuit. This is well known in the art, and therefore, is not further described in this specification. A bus interface provides an interface. The transceiver 1502 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the device may be implemented without using a bus architecture. For example, the processor 1501 and the transceiver 1502 are directly connected to each other, and do not communicate with each other by using a bus.

For implementation of the processor 1501, refer to processing by the foregoing wireless connection control module 1401 and the foregoing user information management module 1402. For another optional implementation of the device, refer to implementation of the control plane anchor 302 provided in the embodiment of the present disclosure, and details are not repeated.

Figure 16:
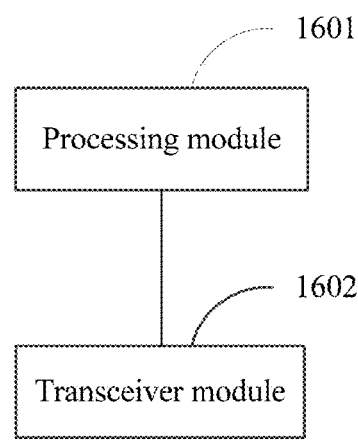

FIG. 16 is a schematic structural diagram of a radio access network device according to an embodiment of the present disclosure. As shown in FIG. 16, a radio access network in which the device is located, a first server, and a second server are connected to each other over the Internet. The first server is configured to provide an application service for a terminal covered by the radio access network. For example, the first server is the foregoing first server 31. The second server is configured to perform user information management on the terminal. For example, the second server is the foregoing second server 32.

The device includes a processing module 1601 and a transceiver module 1602.

The processing module 1601 is configured to control the transceiver module 1602 to receive and send data.

The transceiver module 1602 is configured to: send, to the first server, service data that is from the terminal and that is forwarded by one or more access nodes in the radio access network that keep a wireless connection to the terminal; and send, to the terminal by using the one or more access nodes, service data that is received from the first server and that is to be sent to the terminal.

Optionally, the transceiver module 1602 is further configured to receive a transmission parameter that is sent by a control plane anchor, of the terminal, in the radio access network and that is used when the radio access network device to forward service data of the terminal.

The processing module 1601 is specifically configured to control the transceiver module 1602 to forward the service data of the terminal according to the transmission parameter.

Optionally, the device is further configured to perform at least one of the following operations:

allocating an IP address to the terminal connected to the device;

aggregating service data of the terminal connected to the device;

filtering service data of the terminal connected to the device; or routing service data of the terminal connected to the device.

For another optional implementation of the device, refer to the user plane anchor 303, and details are not repeated.

Figure 17:
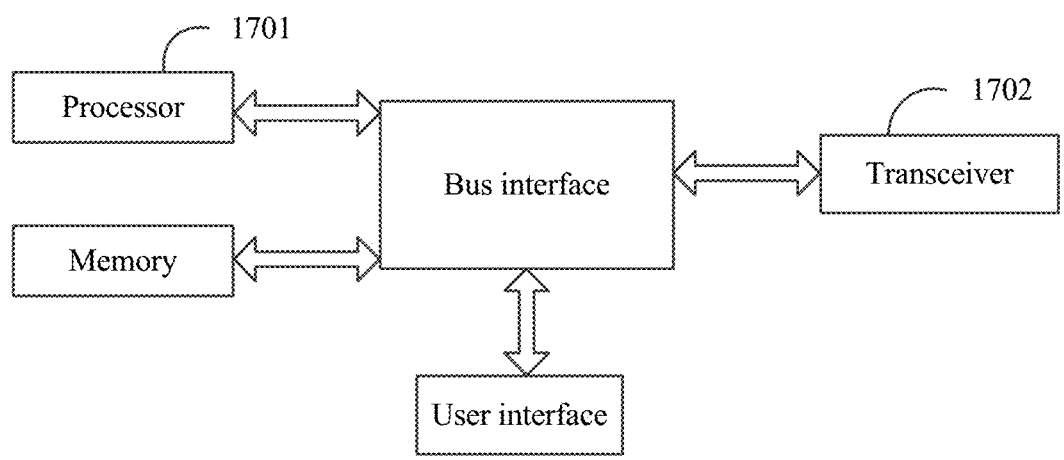

FIG. 17 is a schematic structural diagram of a radio access network device according to an embodiment of the present disclosure. As shown in FIG. 17, a radio access network in which the device is located, a first server, and a second server are connected to each other over the Internet. The first server is configured to provide an application service for a terminal covered by the radio access network. For example, the first server is the foregoing first server 31. The second server is configured to perform user information management on the terminal. For example, the second server is the foregoing second server 32.

The device includes a processor 1701 and a transceiver 1702.

The processor 1701 is configured to control the transceiver 1702 to receive and send data.

The transceiver 1702 is configured to: send, to the first server, service data that is from the terminal and that is forwarded by one or more access nodes in the radio access network that keep a wireless connection to the terminal; and send, to the terminal by using the one or more access nodes, service data that is received from the first server and that is to be sent to the terminal.

Optionally, the device may be implemented by using a bus architecture shown in FIG. 17. In FIG. 17, the bus architecture may include any quantity of interconnected buses and bridges, and specifically link various circuits of one or more processors represented by the processor 1701 and a memory. The bus architecture may further link various other circuits such as a peripheral device, a voltage regulator, and a power management circuit. This is well known in the art, and therefore, is not further described in this specification. A bus interface provides an interface. The transceiver 1702 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the device may be implemented without using a bus architecture. For example, the processor 1701 and the transceiver 1702 are directly connected to each other, and do not communicate with each other by using a bus.

For another optional implementation of the processor 1701, refer to the processing module 1601. For another optional implementation of the transceiver 1702, refer to the transceiver module 1602. For another optional implementation of the device, refer to the user plane anchor 303.

Figure 18:
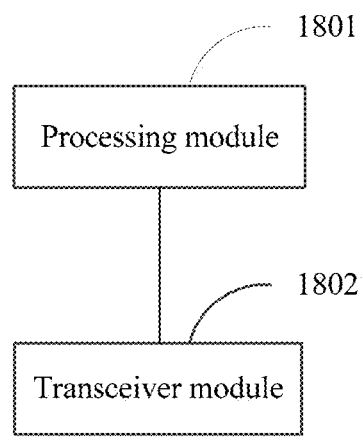

FIG. 18 is a schematic structural diagram of a radio access network device according to an embodiment of the present disclosure. To be easily distinguished from another radio access network device, the device is referred to as a first device. As shown in FIG. 18, the first device includes:

a transceiver module 1802, configured to receive first data sent by a terminal by using an air interface; and a processing module 1801, configured to: process, at a first-part air interface protocol stack, the first data received by the transceiver module 1802, and send the processed first data to a second device in a radio access network for processing at a second-part air interface protocol stack.

Optionally, the transceiver module 1802 is further configured to receive second data sent by the second device, where the second data has been processed by the second device at the second-part air interface protocol stack.

The processing module 1801 is further configured to: process, at the first-part air interface protocol stack, the second data received by the transceiver module 1802, and then send the processed second data to the terminal by using the transceiver module 1802.

The first data is first service data or a first control message.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second data is second service data or a second control message.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

Optionally, the first control message is the wireless connection complete message.

The transceiver module 1802 is further configured to: after sending the first control message to the second device, receive a configuration parameter that is of the first-part air interface protocol stack of the terminal and that is sent by a third device in the radio access network.

The processing module 1801 is further configured to: configure the first-part air interface protocol stack according to the configuration parameter received by the transceiver module 1802, and process the first service data, the second service data, a subsequent first control message, and a subsequent second control message of the terminal by using the configured first-part air interface protocol stack.

Optionally, the first control message is the wireless connection complete message.

The transceiver module 1802 is further configured to: after sending the first control message to the second device, receive a configuration parameter that is of the first-part air interface protocol stack of an air interface bearer of the terminal and that is sent by a third device in the radio access network, where the air interface bearer is used to bear at least one of the first service data, the second service data, a subsequent first control message, or a subsequent second control message of the terminal.

The processing module 1801 is further configured to: configure the first-part air interface protocol stack according to the configuration parameter received by the transceiver module 1802, and process the air interface bearer of the terminal by using the configured first-part air interface protocol stack.

Optionally, the first control message is the wireless connection complete message, and the transceiver module 1802 is further configured to:

before receiving the first control message sent by the terminal by using the air interface, receive a random access preamble sent by the terminal;

after receiving the random access preamble sent by the terminal, obtain, from a third device in the radio access network, a user identifier allocated to the terminal; and send the obtained user identifier to the terminal by using a random access response message, so that the terminal obtains the user identifier.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

For another optional implementation of the first device, refer to the first device in the foregoing data processing solution, and details are not repeated.

Figure 19:
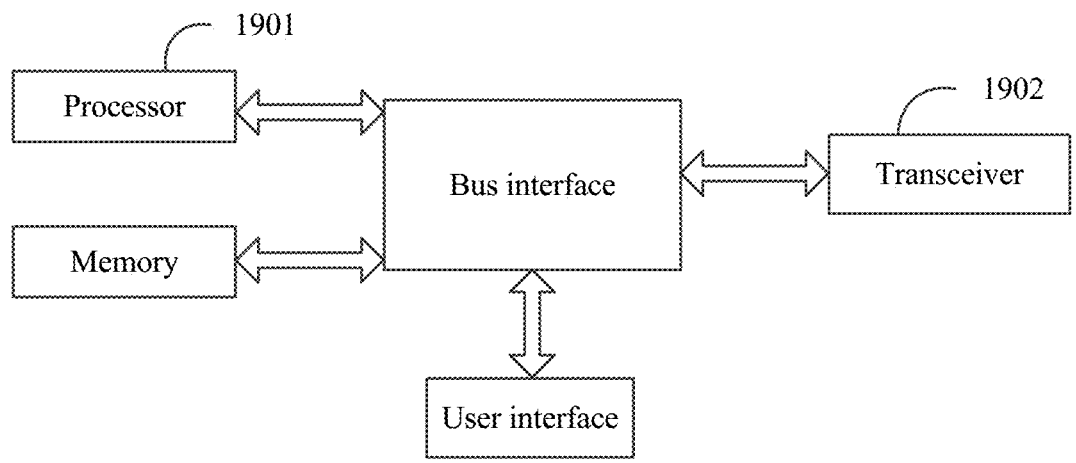

FIG. 19 is a schematic structural diagram of a radio access network device according to an embodiment of the present disclosure. To be easily distinguished from another radio access network device, the device is referred to as a first device. As shown in FIG. 19, the first device includes:

a transceiver 1902, configured to receive first data sent by a terminal by using an air interface; and a processor 1901, configured to: process, at a first-part air interface protocol stack, the first data received by the transceiver 1902, and send the processed first data to a second device in a radio access network for processing at a second-part air interface protocol stack.

Optionally, the first device may be implemented by using a bus architecture shown in FIG. 19. In FIG. 19, the bus architecture may include any quantity of interconnected buses and bridges, and specifically link various circuits of one or more processors represented by the processor 1901 and a memory. The bus architecture may further link various other circuits such as a peripheral device, a voltage regulator, and a power management circuit. This is well known in the art, and therefore, is not further described in this specification. A bus interface provides an interface. The transceiver 1902 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the first device may be implemented without using a bus architecture. For example, the processor 1901 and the transceiver 1902 are directly connected to each other, and do not communicate with each other by using a bus.

For another optional implementation of the transceiver 1902, refer to the transceiver module 1802. For another optional implementation of the processor 1901, refer to the processing module 1801. For another optional implementation of the device, refer to the first device in the foregoing data processing solution. Details are not repeated.

Figure 20:
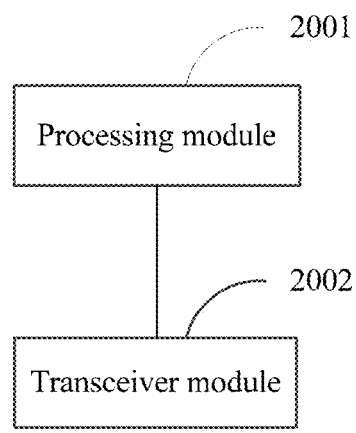

FIG. 20 is a schematic structural diagram of a radio access network device according to an embodiment of the present disclosure. To be easily distinguished from another radio access network device, the device is referred to as a second device. As shown in FIG. 20, the second device includes:

a transceiver module 2002, configured to receive first data sent by a first device in a radio access network, where the first data is sent by the first device after the first device receives, by using an air interface, the first data from a terminal covered by the radio access network and processes the first data at a first-part air interface protocol stack; and a processing module 2001, configured to process, at a second-part air interface protocol stack, the first data received by the transceiver module 2002.

Optionally, the transceiver module 2002 is further configured to receive second data from a third device in the radio access network.

The processing module 2001 is further configured to: process, at the second-part air interface protocol stack, the second data received by the transceiver module 2002, and send the processed second data to the first device.

Optionally, the first data is first service data or a first control message.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second data is second service data or a second control message.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first control message is the wireless connection complete message.

The transceiver module 2002 is further configured to: after sending the first control message to the third device, receive a configuration parameter that is of the second-part air interface protocol stack of the terminal and that is sent by the third device.

The processing module 2001 is further configured to: configure the second-part air interface protocol stack according to the configuration parameter received by the transceiver module 2002, and process the first service data, the second service data, a subsequent first control message, and a subsequent second control message of the terminal by using the configured second-part air interface protocol stack.

Optionally, the first control message is the wireless connection complete message.

The transceiver module 2002 is further configured to: after sending the first control message to the third device, receive a configuration parameter that is of the second-part air interface protocol stack of an air interface bearer of the terminal and that is sent by the third device, where the air interface bearer is used to bear at least one of the first service data, the second service data, a subsequent first control message, or a subsequent second control message of the terminal.

The processing module 2001 is further configured to: configure the second-part air interface protocol stack according to the configuration parameter received by the transceiver module 2002, and process the air interface bearer of the terminal by using the configured second-part air interface protocol stack.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack;

and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

For another optional implementation of the device, refer to the second device in the foregoing data processing solution, and details are not repeated.

Figure 21:
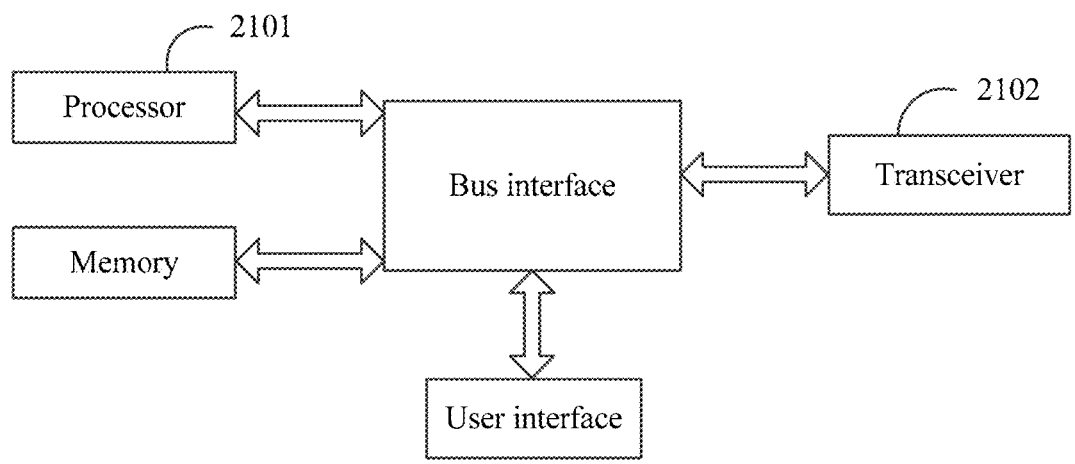

FIG. 21 is a schematic structural diagram of a radio access network device according to an embodiment of the present disclosure. To be easily distinguished from another radio access network device, the device is referred to as a second device. As shown in FIG. 21, the second device includes:

a transceiver 2102, configured to receive first data sent by a first device in a radio access network, where the first data is sent by the first device after the first device receives, by using an air interface, the first data from a terminal covered by the radio access network and processes the first data at a first-part air interface protocol stack; and a processor 2101, configured to process, at a second-part air interface protocol stack, the first data received by the transceiver 2102.

Optionally, the second device may be implemented by using a bus architecture shown in FIG. 21. In FIG. 21, the bus architecture may include any quantity of interconnected buses and bridges, and specifically link various circuits of one or more processors represented by the processor 2101 and a memory. The bus architecture may further link various other circuits such as a peripheral device, a voltage regulator, and a power management circuit. This is well known in the art, and therefore, is not further described in this specification. A bus interface provides an interface. The transceiver 2102 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the second device may be implemented without using a bus architecture. For example, the processor 2101 and the transceiver 2102 are directly connected to each other, and do not communicate with each other by using a bus.

For another optional implementation of the transceiver 2102, refer to the transceiver module 2002. For another optional implementation of the processor 2101, refer to the processing module 2001. For another optional implementation of the device, refer to the second device in the foregoing data processing solution. Details are not repeated.

Figure 22:
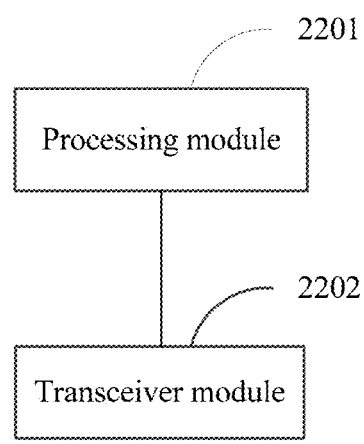

FIG. 22 is a schematic structural diagram of a radio access network device according to an embodiment of the present disclosure. To be easily distinguished from another radio access network device, the device is referred to as a third device. As shown in FIG. 22, the third device includes:

a transceiver module 2202, configured to receive a first control message from a second device in a radio access network, where the first control message is used to control a wireless connection between a terminal covered by the radio access network and a first device in the radio access network, is processed by the first device at a first-part air interface protocol stack, is processed by the second device at a second-part air interface protocol stack, and then, is sent to the third device; and the first device, the second device, and the third device are connected to each other; and a processing module 2201, configured to process the first control message received by the transceiver module 2202.

Optionally, the processing module 2201 is further configured to:

control the transceiver module 2202 to send a second control message to the second device.

The second control message is used to control the wireless connection between the terminal and the first device, so that the second device processes the second control message at the second-part air interface protocol stack, and then, the first device processes the second control message at the first-part air interface protocol stack and then sends the processed second control message to the terminal.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first control message is the wireless connection complete message.

The processing module 2201 is further configured to: after controlling the transceiver module 2202 to receive the first control message, send a configuration parameter of the first-part air interface protocol stack of the terminal to the first device, so that the first device performs the following steps:

configuring the first-part air interface protocol stack according to the received configuration parameter, and processing service data, a subsequent first control message, and a subsequent second control message of the terminal by using the configured first-part air interface protocol stack.

Optionally, the first control message is the wireless connection complete message.

The processing module 2201 is further configured to: after controlling the transceiver module 2202 to receive the first control message, send a configuration parameter of the first-part air interface protocol stack of an air interface bearer of the terminal to the first device, where the air interface bearer is used to bear at least one of service data, a subsequent first control message, or a subsequent second control message of the terminal, so that the first device performs the following steps:

configuring the first-part air interface protocol stack according to the received configuration parameter, and processing the air interface bearer of the terminal by using the configured first-part air interface protocol stack.

Optionally, the first control message is the wireless connection complete message, and after the third device receives the first control message, the method further includes:

sending, by the third device, a configuration parameter of the second-part air interface protocol stack of the terminal to the second device, so that the second device performs the following steps:

configuring the second-part air interface protocol stack according to the received configuration parameter, and processing service data, a subsequent first control message, and a subsequent second control message of the terminal by using the configured second-part air interface protocol stack.

Optionally, the first control message is the wireless connection complete message.

The processing module 2201 is further configured to: after controlling the transceiver module 2202 to receive the first control message, send a configuration parameter of the second-part air interface protocol stack of an air interface bearer of the terminal to the second device, where the air interface bearer is used to bear at least one of service data, a subsequent first control message, or a subsequent second control message of the terminal, so that the second device performs the following steps:

configuring the second-part air interface protocol stack according to the received configuration parameter, and processing the air interface bearer of the terminal by using the configured second-part air interface protocol stack.

Optionally, the first control message is the wireless connection complete message.

The transceiver module 2202 is further configured to: before receiving the first control message, receive a random access preamble sent by the first device, where the random access preamble is sent by the terminal to the first device.

The processing module 2201 is further configured to allocate a user identifier to the terminal.

The transceiver module 2202 is further configured to send, to the first device by using a random access response message, the user identifier allocated by the processing module 2201, so that the first device forwards the user identifier to the terminal.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

For another optional implementation of the third device, refer to the third device in the foregoing data processing solution, and details are not repeated.

Figure 23:
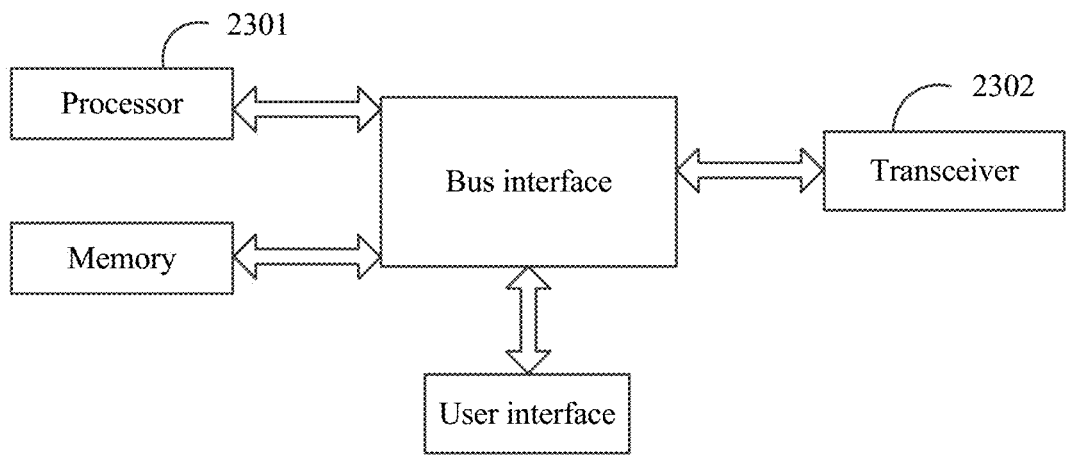

FIG. 23 is a schematic structural diagram of a radio access network device according to an embodiment of the present disclosure. To be easily distinguished from another radio access network device, the device is referred to as a third device. As shown in FIG. 23, the third device includes:

a transceiver 2302, configured to receive a first control message from a second device in a radio access network, where the first control message is used to control a wireless connection between a terminal covered by the radio access network and a first device in the radio access network, is processed by the first device at a first-part air interface protocol stack, is processed by the second device at a second-part air interface protocol stack, and then, is sent to the third device; and the first device, the second device, and the third device are connected to each other; and a processor 2301, configured to process the first control message received by the transceiver 2302.

Optionally, the third device may be implemented by using a bus architecture shown in FIG. 23. In FIG. 23, the bus architecture may include any quantity of interconnected buses and bridges, and specifically link various circuits of one or more processors represented by the processor 2301 and a memory. The bus architecture may further link various other circuits such as a peripheral device, a voltage regulator, and a power management circuit. This is well known in the art, and therefore, is not further described in this specification. A bus interface provides an interface. The transceiver 2302 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the third device may be implemented without using a bus architecture. For example, the processor 2301 and the transceiver 2302 are directly connected to each other, and do not communicate with each other by using a bus.

For another optional implementation of the transceiver 2302, refer to the transceiver module 2202. For another optional implementation of the processor 2301, refer to the processing module 2201. For another optional implementation of the third device, refer to the third device in the foregoing data processing solution. Details are not repeated.

Figure 24:
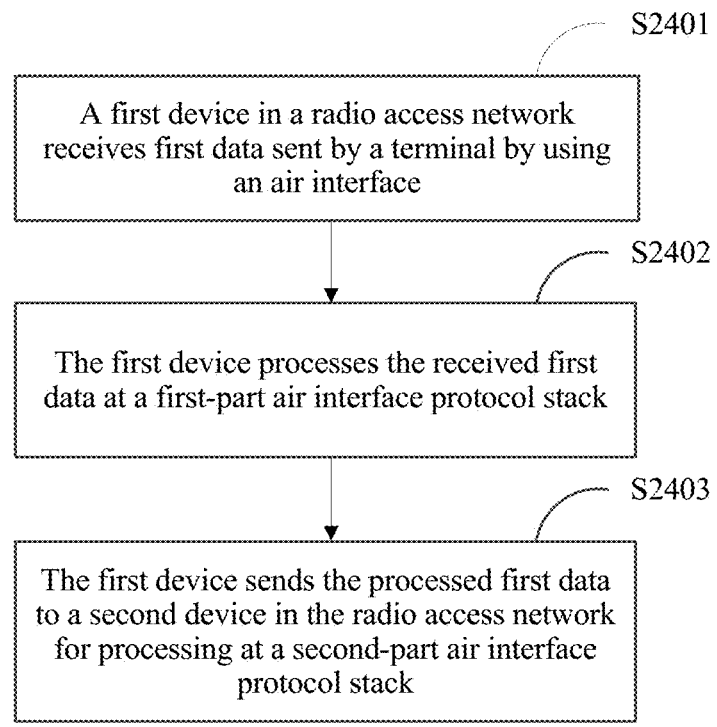
FIG. 24 to FIG. 26 are respectively flowcharts of three data processing methods according to embodiments of the present disclosure.

FIG. 24 is a flowchart of a data processing method according to an embodiment of the present disclosure. As shown in FIG. 24, the method includes the following steps.

S2401. A first device in a radio access network receives first data sent by a terminal by using an air interface.

S2402. The first device processes the received first data at a first-part air interface protocol stack.

S2403. The first device sends the processed first data to a second device in the radio access network for processing at a second-part air interface protocol stack.

Optionally, the method further includes:

receiving, by the first device, second data sent by the second device, where the second data has been processed by the second device at the second-part air interface protocol stack; and processing, by the first device, the received second data at the first-part air interface protocol stack, and then sending the processed second data to the terminal.

The first data is first service data or a first control message.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second data is second service data or a second control message.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

Optionally, the first control message is the wireless connection complete message, and after the first device sends the first control message to the second device, the method further includes:

receiving, by the first device, a configuration parameter that is of the first-part air interface protocol stack of the terminal and that is sent by a third device in the radio access network;

configuring, by the first device, the first-part air interface protocol stack according to the received configuration parameter; and processing, by the first device, the first service data, the second service data, a subsequent first control message, and a subsequent second control message of the terminal by using the configured first-part air interface protocol stack.

Optionally, the first control message is the wireless connection complete message, and after the first device sends the first control message to the second device, the method further includes:

receiving, by the first device, a configuration parameter that is of the first-part air interface protocol stack of an air interface bearer of the terminal and that is sent by a third device in the radio access network, where the air interface bearer is used to bear at least one of the first service data, the second service data, a subsequent first control message, or a subsequent second control message of the terminal;

configuring, by the first device, the first-part air interface protocol stack according to the received configuration parameter; and processing, by the first device, the air interface bearer of the terminal by using the configured first-part air interface protocol stack.

Optionally, the first control message is the wireless connection complete message, and before the first device receives the first control message sent by the terminal by using the air interface, the method further includes:

receiving, by the first device, a random access preamble sent by the terminal;

after receiving the random access preamble sent by the terminal, obtaining, by the first device from a third device in the radio access network, a user identifier allocated to the terminal; and sending, by the first device, the obtained user identifier to the terminal by using a random access response message, so that the terminal obtains the user identifier.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer and a part of a MAC layer, and the second-part air interface protocol stack includes the rest of the MAC layer, an RLC layer, and a PDCP layer; or the first-part air interface protocol stack includes a PHY layer, and the second-part air interface protocol stack includes a MAC layer, an RLC layer, and a PDCP layer.

For another optional implementation of the method, refer to processing by the first device in the foregoing data processing solution, and details are not repeated.

Figure 25:
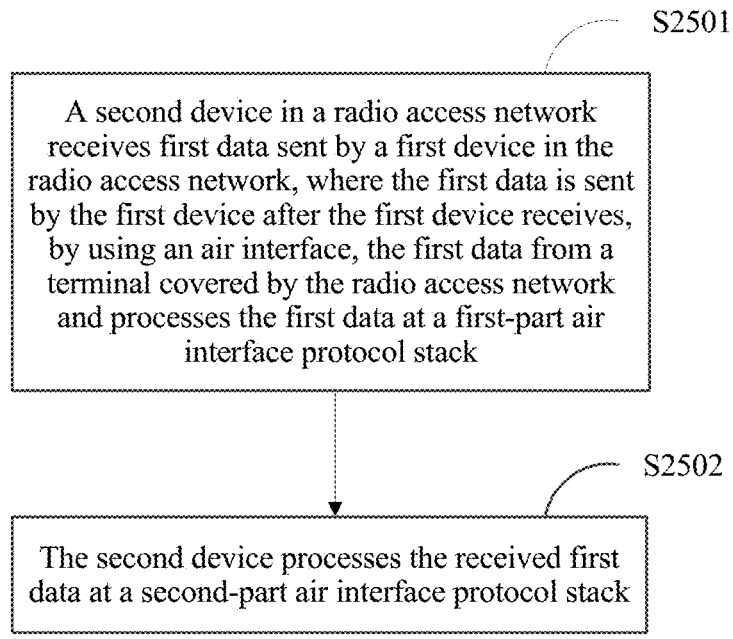

FIG. 25 is a flowchart of a data processing method according to an embodiment of the present disclosure. As shown in FIG. 25, the method includes the following steps.

S2501. A second device in a radio access network receives first data sent by a first device in the radio access network, where the first data is sent by the first device after the first device receives, by using an air interface, the first data from a terminal covered by the radio access network and processes the first data at a first-part air interface protocol stack.

S2502. The second device processes the received first data at a second-part air interface protocol stack.

Optionally, the method further includes:

receiving, by the second device, second data from a third device in the radio access network;

processing, by the second device, the received second data at the second-part air interface protocol stack; and sending, by the second device, the processed second data to the first device.

Optionally, the first data is first service data or a first control message.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second data is second service data or a second control message.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first control message is the wireless connection complete message, and after the second device sends the first control message to the third device, the method further includes:

receiving, by the second device, a configuration parameter that is of the second-part air interface protocol stack of the terminal and that is sent by the third device;

configuring, by the second device, the second-part air interface protocol stack according to the received configuration parameter; and processing, by the second device, the first service data, the second service data, a subsequent first control message, and a subsequent second control message of the terminal by using the configured second-part air interface protocol stack.

Optionally, the first control message is the wireless connection complete message, and after the second device sends the first control message to the third device, the method further includes:

receiving, by the second device, a configuration parameter that is of the second-part air interface protocol stack of an air interface bearer of the terminal and that is sent by the third device, where the air interface bearer is used to bear at least one of the first service data, the second service data, a subsequent first control message, or a subsequent second control message of the terminal;

configuring, by the second device, the second-part air interface protocol stack according to the received configuration parameter; and processing, by the second device, the air interface bearer of the terminal by using the configured second-part air interface protocol stack.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

For another optional implementation of the method, refer to processing by the second device in the foregoing data processing solution, and details are not repeated.

Figure 26:
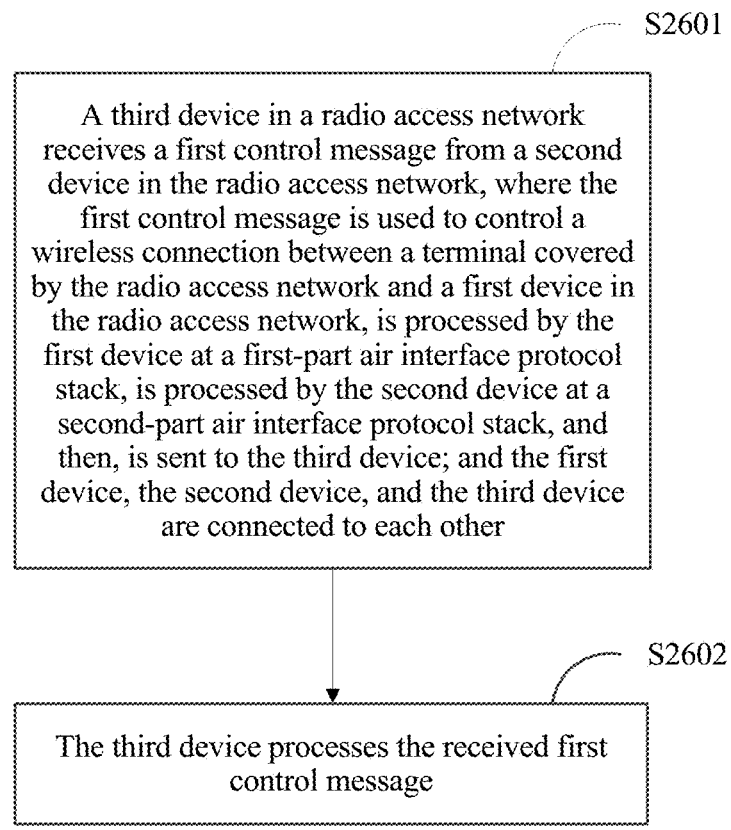

FIG. 26 is a flowchart of a data processing method according to an embodiment of the present disclosure. As shown in FIG. 26, the method includes the following steps.

S2601. A third device in a radio access network receives a first control message from a second device in the radio access network.

The first control message is used to control a wireless connection between a terminal covered by the radio access network and a first device in the radio access network, is processed by the first device at a first-part air interface protocol stack, is processed by the second device at a second-part air interface protocol stack, and then, is sent to the third device; and the first device, the second device, and the third device are connected to each other.

S2602. The third device processes the received first control message.

Optionally, the method further includes:

sending, by the third device, a second control message to the second device, where the second control message is used to control the wireless connection between the terminal and the first device, so that the second device processes the second control message at the second-part air interface protocol stack, and then, the first device processes the second control message at the first-part air interface protocol stack and then sends the processed second control message to the terminal.

Optionally, the first control message includes any one of the following messages:

a wireless connection request message, used to request to establish a wireless connection; or a wireless connection complete message, used to indicate that wireless connection setup is completed; or a security mode complete message, used to indicate that security mode configuration of a wireless connection is completed; or a wireless connection reconfiguration complete message, used to indicate that wireless connection reconfiguration is completed or wireless measurement configuration of a wireless connection is completed.

Optionally, the second control message includes any one of the following messages:

a wireless connection setup message, used to configure a parameter of a wireless connection; or a security mode command message, used to configure a security-related parameter of a wireless connection; or a wireless connection reconfiguration message, used to reconfigure a wireless connection or used to configure a wireless measurement of a wireless connection.

Optionally, the first control message is the wireless connection complete message, and after the third device receives the first control message, the method further includes:

sending, by the third device, a configuration parameter of the first-part air interface protocol stack of the terminal to the first device, so that the first device performs the following steps:

configuring the first-part air interface protocol stack according to the received configuration parameter, and processing service data, a subsequent first control message, and a subsequent second control message of the terminal by using the configured first-part air interface protocol stack.

Optionally, the first control message is the wireless connection complete message, and after the third device receives the first control message, the method further includes:

sending, by the third device, a configuration parameter of the first-part air interface protocol stack of an air interface bearer of the terminal to the first device, where the air interface bearer is used to bear at least one of service data, a subsequent first control message, or a subsequent second control message of the terminal, so that the first device performs the following steps:

configuring the first-part air interface protocol stack according to the received configuration parameter, and processing the air interface bearer of the terminal by using the configured first-part air interface protocol stack.

Optionally, the first control message is the wireless connection complete message, and after the third device receives the first control message, the method further includes:

sending, by the third device, a configuration parameter of the second-part air interface protocol stack of the terminal to the second device, so that the second device performs the following steps:

configuring the second-part air interface protocol stack according to the received configuration parameter, and processing service data, a subsequent first control message, and a subsequent second control message of the terminal by using the configured second-part air interface protocol stack.

Optionally, the first control message is the wireless connection complete message, and after the third device receives the first control message, the method further includes:

sending, by the third device, a configuration parameter of the second-part air interface protocol stack of an air interface bearer of the terminal to the second device, where the air interface bearer is used to bear at least one of service data, a subsequent first control message, or a subsequent second control message of the terminal, so that the second device performs the following steps:

configuring the second-part air interface protocol stack according to the received configuration parameter, and processing the air interface bearer of the terminal by using the configured second-part air interface protocol stack.

Optionally, the first control message is the wireless connection complete message, and before the third device receives the first control message, the method further includes:

receiving, by the third device, a random access preamble sent by the first device, where the random access preamble is sent by the terminal to the first device;

allocating, by the third device, a user identifier to the terminal; and sending, by the third device, the obtained user identifier to the first device by using a random access response message, so that the first device forwards the user identifier to the terminal.

Optionally, the first device is an access node in the radio access network, and keeps a wireless connection to the terminal.

The second device is a user plane anchor of the first device, and is configured to: transmit service data between the terminal and a first server on the Internet, and perform processing at the second-part air interface protocol stack; and the first server is configured to provide an application service for the terminal covered by the radio access network.

The second device is a control plane anchor of the first device, and is configured to: control the terminal and the access node to establish a wireless connection, and enable, by exchanging information with a second server, the second server to perform user information management on the terminal; and the second server is configured to perform user information management on the terminal covered by the radio access network.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

For another optional implementation of the method, refer to processing by the third device in the foregoing data processing solution, and details are not repeated.

Figure 27:
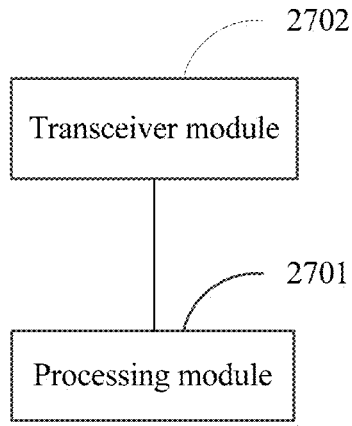
FIG. 27 to FIG. 30 are respectively schematic structural diagrams of four radio access network devices according to embodiments of the present disclosure.

FIG. 27 is a schematic structural diagram of a radio access network device according to an embodiment of the present disclosure. To be distinguished from another radio access network device, the device is referred to as a second device herein. As shown in FIG. 27, the second device includes:

a transceiver module 2702, configured to: when a received IP packet has no corresponding air interface bearer, send a new service report to a third device in a radio access network to indicate that the IP packet has no corresponding air interface bearer; and receive a response message sent by the third device in response to the new service report; and a processing module 2701, configured to process the IP packet according to the response message received by the transceiver module 2702.

Optionally, the transceiver module 2702 is further configured to receive the IP packet before sending the new service report to the third device.

The processing module 2701 is further configured to: when a prestored correspondence between a quintuple of an IP packet and an air interface bearer does not include a quintuple of the IP packet, determine that the IP packet has no corresponding air interface bearer.

Optionally, the new service report includes the IP packet and/or the quintuple of the IP packet, so that the third device determines the IP packet according to the new service report.

Optionally, the response message is used to indicate that the IP packet is rejected.

The processing module 2701 is specifically configured to discard the IP packet.

Optionally, the processing module 2701 is specifically configured to: record the quintuple of the IP packet, and discard a subsequently received IP packet that has the recorded quintuple of the IP packet.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

Optionally, the response message is used to indicate that the IP packet is admitted and instruct to newly establish an air interface bearer used to transmit the IP packet.

The processing module 2701 is specifically configured to:
complete configuration of a second-part air interface protocol stack of the newly established air interface bearer according to a parameter that is of the newly established air interface bearer and that is included in the response message;

control the transceiver module 2702 to send the received response message to a first device that is in the radio access network and that keeps a wireless connection to a terminal corresponding to the IP packet, to instruct the first device to complete configuration of a first-part air interface protocol stack of the newly established air interface bearer according to the parameter that is of the newly established air interface bearer and that is included in the response message; and process the IP packet by using the configured second-part air interface protocol stack.

Optionally, the response message is used to indicate that the IP packet is admitted and instruct to reconfigure an existing air interface bearer and use the reconfigured air interface bearer to transmit the IP packet.

The processing module 2701 is specifically configured to:
complete configuration of a second-part air interface protocol stack of the existing air interface bearer according to a parameter that is of the reconfigured existing air interface bearer and that is included in the response message;

control the transceiver module to send the received response message to a first device that is in the radio access network and that keeps a wireless connection to a terminal corresponding to the IP packet, to instruct the first device to complete configuration of a first-part air interface protocol stack of the existing air interface bearer according to the parameter that is of the reconfigured existing air interface bearer and that is included in the response message; and process the IP packet by using the second-part air interface protocol stack of the reconfigured existing air interface bearer.

Optionally, the response message is used to indicate that the IP packet is admitted and instruct to use a default air interface bearer to transmit the IP packet.

The processing module 2701 is specifically configured to:
complete configuration of a second air interface protocol stack of the default air interface bearer;

control the transceiver module 2702 to send the received response message to a first device that is in the radio access network and that keeps a wireless connection to a terminal corresponding to the IP packet, to instruct the first device to complete configuration of a first-part air interface protocol stack of the default air interface bearer; and process the IP packet by using the second-part air interface protocol stack of the default bearer.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

Optionally, the first device is an access node in the radio access network, and keeps a wireless connection to a terminal covered by the radio access network.

The second device is a user plane anchor in the radio access network, and is configured to transmit an IP packet between the access node in the radio access network and a first server; and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the second device, refer to the second device in the optional solution 1 of the foregoing IP packet processing solution, and details are not repeated.

Figure 28:
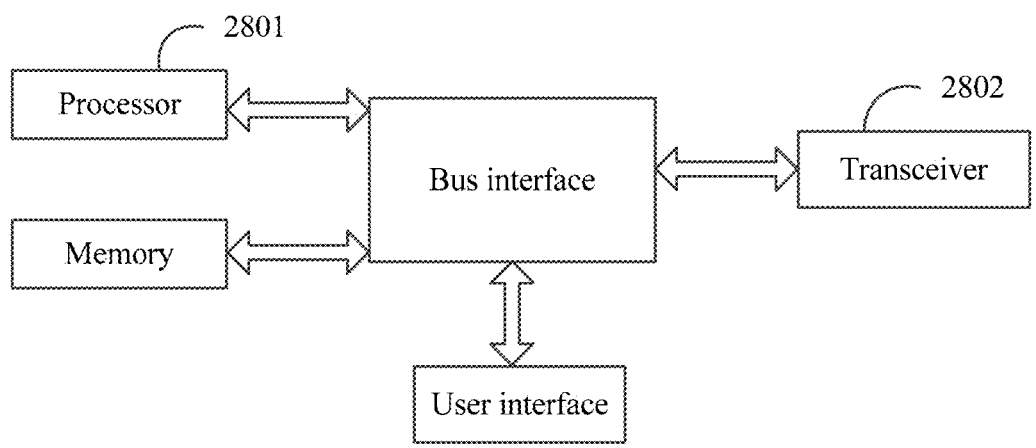

FIG. 28 is a schematic structural diagram of a radio access network device according to an embodiment of the present disclosure. To be distinguished from another radio access network device, the device is referred to as a second device herein. As shown in FIG. 28, the second device includes:

a transceiver 2802, configured to: when a received IP packet has no corresponding air interface bearer, send a new service report to a third device in a radio access network to indicate that the IP packet has no corresponding air interface bearer; and receive a response message sent by the third device in response to the new service report; and a processor 2801, configured to process the IP packet according to the response message received by the transceiver 2802.

Optionally, the second device may be implemented by using a bus architecture shown in FIG. 28. In FIG. 28, the bus architecture may include any quantity of interconnected buses and bridges, and specifically link various circuits of one or more processors represented by the processor 2801 and a memory. The bus architecture may further link various other circuits such as a peripheral device, a voltage regulator, and a power management circuit. This is well known in the art, and therefore, is not further described in this specification. A bus interface provides an interface. The transceiver 2802 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the second device may be implemented without using a bus architecture. For example, the processor 2801 and the transceiver 2802 are directly connected to each other, and do not communicate with each other by using a bus.

For another optional implementation of the transceiver 2802, refer to the transceiver module 2702. For another optional implementation of the processor 2801, refer to the processing module 2701. For another optional implementation of the second device, refer to the second device in the optional solution 1 of the foregoing IP packet processing solution. Details are not repeated.

Figure 29:
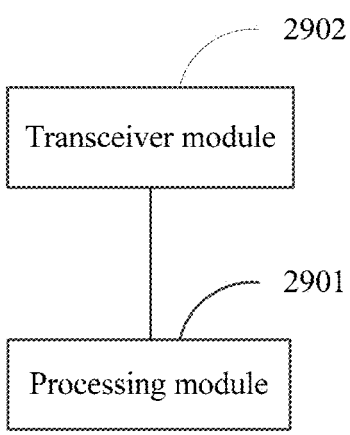

FIG. 29 is a schematic structural diagram of a radio access network device according to an embodiment of the present disclosure. To be distinguished from another radio access network device, the device is referred to as a third device herein. As shown in FIG. 29, the third device includes:

a transceiver module 2902, configured to receive a new service report sent by a second device in a radio access network, where the new service report is used to indicate that a downlink IP packet received by the second device has no corresponding air interface bearer; and a processing module 2901, configured to: perform service admission control on the IP packet, and generate a response message according to a result of the service admission control.

The transceiver module 2902 is further configured to send the response message generated by the processing module 2901 to the second device, to instruct the second device to process the IP packet according to the response message.

Optionally, the new service report includes:

the IP packet; and/or a quintuple of the IP packet.

Optionally, the processing module 2901 is specifically configured to:

determine the IP packet according to the new service report;

obtain subscription information of a terminal corresponding to the IP packet; and when a service corresponding to the IP packet is a service allowed by the subscription information, determine to admit the IP packet; or when a service corresponding to the IP packet is not a service allowed by the subscription information, determine to reject the IP packet.

Optionally, the processing module 2901 is further configured to: if the processing module 2901 determines to admit the IP packet, after performing service admission control on the IP packet and before generating the response message, determine a quality of service QoS requirement of the service corresponding to the IP packet; and determine, according to the determined QoS requirement, an air interface bearer used to transmit the IP packet.

Optionally, the processing module 2901 is specifically configured to:

determine, according to the determined QoS requirement, that a newly established air interface bearer is to be used to transmit the IP packet.

The response message is specifically used to indicate that the IP packet is admitted and instruct to use the newly established air interface bearer to transmit the IP packet, and the response message includes a parameter of the newly established air interface bearer.

Optionally, the processing module 2901 is specifically configured to:

determine, according to the determined QoS requirement, that an existing air interface bearer is to be used to transmit the IP packet.

The response message is specifically used to indicate that the IP packet is admitted and instruct to reconfigure the existing air interface bearer and then transmit the IP packet, and the response message includes a parameter of the reconfigured existing air interface bearer.

Optionally, the processing module 2901 is specifically configured to:

determine, according to the determined QoS requirement, that a default air interface bearer is to be used to transmit the IP packet.

The response message is specifically used to indicate that the IP packet is admitted and instruct to use a default air interface bearer to transmit the IP packet.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the third device, refer to the third device in the optional solution 1 of the foregoing IP packet processing solution, and details are not repeated.

Figure 30:
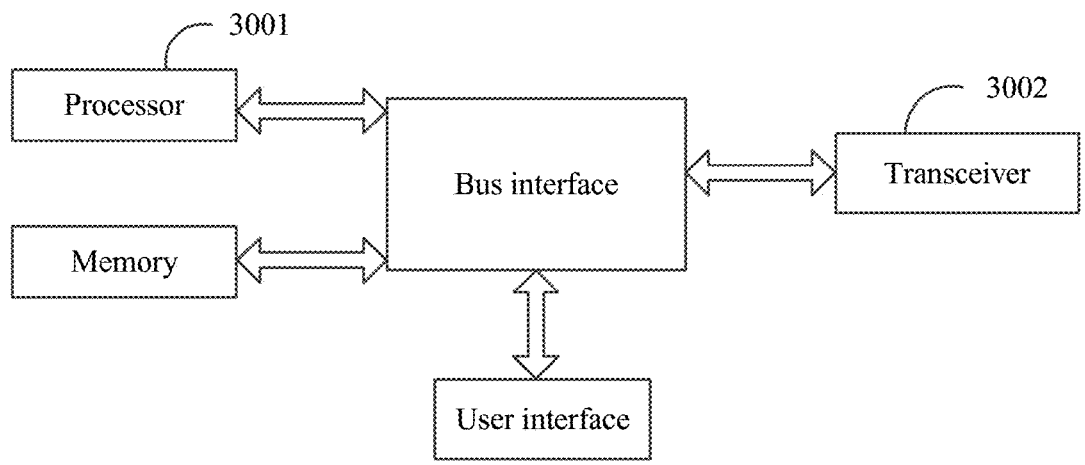

FIG. 30 is a schematic structural diagram of a radio access network device according to an embodiment of the present disclosure. To be distinguished from another radio access network device, the device is referred to as a third device herein. As shown in FIG. 30, the third device includes:

a transceiver 3002, configured to receive a new service report sent by a second device in a radio access network, where the new service report is used to indicate that a downlink IP packet received by the second device has no corresponding air interface bearer; and a processor 3001, configured to: perform service admission control on the IP packet, and generate a response message according to a result of the service admission control.

The transceiver 3002 is further configured to send the response message generated by the processor 3001 to the second device, to instruct the second device to process the IP packet according to the response message.

Optionally, the third device may be implemented by using a bus architecture shown in FIG. 30. In FIG. 30, the bus architecture may include any quantity of interconnected buses and bridges, and specifically link various circuits of one or more processors represented by the processor 3001 and a memory. The bus architecture may further link various other circuits such as a peripheral device, a voltage regulator, and a power management circuit. This is well known in the art, and therefore, is not further described in this specification. A bus interface provides an interface. The transceiver 3002 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the third device may be implemented without using a bus architecture. For example, the processor 3001 and the transceiver 3002 are directly connected to each other, and do not communicate with each other by using a bus.

For another optional implementation of the transceiver 3002, refer to the transceiver module 2902. For another optional implementation of the processor 3001, refer to the processing module 2901. For another optional implementation of the third device, refer to the third device in the optional solution 1 of the foregoing IP packet processing solution. Details are not repeated.

Figure 31:
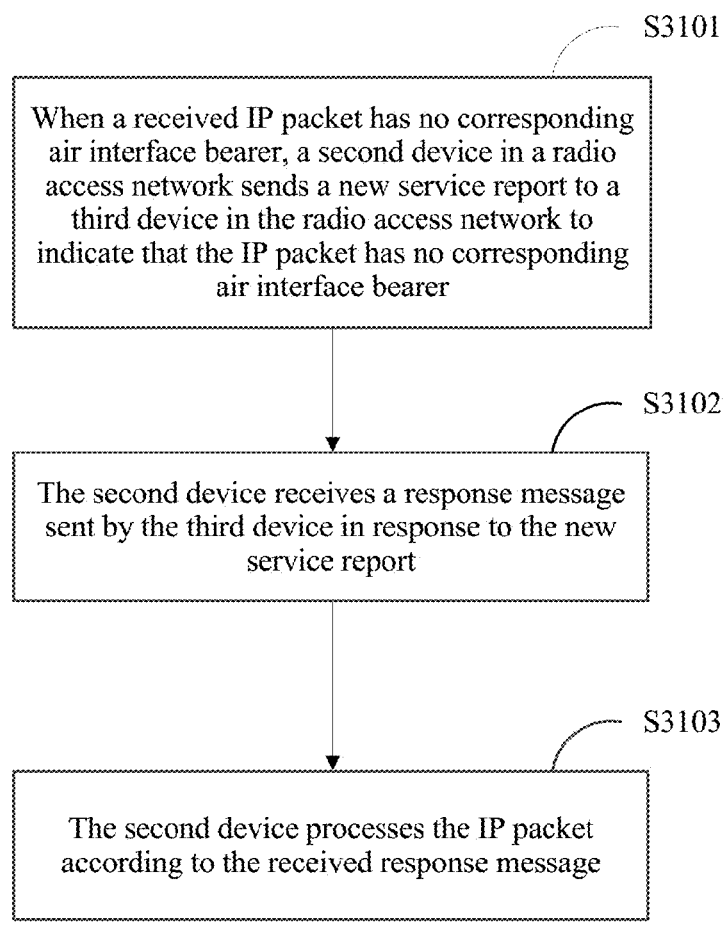
FIG. 31 and FIG. 32 are respectively flowcharts of two IP packet processing methods according to embodiments of the present disclosure.

FIG. 31 is a flowchart of an IP packet processing method according to an embodiment of the present disclosure. As shown in FIG. 31, the method includes the following steps.

S3101. When a received IP packet has no corresponding air interface bearer, a second device in a radio access network sends a new service report to a third device in the radio access network to indicate that the IP packet has no corresponding air interface bearer.

S3102. The second device receives a response message sent by the third device in response to the new service report.

S3103. The second device processes the IP packet according to the received response message.

Optionally, before the second device sends the new service report to the third device, the method further includes: receiving, by the second device, the IP packet; and when a prestored correspondence between a quintuple of an IP packet and an air interface bearer does not include a quintuple of the IP packet, determining, by the second device, that the IP packet has no corresponding air interface bearer.

Optionally, the new service report includes the IP packet and/or the quintuple of the IP packet, so that the third device determines the IP packet according to the new service report.

Optionally, the response message is used to indicate that the IP packet is rejected.

That the second device processes the IP packet according to the received response message includes:

discarding, by the second device, the IP packet.

Optionally, that the second device processes the IP packet according to the received response message further includes:

recording, by the second device, the quintuple of the IP packet, and discarding a subsequently received IP packet that has the recorded quintuple of the IP packet.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

Optionally, the response message is used to indicate that the IP packet is admitted and instruct to newly establish an air interface bearer used to transmit the IP packet.

That the second device processes the IP packet according to the received response message includes:

completing, by the second device, configuration of a second-part air interface protocol stack of the newly established air interface bearer according to a parameter that is of the newly established air interface bearer and that is included in the response message;

sending, by the second device, the received response message to a first device that is in the radio access network and that keeps a wireless connection to a terminal corresponding to the IP packet, to instruct the first device to complete configuration of a first-part air interface protocol stack of the newly established air interface bearer according to the parameter that is of the newly established air interface bearer and that is included in the response message; and processing, by the second device, the IP packet by using the configured second-part air interface protocol stack.

Optionally, the response message is used to indicate that the IP packet is admitted and instruct to reconfigure an existing air interface bearer and use the reconfigured air interface bearer to transmit the IP packet.

That the second device processes the IP packet according to the received response message includes:

completing, by the second device, configuration of a second-part air interface protocol stack of the existing air interface bearer according to a parameter that is of the reconfigured existing air interface bearer and that is included in the response message;

sending, by the second device, the received response message to a first device that is in the radio access network and that keeps a wireless connection to a terminal corresponding to the IP packet, to instruct the first device to complete configuration of a first-part air interface protocol stack of the existing air interface bearer according to the parameter that is of the reconfigured existing air interface bearer and that is included in the response message; and processing, by the second device, the IP packet by using the second-part air interface protocol stack of the reconfigured existing air interface bearer.

Optionally, the response message is used to indicate that the IP packet is admitted and instruct to use a default air interface bearer to transmit the IP packet.

That the second device processes the IP packet according to the received response message includes:

completing, by the second device, configuration of a second air interface protocol stack of the default air interface bearer;

sending, by the second device, the received response message to a first device that is in the radio access network and that keeps a wireless connection to a terminal corresponding to the IP packet, to instruct the first device to complete configuration of a first-part air interface protocol stack of the default air interface bearer; and processing, by the second device, the IP packet by using the second-part air interface protocol stack of the default bearer.

Optionally, the first-part air interface protocol stack includes a physical PHY layer, a Medium Access Control MAC layer, and a Radio Link Control RLC layer, and the second-part air interface protocol stack includes a Packet Data Convergence Protocol PDCP layer; or the first-part air interface protocol stack includes a PHY layer and a MAC layer, and the second-part air interface protocol stack includes an RLC layer and a PDCP layer; or the first-part air interface protocol stack includes a PHY layer, and the second-part air interface protocol stack includes a MAC layer, an RLC layer, and a PDCP layer.

Optionally, the first device is an access node in the radio access network, and keeps a wireless connection to a terminal covered by the radio access network.

The second device is a user plane anchor in the radio access network, and is configured to transmit an IP packet between the access node in the radio access network and a first server; and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the method, refer to processing by the second device in the optional solution 1 of the foregoing IP packet processing solution, and details are not repeated.

Figure 32:
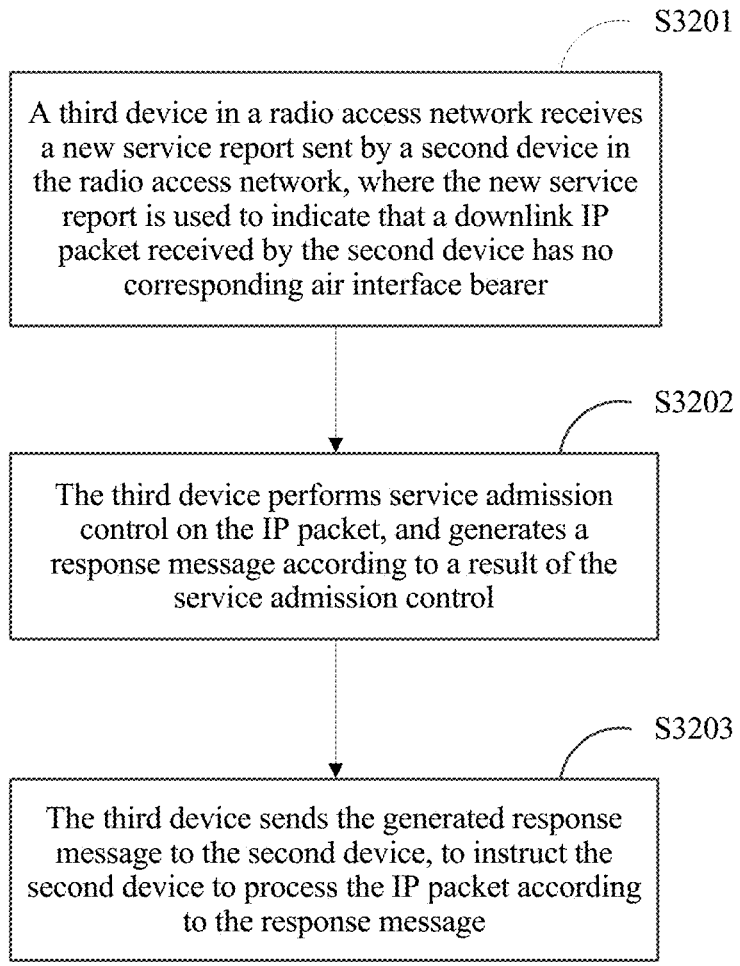

FIG. 32 is a flowchart of an IP packet processing method according to an embodiment of the present disclosure. As shown in FIG. 32, the method includes the following steps.

S3201. A third device in a radio access network receives a new service report sent by a second device in the radio access network, where the new service report is used to indicate that a downlink IP packet received by the second device has no corresponding air interface bearer.

S3202. The third device performs service admission control on the IP packet, and generates a response message according to a result of the service admission control.

S3203. The third device sends the generated response message to the second device, to instruct the second device to process the IP packet according to the response message.

Optionally, the new service report includes:
the IP packet; and/or
a quintuple of the IP packet.

Optionally, that the third device performs service admission control on the IP packet includes:
determining, by the third device, the IP packet according to the received new service report;
obtaining, by the third device, subscription information of a terminal corresponding to the IP packet; and
when a service corresponding to the IP packet is a service allowed by the subscription information, determining, by the third device, to admit the IP packet; or when a service corresponding to the IP packet is not a service allowed by the subscription information, determining to reject the IP packet.

Optionally, if the third device determines to admit the IP packet, after service admission control is performed on the IP packet and before the response message is generated, the method further includes:
determining, by the third device, a quality of service QoS requirement of the service corresponding to the IP packet; and
determining, by the third device according to the determined QoS requirement, an air interface bearer used to transmit the IP packet.

Optionally, the determining, by the third device according to the determined QoS requirement, an air interface bearer used to transmit the IP packet includes:
determining, by the third device according to the determined QoS requirement, that a newly established air interface bearer is to be used to transmit the IP packet.

The response message is specifically used to indicate that the IP packet is admitted and instruct to use the newly established air interface bearer to transmit the IP packet, and the response message includes a parameter of the newly established air interface bearer.

Optionally, the determining, by the third device according to the determined QoS requirement, an air interface bearer used to transmit the IP packet includes:
determining, by the third device according to the determined QoS requirement, that an existing air interface bearer is to be used to transmit the IP packet.

The response message is specifically used to indicate that the IP packet is admitted and instruct to reconfigure the existing air interface bearer and then transmit the IP packet, and the response message includes a parameter of the reconfigured existing air interface bearer.

Optionally, the determining, by the third device according to the determined QoS requirement, an air interface bearer used to transmit the IP packet includes:
determining, by the third device according to the determined QoS requirement, that a default air interface bearer is to be used to transmit the IP packet.

The response message is specifically used to indicate that the IP packet is admitted and instruct to use a default air interface bearer to transmit the IP packet.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the method, refer to processing by the third device in the optional solution 1 of the foregoing IP packet processing solution, and details are not repeated.

Figure 33:
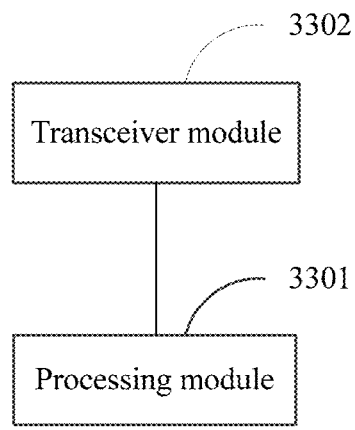
FIG. 33 and FIG. 34 are respectively schematic structural diagrams of two radio access network devices according to embodiments of the present disclosure.

FIG. 33 is a schematic structural diagram of a radio access network device according to an embodiment of the present disclosure. To be distinguished from another radio access network device, the device is referred to as a second device herein. As shown in FIG. 33, the second device includes:
a transceiver module 3302, configured to receive an IP packet; and
a processing module 3301, configured to: determine whether a quintuple of the IP packet is a quintuple that does not occur; and if the quintuple of the IP packet is a quintuple that does not occur, determine whether to admit the IP packet, and process the IP packet according to a result of determining whether to admit the IP packet.

Optionally, the processing module 3301 is specifically configured to:
when a prestored quintuple of an IP packet includes the quintuple of the IP packet, determine, by the second device, that the quintuple of the IP packet is a quintuple that occurs; or when a prestored quintuple of an IP packet does not include the quintuple of the IP packet, determine that the quintuple of the IP packet is a quintuple that does not occur.

Optionally, the processing module 3301 is specifically configured to:
obtain subscription information of a terminal corresponding to the IP packet; and
when a service corresponding to the IP packet is a service allowed by the subscription information, determine to admit the IP packet; or when a service corresponding to the IP packet is not a service allowed by the subscription information, determine to reject the IP packet.

Optionally, the processing module 3301 is specifically configured to:

discard the IP packet when determining to reject the IP packet.

Optionally, the processing module 3301 is further configured to: after discarding the IP packet, discard a subsequently received IP packet that has a same quintuple as the IP packet.

Optionally, the processing module 3301 is specifically configured to:

when determining to admit the IP packet, determine a quality of service QoS requirement of the service corresponding to the IP packet;

determine, according to the determined QoS requirement, an air interface bearer used to transmit the IP packet; and control the transceiver module 3302 to transmit the IP packet by using the air interface bearer determined by the processing module 3301.

Optionally, the processing module 3301 is further configured to:

after controlling the transceiver module 3302 to transmit the IP packet by using the air interface bearer determined by the processing module 3301, control the transceiver module 3302 to transmit, by using the air interface bearer determined by the processing module 3301, a subsequently received IP packet that has a same quintuple as the IP packet.

Optionally, the processing module 3301 is specifically configured to:

determine, according to the subscription information of the terminal corresponding to the IP packet and/or differentiated services code point DSCP information in a header of the IP packet, the quality of service QoS requirement of the service corresponding to the IP packet.

Optionally, if the processing module 3301 is specifically configured to: determine, according to the subscription information, the quality of service QoS requirement of the service corresponding to the IP packet; or determine, according to the subscription information and the DSCP information, the quality of service QoS requirement of the service corresponding to the IP packet, the processing module 3301 is further configured to obtain the subscription information before determining the quality of service QoS requirement of the service corresponding to the IP packet.

Optionally, the processing module 3301 is specifically configured to:

control the transceiver module 3302 to obtain the subscription information from a third device in a radio access network; or obtain the subscription information from information stored in the second device.

Optionally, the processing module 3301 is specifically configured to:

control the transceiver module 3302 to send a subscription information request message to the third device, where the message carries terminal identification information, and the terminal identification information includes at least one of the following information:

the IP packet;

the quintuple of the IP packet;

a source IP address of the IP packet; or a destination IP address of the IP packet; and receive, by using the transceiver module 3302, the subscription information determined by the third device according to the terminal identification information.

Optionally, the second device is a user plane anchor in the radio access network, and is configured to transmit an IP packet between an access node in the radio access network and a first server.

The access node keeps a wireless connection to a terminal covered by the radio access network.

The first server is configured to provide an application service for the terminal covered by the radio access network.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the second device, refer to the second device in the optional solution 2 of the foregoing IP packet processing solution, and details are not repeated.

Figure 34:
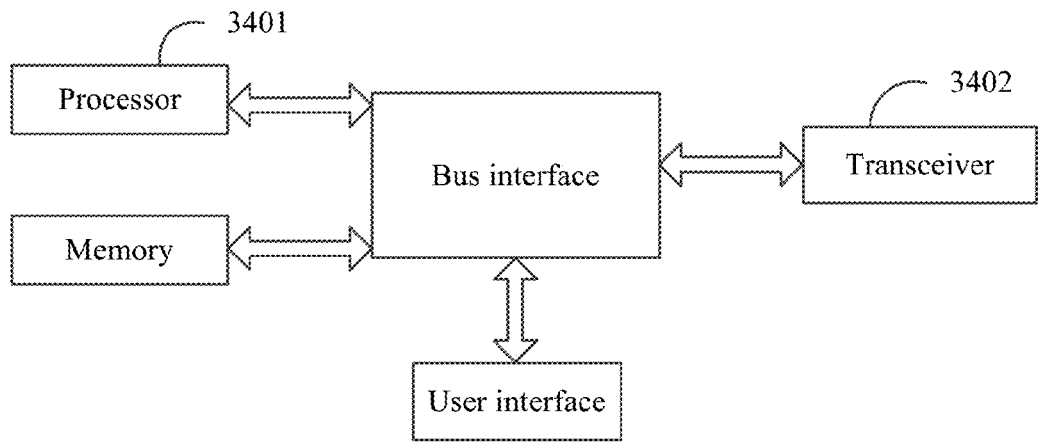

FIG. 34 is a schematic structural diagram of a radio access network device according to an embodiment of the present disclosure. To be distinguished from another radio access network device, the device is referred to as a second device herein. As shown in FIG. 34, the second device includes:

a transceiver 3402, configured to receive an IP packet; and a processor 3401, configured to: determine whether a quintuple of the IP packet is a quintuple that does not occur; and if the quintuple of the IP packet is a quintuple that does not occur, determine whether to admit the IP packet, and process the IP packet according to a result of determining whether to admit the IP packet.

Optionally, the second device may be implemented by using a bus architecture shown in FIG. 34. In FIG. 34, the bus architecture may include any quantity of interconnected buses and bridges, and specifically link various circuits of one or more processors represented by the processor 3401 and a memory. The bus architecture may further link various other circuits such as a peripheral device, a voltage regulator, and a power management circuit. This is well known in the art, and therefore, is not further described in this specification. A bus interface provides an interface. The transceiver 3402 may be multiple elements, that is, include a transmitter and a receiver, and provide units for communicating with various other apparatuses on a transmission medium. For different user equipments, a user interface may be an interface that can be externally or internally connected to a required device. The connected device includes but is not limited to a keypad, a display, a loudspeaker, a microphone, and a joystick.

Optionally, the second device may be implemented without using a bus architecture. For example, the processor 3401 and the transceiver 3402 are directly connected to each other, and do not communicate with each other by using a bus.

For another optional implementation of the transceiver 3402, refer to the transceiver module 3302. For another optional implementation of the processor 3401, refer to the processing module 3301. For another optional implementation of the second device, refer to the second device in the optional solution 2 of the foregoing IP packet processing solution. Details are not repeated.

Figure 35:
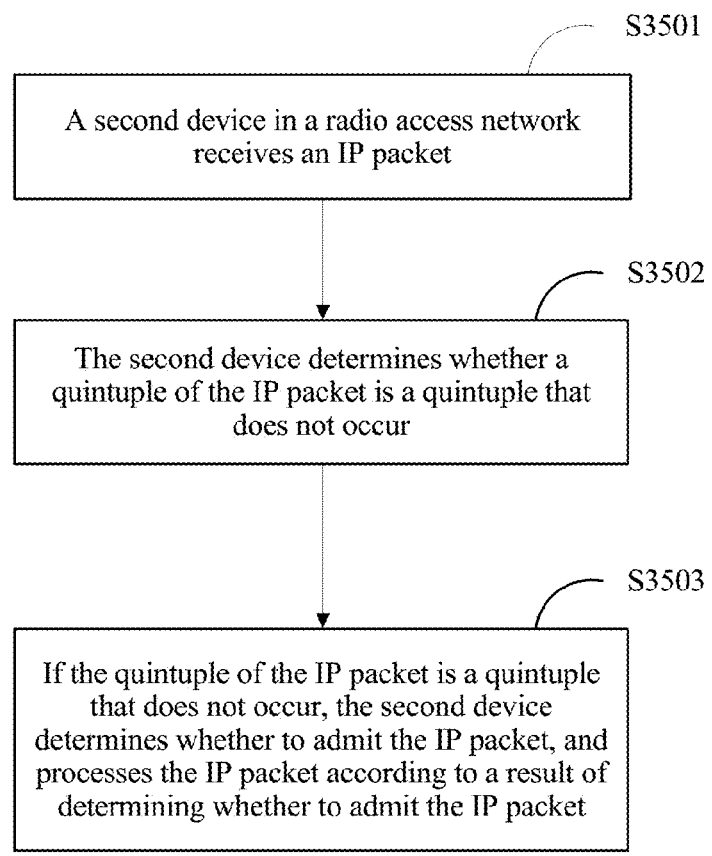
FIG. 35 is a flowchart of an IP packet processing method according to an embodiment of the present disclosure.

FIG. 35 is a flowchart of an IP packet processing method according to an embodiment of the present disclosure. As shown in FIG. 35, the method includes the following steps.

S3501. A second device in a radio access network receives an IP packet.

S3502. The second device determines whether a quintuple of the IP packet is a quintuple that does not occur.

S3503. If the quintuple of the IP packet is a quintuple that does not occur, the second device determines whether to admit the IP packet, and processes the IP packet according to a result of determining whether to admit the IP packet.

Optionally, that the second device determines whether the IP packet is a quintuple that does not occur includes:

when a prestored quintuple of an IP packet includes the quintuple of the IP packet, determining, by the second device, that the quintuple of the IP packet is a quintuple that occurs; or when a prestored quintuple of an IP packet does not include the quintuple of the IP packet, determining that the quintuple of the IP packet is a quintuple that does not occur.

Optionally, that the second device determines whether to admit the IP packet includes:

obtaining, by the second device, subscription information of a terminal corresponding to the IP packet; and when a service corresponding to the IP packet is a service allowed by the subscription information, determining, by the second device, to admit the IP packet; or when a service corresponding to the IP packet is not a service allowed by the subscription information, determining to reject the IP packet.

Optionally, that the second device processes the IP packet according to the determining result includes:

discarding, by the second device, the IP packet when determining to reject the IP packet.

Optionally, after the second device discards the IP packet, the method further includes:

discarding, by the second device, a subsequently received IP packet that has a same quintuple as the IP packet.

Optionally, that the second device processes the IP packet according to the determining result includes:

when determining to admit the IP packet, determining, by the second device, a quality of service QoS requirement of the service corresponding to the IP packet;

determining, by the second device according to the determined QoS requirement, an air interface bearer used to transmit the IP packet; and transmitting, by the second device, the IP packet by using the determined air interface bearer.

Optionally, after the transmitting, by the second device, the IP packet by using the determined air interface bearer, the method further includes:

transmitting, by the second device by using the determined air interface bearer, a subsequently received IP packet that has a same quintuple as the IP packet.

Optionally, the determining, by the second device, a quality of service QoS requirement of the service corresponding to the IP packet includes:

determining, by the second device according to the subscription information of the terminal corresponding to the IP packet and/or differentiated services code point DSCP information in a header of the IP packet, the quality of service QoS requirement of the service corresponding to the IP packet.

Optionally, if the second device determines, according to the subscription information, the quality of service QoS requirement of the service corresponding to the IP packet; or if the second device determines, according to the subscription information and the DSCP information, the quality of service QoS requirement of the service corresponding to the IP packet, before the determining, by the second device, a quality of service QoS requirement of the service corresponding to the IP packet, the method further includes:

obtaining, by the second device, the subscription information.

Optionally, the obtaining, by the second device, the subscription information includes:

obtaining, by the second device, the subscription information from a third device in the radio access network; or obtaining, by the second device, the subscription information from stored information.

Optionally, the obtaining, by the second device, the subscription information from a third device includes:

sending, by the second device, a subscription information request message to the third device, where the message carries terminal identification information, and the terminal identification information includes at least one of the following information:

the IP packet;

the quintuple of the IP packet;

a source IP address of the IP packet; or a destination IP address of the IP packet; and receiving, by the second device, the subscription information determined by the third device according to the terminal identification information.

Optionally, the second device is a user plane anchor in the radio access network, and is configured to transmit an IP packet between an access node in the radio access network and a first server.

The access node keeps a wireless connection to a terminal covered by the radio access network.

The first server is configured to provide an application service for the terminal covered by the radio access network.

Optionally, the second device is a user plane anchor in the radio access network, and is configured to transmit an IP packet between an access node in the radio access network and a first server, the access node keeps a wireless connection to a terminal covered by the radio access network, and the first server is configured to provide an application service for the terminal covered by the radio access network.

The third device is a control plane anchor in the radio access network, and is configured to control the terminal covered by the radio access network and the access node in the radio access network to establish a wireless connection.

For another optional implementation of the method, refer to processing by the second device in the optional solution 2 of the foregoing IP packet processing solution, and details are not repeated.

In conclusion, in the embodiments of the present disclosure, a flattened network architecture is used, so that communications links between an eNB and an MME, the MME and an HSS, and the MME and a serving gateway are prevented from being processing capability bottlenecks of a wireless communications system, a signaling transmission delay is effectively reduced, and a network paralysis risk is also reduced.

Further, a first device and a second device in a radio access network jointly implement air interface protocol stack processing, so that processing load of either device is reduced. When the solution is applied to a scenario in which a control plane anchor and a user plane anchor are separated from each other, centralized control and service data offloading can be implemented.

In an optional implementation solution, a first device, a second device, and a third device in a radio access network may separately perform partial air interface protocol stack processing, and the third device may separately configure parameters of air interface protocol stacks of the first device and the second device. When the first device is an access node, the second device is a user plane anchor, and the third device is a control plane anchor, centralized control can be implemented by the control plane anchor, and proximity-based offloading can be implemented on service data by the user plane anchor.

Still further, radio access network devices are used to replace core network devices such as a PCRF, a PDN GW, and an MME in a current LTE system, so that complex quality of service QoS management in the current LTE system can be avoided.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, and an optical memory) that include computer-usable program code.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

The persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A communication method applied to a radio access system, wherein the radio access system comprises a first device, a second device and a third device, the method comprising:
   receiving, by the first device, via an air interface, first data from a terminal covered by the radio access system, wherein the first device is an access node of the radio access system;
   processing, by the first device, the first data at a first-part air interface protocol stack, wherein the first-part air interface protocol stack comprises a physical (PHY) layer, a medium access control (MAC) layer, and a radio link control (RLC) layer;
   sending, by the first device, the processed first data to the second device, wherein the second device is a user plane anchor of the first device;
   processing, by the second device, the first data at a second-part air interface protocol stack, wherein the second-part air interface protocol stack comprises a packet data convergence protocol (PDCP) layer;
   sending, by the third device, second data to the second device, wherein the third device is a control plane anchor of the first device; and
   wherein the first data is a service data, and the second data is a control message.

2. The communication method according to claim 1, further comprising:
   processing, by the second device, the second data at the second-part air interface protocol stack; and
   sending, by the second device, the processed second data to the first device.

3. The communication method according to claim 2, wherein the control message comprises: a security mode command message used to configure a security-related parameter of a wireless connection.

4. The communication method according to claim 1, wherein the control message comprises: a security mode command message used to configure a security-related parameter of a wireless connection.

5. A radio access system, comprising:
a first device, a second device and a third device; and wherein,
the first device is an access node of the radio access system,
the first device comprises:
a first non-transitory memory storage comprising first instructions; and
a first hardware processor in communication with the first non-transitory memory storage, wherein the first hardware processor executes the first instructions to:
receive, via an air interface, first data from a terminal covered by the radio access system,
process the first data at a first-part air interface protocol stack, wherein the first-part air interface protocol stack comprises a physical (PHY) layer, a medium access control (MAC) layer, and a radio link control (RLC) layer, and
send the processed first data to the second device, wherein the second device is a user plane anchor of the first device;
the second device comprises:
a second non-transitory memory storage comprising second instructions; and
a second hardware processor in communication with the second non-transitory memory storage, wherein the second hardware processor executes the second instructions to:
process the first data at a second-part air interface protocol stack, wherein the second-part air interface protocol stack comprises a packet data convergence protocol (PDCP) layer;
the third device comprises:
a third non-transitory memory storage comprising third instructions; and
a third hardware processor in communication with the third non-transitory memory storage, wherein the third hardware processor executes the third instructions to:
send second data to the second device, wherein the third device is a control plane anchor of the first device; and
wherein the first data is a service data, and the second data is a control message.

6. The radio access system according to claim 5, wherein the second hardware processor executes the second instructions to:
process the second data at the second-part air interface protocol stack; and
send the processed second data to the first device.

7. The radio access system according to claim 6, wherein the control message comprises: a security mode command message used to configure a security-related parameter of a wireless connection.

8. The radio access system according to claim 5, wherein the control message comprises: a security mode command message used to configure a security-related parameter of a wireless connection.

* * * * *